United States Patent
Ewing et al.

(10) Patent No.: US 10,642,299 B2
(45) Date of Patent: May 5, 2020

(54) POWER DISTRIBUTION, MANAGEMENT, AND MONITORING SYSTEMS AND METHODS

(71) Applicant: Server Technology, Inc., Reno, NV (US)

(72) Inventors: Carrel W. Ewing, Reno, NV (US); Andrew J. Cleveland, Reno, NV (US); James P. Maskaly, Reno, NV (US); Dennis W. McGlumphy, Sun Valley, NV (US); Brian P. Auclair, Reno, NV (US); Marc Eisenberg, Reno, NV (US); Calvin Nicholson, Reno, NV (US); Andy Szeto, Sparks, NV (US)

(73) Assignee: Server Technology, Inc., Reno, NV (US)

(*) Notice: Subject to any disclaimer, the term of this patent is extended or adjusted under 35 U.S.C. 154(b) by 0 days.

(21) Appl. No.: 15/814,268

(22) Filed: Nov. 15, 2017

(65) Prior Publication Data

US 2018/0157284 A1 Jun. 7, 2018

Related U.S. Application Data

(60) Continuation of application No. 14/834,765, filed on Aug. 25, 2015, now abandoned, which is a (Continued)

(51) Int. Cl.
*G05F 1/66* (2006.01)
*H04L 12/10* (2006.01)
(Continued)

(52) U.S. Cl.
CPC ............ *G05F 1/66* (2013.01); *G05B 15/02* (2013.01); *G06F 1/189* (2013.01); *G06F 1/266* (2013.01);
(Continued)

(58) Field of Classification Search
None
See application file for complete search history.

(56) References Cited

U.S. PATENT DOCUMENTS

| | | | |
|---|---|---|---|
| 4,300,182 A | 11/1981 | Schweitzer | |
| 4,700,188 A | 10/1987 | James | |

(Continued)

FOREIGN PATENT DOCUMENTS

| | | |
|---|---|---|
| EP | 0528634 | 2/1993 |
| JP | 2003216283 | 7/2003 |
| JP | 2007259647 | 10/2007 |

(Continued)

OTHER PUBLICATIONS

Complaint for Patent Infringement, *Server Technology, Inc. v. Raritan Inc. and Raritan Americas, Inc.*, In the U.S. District Court, District of Nevada; Case No. 3:15-cv-00330-MMD-WGC; 78 pp.; Jun. 22, 2015.

(Continued)

*Primary Examiner* — Sean Shechtman
(74) *Attorney, Agent, or Firm* — Perkins Coie LLP

(57) ABSTRACT

Managing electrical power usage in a power distribution system. Power usage data indicative of electrical current flow through electrical outlets in the system are collected and displayed for a user. The user may select an outlet and issue a command to control current flow through that outlet. Environmental data may also be collected and displayed. Outlets in different Cabinet Power Distribution Units (CDUs) in different locations may be clustered for reporting and control. A database structure provides a "system" table for data descriptive of the system, a "tower" table for data descriptive of outlets and other elements in the system, an "infeed" table for data descriptive of input electrical power, and an "outlet" table for data descriptive of electrical power flowing through the outlets.

15 Claims, 24 Drawing Sheets

Related U.S. Application Data continuation of application No. 13/949,107, filed on Jul. 23, 2013, now Pat. No. 9,142,971, which is a division of application No. 12/344,419, filed on Dec. 26, 2008, now Pat. No. 8,494,661.

(60) Provisional application No. 61/207,853, filed on Dec. 2, 2008, provisional application No. 61/017,495, filed on Dec. 28, 2007, provisional application No. 61/017,511, filed on Dec. 28, 2007, provisional application No. 61/009,463, filed on Dec. 28, 2007.

(51) Int. Cl.

| | | |
|---|---|---|
| *H04L 12/26* | (2006.01) | |
| *G06F 1/18* | (2006.01) | |
| *G06F 1/26* | (2006.01) | |
| *G06F 1/28* | (2006.01) | |
| *H02J 4/00* | (2006.01) | |
| *G05B 15/02* | (2006.01) | |
| *H04L 12/24* | (2006.01) | |

(52) U.S. Cl.
CPC ............... *G06F 1/28* (2013.01); *H02J 4/00* (2013.01); *H04L 12/10* (2013.01); *H04L 43/0876* (2013.01); *H04L 41/0213* (2013.01); *Y04S 40/168* (2013.01)

(56) References Cited

U.S. PATENT DOCUMENTS

| | | |
|---|---|---|
| 4,731,549 A | 3/1988 | Hiddleson |
| 5,179,376 A | 1/1993 | Pomatto |
| 5,369,356 A | 11/1994 | Kinney et al. |
| 5,424,903 A | 6/1995 | Schreiber |
| 5,469,045 A | 11/1995 | Dove et al. |
| 5,498,956 A | 3/1996 | Kinney et al. |
| 5,506,573 A | 4/1996 | Ewing et al. |
| 5,506,790 A | 4/1996 | Nguyen |
| 5,650,771 A | 7/1997 | Lee |
| 5,721,934 A | 2/1998 | Scheurich |
| 5,778,237 A | 7/1998 | Yamamoto et al. |
| 5,949,974 A | 9/1999 | Ewing et al. |
| 6,157,527 A | 12/2000 | Spencer et al. |
| 6,232,675 B1 | 5/2001 | Small |
| 6,330,516 B1 | 12/2001 | Kammeter et al. |
| 6,445,087 B1 | 9/2002 | Wang et al. |
| 6,476,729 B1 | 11/2002 | Liu |
| 6,501,195 B1 | 12/2002 | Barton |
| 6,525,435 B2 | 2/2003 | Lau et al. |
| 6,608,406 B2 | 8/2003 | Bersiek |
| 6,628,009 B1 | 9/2003 | Chapel |
| 6,711,613 B1 | 3/2004 | Ewing et al. |
| 6,714,977 B1 | 3/2004 | Fowler et al. |
| 6,741,442 B1 | 5/2004 | McNally et al. |
| 6,759,763 B2 | 7/2004 | Barton |
| 6,867,958 B2 | 3/2005 | McClure et al. |
| 6,967,283 B2 | 11/2005 | Rasmussen et al. |
| 7,010,589 B2 | 3/2006 | Ewing et al. |
| 7,043,543 B2 | 5/2006 | Ewing et al. |
| 7,099,934 B1 | 8/2006 | Ewing et al. |
| 7,106,044 B1 | 9/2006 | Lee, Jr. et al. |
| 7,141,891 B2 | 11/2006 | McNally et al. |
| 7,201,610 B2 | 4/2007 | Chao et al. |
| 7,209,838 B1 | 4/2007 | Wright et al. |
| 7,215,535 B2 | 5/2007 | Pereira |
| 7,268,998 B2 | 9/2007 | Ewing et al. |
| 7,271,502 B1 | 9/2007 | Remaker |
| 7,274,303 B2 | 9/2007 | Dresti et al. |
| 7,312,980 B2 | 12/2007 | Ewing et al. |
| 7,324,006 B2 | 1/2008 | Godard |
| 7,369,950 B2 | 5/2008 | Wall et al. |
| 7,400,062 B2 | 7/2008 | Pincu et al. |
| 7,414,329 B2 | 8/2008 | Cleveland et al. |
| 7,522,036 B1 | 4/2009 | Preuss et al. |
| 7,606,014 B2 | 10/2009 | Ziegler et al. |
| 7,646,590 B1 | 1/2010 | Corhodzic et al. |
| 7,653,499 B2 | 1/2010 | Corrado et al. |
| 7,707,443 B2 | 4/2010 | Chheda et al. |
| 7,715,176 B2 * | 5/2010 | Perez .................. G01R 22/065 361/659 |
| 7,715,716 B2 | 5/2010 | Perez et al. |
| 7,795,759 B2 | 9/2010 | DuBose et al. |
| 7,813,099 B2 | 10/2010 | Chan |
| 7,843,081 B2 | 11/2010 | Lim |
| 7,857,214 B2 | 12/2010 | Saliaris |
| 7,860,955 B2 | 12/2010 | Ratcliff et al. |
| 7,969,156 B2 | 6/2011 | Ferguson |
| 7,982,335 B2 | 7/2011 | Aldag et al. |
| 7,987,248 B2 | 7/2011 | Ratcliff et al. |
| 8,039,997 B2 | 10/2011 | Slessman |
| 8,159,084 B2 | 4/2012 | Gilpatrick |
| 8,165,832 B1 | 4/2012 | Low et al. |
| 8,207,627 B2 | 6/2012 | Aldag et al. |
| 8,264,099 B2 | 9/2012 | Aldag et al. |
| 8,321,163 B2 | 11/2012 | Ewing et al. |
| 8,489,667 B2 | 7/2013 | Ewing et al. |
| 8,494,661 B2 | 7/2013 | Ewing et al. |
| 8,510,424 B2 | 8/2013 | Ewing et al. |
| 8,560,652 B2 | 10/2013 | Ewing et al. |
| 8,694,272 B2 | 4/2014 | Ewing et al. |
| 9,142,971 B2 | 9/2015 | Ewing et al. |
| 2004/0078153 A1 | 4/2004 | Bartone et al. |
| 2004/0124713 A1 | 7/2004 | Orr et al. |
| 2004/0205181 A1 * | 10/2004 | Ewing .................. G06F 1/26 709/223 |
| 2005/0057870 A1 | 3/2005 | Stellato et al. |
| 2005/0068716 A1 | 3/2005 | Pereira |
| 2005/0094336 A1 | 5/2005 | Cleveland |
| 2005/0203987 A1 * | 9/2005 | Ewing .................. G06F 1/26 709/200 |
| 2006/0072269 A1 | 4/2006 | Staples |
| 2006/0072531 A1 | 4/2006 | Ewing et al. |
| 2006/0082222 A1 | 4/2006 | Pincu et al. |
| 2007/0050443 A1 | 3/2007 | Ewing et al. |
| 2007/0155349 A1 | 7/2007 | Nelson et al. |
| 2007/0245012 A1 | 10/2007 | Ewing et al. |
| 2007/0276548 A1 | 11/2007 | Uzunovic et al. |
| 2007/0291430 A1 | 12/2007 | Spitaels et al. |
| 2008/0019067 A1 | 1/2008 | Reynolds et al. |
| 2008/0019068 A1 | 1/2008 | Reynolds et al. |
| 2008/0086652 A1 | 4/2008 | Krieger et al. |
| 2008/0094210 A1 | 4/2008 | Paradiso et al. |
| 2008/0172312 A1 | 7/2008 | Synesiou et al. |
| 2008/0177424 A1 | 7/2008 | Wheeler |
| 2008/0238404 A1 | 10/2008 | Ferguson |
| 2008/0309164 A1 | 12/2008 | Lim |
| 2009/0055031 A1 | 2/2009 | Slota et al. |
| 2009/0102288 A1 | 4/2009 | Blackmond |
| 2009/0138732 A1 | 5/2009 | Chang |
| 2009/0157333 A1 | 6/2009 | Corrado et al. |
| 2009/0235107 A1 | 9/2009 | Gelonese |
| 2009/0262138 A1 | 10/2009 | Bradbury et al. |
| 2009/0307505 A1 | 12/2009 | Robertson et al. |
| 2010/0090542 A1 | 4/2010 | Johnson et al. |
| 2010/0145536 A1 | 6/2010 | Masters et al. |
| 2010/0145542 A1 | 6/2010 | Chapel et al. |
| 2010/0198535 A1 | 8/2010 | Brown et al. |
| 2011/0077788 A1 | 3/2011 | Chan et al. |

FOREIGN PATENT DOCUMENTS

| | | |
|---|---|---|
| JP | H05232143 | 7/2013 |
| WO | WO2008113052 | 9/2008 |

OTHER PUBLICATIONS

First Amended Complaint for Patent Infringement, *Server Technology, Inc.* v. *Raritan Inc. and Raritan Americas, Inc.*, In the U.S. District Court for the District of Nevada; Case No. 3:15-cv-00330-MMD-WGC; 13 pp.; Jun. 29, 2015.

(56) References Cited

OTHER PUBLICATIONS

Raritan Inc. and Raritan Americas, Inc.'s Answer, Affirmative Defenses, and Counterclaims to First Amended Complaint for Patent Infringement; Case No. 3:15-cv-00330-MMD-WGC; 53 pp.; Sep. 3, 2015.
Server Technology, Inc.'s Answer to Defendants' Counterclaims; Case No. 3:15-cv-00330-MMD-WGC; 53 pp.; Sep. 28, 2015.
Second Amended Complaint for Patent Infringement, *Server Technology, Inc.* v. *American Power Conversion Corporation*, Case No. 3:15-CV-00330--MMD-WGC; in the United States District Court, District of Nevada; 23 pp.; Dec. 15, 2015.
"Existing Metrics, Guidelines and Programs Affecting Data Center and IT Energy Efficiency," The Green Grid, White Paper #5, Jan. 2007, 40 pages.
"Qualitative Analysis of Power Distribution Configurations for Data Centers," The Green Grid, White Paper #4, Jan. 2007, 25 pages.
"The Green Grid Metrics: Data Center Infrastructure Efficiency (DCIE) Detailed Analysis," The Green Grid, White Paper #14, Jan. 2008, 16 pages.
EPA Report on Server and Data Center Energy Efficiency: Energy Star, accessed Dec. 15, 2008, 4 pages.
Raritan Americas; Full Speed Ahead—Directions 2007: Selling the Dominion (R) PX; 2007; 20 pages.
Report to Congress on Server and Data Center Energy Efficiency by the U.S. Environmental Protection Agency Energy Star Program, Aug. 2, 2007, 133 pages.
Server Technology, Inc. "Manage and Monitor Sentry Cabinet Power Distribution Units (CDU) and other Data Center Infrastructure Devices," Aug. 2006, Server Technology, Inc., Reno, NV, USA.
Stanley, J. R., et al., "Four Metrics Define Data Center "Greenness"," Uptime Institute, Jan. 2007, 21 pages.
Supplementary European Search Report and European Search Opinion for European Patent Application No. EP08867860, dated Nov. 11, 2013, 14 pages.
Examination Report for European Patent Application No. EP08867860, dated Nov. 17, 2016; 7 pages.
International Search Report and Written Opinion of International Application No. PCT/US2008/088376; dated Feb. 10, 2009, 10 pages.

\* cited by examiner

| Views | CDU | ▸ Reports | ▸ Config | ▸ Help |
|---|---|---|---|---|

Motors_66.214.208.94 ▸

Group or Cluster Name
Motors_66.214.208.94

| Outlet Name | Load | Power | Status | System Name | System IP |
|---|---|---|---|---|---|
| Device_2 | N/A | N/A | Off | 66.214.208.94 | 66.214.208.94 |
| Device_3 | N/A | N/A | Off | 66.214.208.94 | 66.214.208.94 |
| Device_4 | N/A | N/A | Off | 66.214.208.94 | 66.214.208.94 |

3003

Set All Outlets To: [On ▸]
On
Off
Reboot
— 3041

Apply | Cancel — 3043

User: admin
Access Administrator

Status
⊗ Critical       1
⚠ Warning        3
? Unreachable    0
☑ Normal         6
🔧 Maintenance   0

Search
CDU Name [___▾]
[Search]

Home View

Logout

FIG. 23

POWER DISTRIBUTION, MANAGEMENT, AND MONITORING SYSTEMS AND METHODS

CROSS-REFERENCE TO RELATED APPLICATION(S)

This application is a continuation of U.S. patent application Ser. No. 14/834,765, filed Aug. 25, 2015, entitled "POWER DISTRIBUTION, MANAGEMENT, AND MONITORING SYSTEMS AND METHODS, which is a continuation of U.S. patent application Ser. No. 13/949,107, filed Jul. 23, 2013, now U.S. Pat. No. 9,142,971, entitled "POWER DISTRIBUTION, MANAGEMENT, AND MONITORING SYSTEMS AND METHODS," which is a division of U.S. patent application Ser. No. 12/344,419, filed Dec. 26, 2008, now U.S. Pat. No. 8,494,661, entitled "POWER DISTRIBUTION, MANAGEMENT, AND MONITORING SYSTEMS AND METHODS," which claims the benefit of U.S. Provisional Patent Application No. 61/017,511, filed Dec. 28, 2007, entitled "POWER DISTRIBUTION UNIT WITH INPUT AND OUTPUT POWER MONITORING," U.S. Provisional Patent Application No. 61/017,495, filed Dec. 28, 2007, entitled "POWER DISTRIBUTION UNIT WITH OUTPUT CURRENT SENSING CAPABILITY," U.S. Provisional Patent Application No. 61/009,463, filed Dec. 28, 2007, entitled "REMOTE POWER MANAGER," and U.S. Provisional Patent Application No. 61/207,853 filed Dec. 2, 2008, entitled "POWER DISTRIBUTION, MANAGEMENT, AND MONITORING SYSTEMS," the disclosures of which are hereby incorporated by reference in their entireties.

This application is related to U.S. Pat. No. 5,949,974, issued Sep. 7, 1999, entitled "SYSTEM FOR READING THE STATUS AND FOR CONTROLLING THE POWER SUPPLIES OF APPLIANCES CONNECTED TO COMPUTER NETWORKS," U.S. Pat. No. 6,711,613, issued Mar. 23, 2004, entitled "REMOTE POWER CONTROL SYSTEM," and U.S. Pat. No. 8,570,652, issued Oct. 15, 2013, entitled "REMOTE POWER CONTROL SYSTEM," the disclosures of which are hereby incorporated by reference in their entireties.

TECHNICAL FIELD

The present disclosure is directed to power distribution, management, and monitoring systems, and more particularly, to systems having capability to monitor and manage power as related to one or more loads that receive power from power distribution unit(s) including loads that receive power from multiple or different power distribution units.

BACKGROUND

Power distribution units have long been utilized to supply power to electronic equipment. A conventional power-distribution unit (PDU) is an assembly of multiple electrical "outlets" (also called "receptacles") that receive electrical power from a source and distribute the electrical power via the outlets to one or more separate electronic equipment units having respective power cords plugged into respective outlets of the PDU. PDUs can also have power cords hard wired to a power source instead of, or in addition to, outlets. PDUs can be used in any of various applications and settings such as, for example, in or on electronic equipment racks, among other applications. A PDU located in a cabinet may be connected to other PDUs or to other devices such as environmental monitors, for example temperature and humidity sensors; fuse modules; communications modules; and the like. Such a PDU and any other PDUs and other devices to which it is connected are commonly enclosed within an equipment rack or equipment cabinet and collectively referred to as a Cabinet Power Distribution Unit (CDU).

Electronic equipment racks, such as standard RETMA racks, commonly comprise rectangular or box-shaped housings sometimes referred to as a cabinet or a rack and associated components for mounting equipment, associated communications cables, and associated power distribution cables. Electronic equipment is commonly mountable in such racks so that the various electronic devices are aligned vertically one on top of the other in the rack. Often, multiple such racks are oriented side-by-side, with each containing numerous electronic components and having substantial quantities of associated component wiring located both within and outside of the area occupied by the racks. Such racks commonly support equipment that is used in a computing network for an enterprise, referred to as an enterprise network.

Enterprise networks exist to support large world-wide organizations and depend on a combination of technologies, e.g., data communications, inter-networking equipment (frame relay controllers, asynchronous transfer mode (ATM) switches, routers, integrated services digital network (ISDN) controllers, application servers), and network management application software. Such enterprise networks can be used to support a large company's branch offices or campuses throughout the world, and, as such, these networks have become mission critical to the functioning of such organizations. Masses of information are routinely expected to be exchanged, and such information exchanges are necessary to carry on the daily business of modern organizations. For example, some international banks have thousands of branch offices placed throughout Europe, Asia and North America that each critically depend on their ability to communicate banking transactions quickly and efficiently with one another and with their respective headquarters.

A typical enterprise network uses building blocks of router and frame relay network appliances mounted in equipment racks. Such equipment racks are distributed to remote point of presence (POP) locations in the particular network. Each equipment rack can include frame relay controllers, routers, ISDN controllers, servers and modems, etc., each of which are connected to one or more power sources. The value of POP equipment can range from $200,000 to $500,000, and the number of individual devices can exceed a thousand.

A relatively large number of equipment racks are located in one or more data centers that act as hubs for data communications for an enterprise. Conventional network management technologies provide relatively little information related to the electrical power consumption and/or status of data centers, various equipment racks within data centers, or of particular components associated with equipment racks. Energy consumption of data centers can be a source of significant costs for an enterprise, and increasing energy efficiency of data centers could provide a significant cost savings for an enterprise.

SUMMARY

In various embodiments, systems and methods are provided that sense and output the power used by various different components and/or applications, including monitoring both the input power of a power distribution unit (PDU) and/or cabinet distribution unit (CDU) and the power output to various components powered one or more PDUs/CDUs. For example, to determine total IT Equipment Power (Watts), power for each component may be combined. The sum of all the 'power cord Watts' measures the IT Equipment Power consumed by the IT assets (assuming all IT assets are plugged into a PDUs/CDUs having the ability to measure Watts).

In an aspect of the present disclosure, provided is a power management system, comprising (i) a communications interface that sends/receives communications to/from at least two cabinet distribution units (CDUs), the communications received from the CDUs including power usage data for each of two or more electrical outputs within each CDU; (ii) a memory that stores information related to electrical components that receive power from one or more of the electrical outputs; and (iii) a controller interconnected to the communications interface and memory that receives the power usage data from the CDUs, determines power that is consumed by one or more of the electrical components, outputs information related to power that is consumed by one or more of the electrical components, and communicates with the CDUs through the communications interface to control current flow through one or more selected outlets.

The communications interface, in one embodiment, sends/receives communications to/from the CDUs through TCP/IP with a unique IP address for each CDU. In an aspect, the memory comprises information related to at least a first electrical component that receives power from at least a first and a second electrical output, the first output located at a first CDU and the second output located at a second CDU. The controller in such an aspect determines power that is consumed by the first electrical component by combining power usage data for the first and second outputs of the first and second CDUs. The memory may also include information related to at least a first application that runs on a plurality of electrical components that receive power from a plurality of different CDUs, and the controller determines power that is consumed by the plurality of electrical components that are running the first application by combining power usage data for the power outputs of the plurality of electrical components.

The memory, in various embodiments, comprises: (i) a system table structured for data descriptive of a power distribution system; (ii) a tower table structured for data descriptive of outputs, CDUs and other elements in the power distribution system; (iii) an infeed table structured for data descriptive of electrical power provided to the CDUs; and (iv) an outlet table structured for data descriptive of electrical power flowing through various outputs. In other embodiments, the communications interface receives communications related to one or more environmental sensors located in one or more CDUs, and the memory further comprises an environmental table structured for data descriptive of environmental parameters associated with the environmental sensors. In other embodiments the memory further comprises a clusters table structured for data descriptive of output clusters that include outputs located in two or more different CDUs that provide power to one electrical component or one application. The clusters table may comprise a table structured for cluster identifiers, and a table structured for data correlating outlets with clusters.

Another aspect of the disclosure provides a method of managing electrical power usage in a power distribution system that includes a plurality of electrical outlets, the method comprising: (i) collecting power usage data indicative of electrical current flow through each of a plurality of the electrical outlets in the system; (ii) correlating the power usage data with electrical components that receive power from each of the plurality of electrical outlets; (iii) outputting power usage data for each of the electrical components; (iv) receiving a command to control current flow through a selected outlet; and (v) controlling current flow through the selected outlet responsive to the command. Controlling current flow through an outlet may be accomplished by turning the outlet on or off. The method may also include receiving a user-initiated command to reboot control circuitry associated with an electrical component that receives power from one or more of the outlets and rebooting the control circuitry responsive to the command. In some embodiments, the method includes collecting environmental data indicative of environmental conditions of the electrical outlets, and outputting the environmental data. The environmental data may comprise temperature and humidity. In other embodiments, the method further comprises generating a report descriptive of a power usage trend. In still further embodiments, the method further comprises assigning each outlet in any one location to a cabinet distribution unit (CDU) in that location, associating at least one unique IP address with each location having one or more CDUs, and collecting power usage data respecting an outlet by communicating via the Internet with the IP address associated with the CDU containing that outlet. The method may also comprise assigning a plurality of outlets in a CDU having one IP address and a plurality of outlets in a CDU having another IP address to a cluster; displaying a status of the cluster; receiving a user-initiated command to control current flow through all outlets in a cluster selected by the user; and controlling current flow through all outlets in the user-selected cluster responsive to the command.

Also described herein are several exemplary embodiments of power outlet modules and methods for distributing power to one or more electronic components, such as electronic components mounted within an electronic equipment rack. The power outlet modules can include outlets, which may include plug type outlets, to which power cords of electronic equipment can be coupled and through which power is transmitted from the power outlet modules to the electronic equipment. As used herein, the terms "outlet" and "receptacle" may be used interchangeably. In some embodiments, the power outlet modules include power monitoring components located at one or more outlets. The power monitoring components may report the power that is delivered to individual electronic components through the attached power cord at a respective outlet. In other embodiments, the power outlet modules include power monitoring components at the input power source, and at one or more outlets.

The power monitoring components, in various embodiments, include toroids interconnected with one or more outlets of a power distribution unit. The toroids provide information related to the current that is being conducted through a particular outlet. The current information, along with voltage and phase information, may be used to determine the power this is being consumed through the output. In some embodiments, each toroid in a power distribution unit is interconnected with a power reporting circuit that is interconnected to a power distribution unit. The power reporting circuit may, however, be included in a power outlet module. In any event, the controller may provide power consumption information related to one or more of the outlets of the power outlet module to other external components and systems.

It is to be understood that the foregoing is a brief description of various aspects of various embodiments. It is therefore also to be understood that the scope of the invention is to be determined by the claims as issued and not by whether given subject matter includes any or all such features or advantages or addresses any or all of the issues noted herein.

In addition, there are other advantages and varying novel features and aspects of differing embodiments. The foregoing and other features and advantages will become more apparent from the following detailed description, which proceeds with reference to the accompanying figures.

BRIEF DESCRIPTION OF THE DRAWINGS

FIG. 23 is a screen shot of a group or cluster name screen.

DETAILED DESCRIPTION

Embodiments of power distribution, monitoring, and management systems are described herein. Embodiments of such systems include a power distribution plugstrip, power distribution unit (PDU), and cabinet distribution unit (CDU) with power determination and monitoring capability. The present disclosure recognizes that capability to determine the power being delivered to a power distribution apparatus, and to determine the power being delivered from the power distribution apparatus to one or more electrical loads can enable efficient determination of power usage for various different components that are associated with a facility, and therefore provide ability to manage power to the various different components. In many cases, numerous PDUs and/or CDUs may be located in a facility, with each supplying power to several different electrical loads. Knowledge of power being delivered to various equipment in a facility may be used to evaluate, improve, and manage power consumption in a facility and across multiple facilities, such as data centers.

Such management of power may improve efficiency of power consumption at data centers as measured by one or more power usage metrics. One available measure of power usage efficiency for data centers is provided through a metric known as Power Usage Effectiveness (PUE) and Data Center Efficiency (DCE). Such metrics enable data center operators to estimate the energy efficiency of their data centers, compare the results against other data centers, and determine if any energy efficiency improvements may be desirable.

Data center power and cooling are two significant issues facing IT organizations, and many entities desire to control these costs while enabling future expansion. With more energy efficient data centers, enterprises and/or IT organizations can better manage increased computing, network, and storage demands, lower energy costs, and reduce total cost of ownership (TCO).

Figure 1:
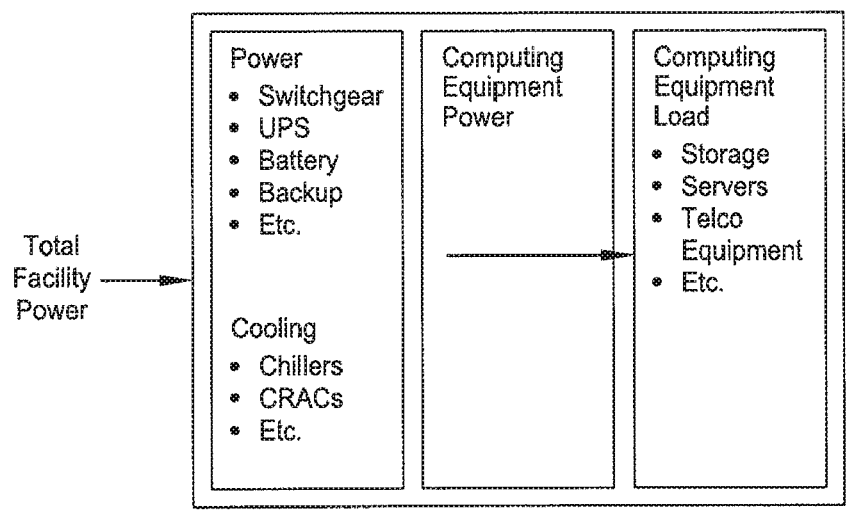
FIG. 1 is a block diagram illustration of equipment related to a data center.

As mentioned above, metrics may be used to determine information related to data center power usage, including PUE and DCE. Both of these metrics provide a relationship between equipment power and total facility power. Total facility power is used to refer to the total power that is consumed by a data center. In the event that a data center is housed in a building that houses other functions addition to a data center or that houses more than one data center, the total facility power is the power that is used by the data center that is of interest rather than the power consumed by other uses than the data center of interest. FIG. 1 illustrates computing equipment that may contribute to total facility power. The PUE is defined as follows:

PUE=(Total Facility Power)/(Computing Equipment Power)

The DCE is the reciprocal of the PUE, and is defines as follows:

DCE=(Computing Equipment Power)/(Total Facility Power)

With continuing reference to FIG. 1, the computing equipment power is the power required to operate the data center equipment that is used to manage, process, store and/or route data within a data center. This includes the load associated with equipment, such as computer, storage, and network equipment, along with supplemental equipment such as KVM switches, monitors, and workstations used to monitor or otherwise control the data center. Total facility power is used to refer to everything that supports the data center equipment load such as power delivery components, cooling system components, computer nodes, network nodes, and storage nodes, and other component loads such as data center lighting and other ancillary equipment. Power delivery components include various components, such as UPS, switch gear, generators, PDUs, batteries, and distribution losses external to the IT equipment. Cooling system components can also include various components such as chillers, computer room air conditioning units (CRACs), direct expansion air handler (DX) units, pumps, and cooling towers.

The PUE and DCE metrics provide a way to determine opportunities to improve data center operational efficiency, how a particular data center compares with other data centers, and opportunities to repurpose energy for additional computing equipment, to name but a few. While both of these metrics are related, they can be used to illustrate the energy allocation in a data center differently. For example, if a PUE is determined to be 3.0, this indicates that the data center demand is three times greater than the energy necessary to power the computing equipment located within the data center. In addition, the ratio can be used as a multiplier for calculating the real impact of power demands. For example, if a server demands 500 watts and the PUE for the datacenter is 3.0, then the power from the utility grid needed to deliver 500 watts to the server is 1500 watts. The DCE, in comparison, may provide a different aspect of this information, a DCE value of 0.33 (equivalent to a PUE of 3.0) suggesting that the computing equipment consumes 33% of the power in the data center. As will be readily observed, PUE can range from 1.0 to infinity, with a PUE value of 1.0 indicating 100% efficiency (i.e., all power used by computing equipment only), and a large PUE indicating that computing equipment uses a relatively small amount of the total power entering the data center.

In FIG. 1, total facility power is measured at or near the facility utility meter(s) to accurately reflect the power entering the data center. This represents the total power (for which the utility charges) consumed in the data center. In order to obtain accurate and meaningful power information, the data center power is either measured or otherwise calculated because power not intended to be consumed in the data center would result in inaccurate PUE and DCE metrics. For example, if a data center resides in an office building, total power drawn from the utility will be the sum of the total facility power for the data center and the total power consumed by the non-data center offices. In some situations, the total facility power for a particular data center is required to be estimated or measured in another manner than through a utility power meter. Computing equipment power should be measured after all power conversion, switching, and conditioning is completed, and before the computing equipment itself, in order to gain meaningful information. In various embodiments disclosed herein, power delivered to computing equipment is measured at the output of the computer room power distribution units (PDUs).

Within a data center, it also may be desirable to measure data center performance. One metric that may be used to measure data center performance is referred to as Data Center Performance Efficiency (DCPE). The DCPE is defined as:

DCPE=(Useful Work)/(Total Facility Power)

This metric effectively defines the data center as a box and a net amount of useful work is done by the box.

Additionally, additional granularity may be desired related to power usage within a data center. For example, a PUE metric may be broken down into the following: PUE=Cooling Load Factor (CLF)+Power-Load Factor (PLF)+1.0. All factors are ratios that are divided by the computing equipment load and 1.0 represents the normalized computing equipment load. Cooling Load Factor (CLF) is the total power consumed by chillers, cooling towers, computer room air conditioners (CRACs), pumps, etc., normalized by the computing equipment load. The Power Load Factor (PLF) is the total power dissipated by switch gear, uninterruptible power supplies (UPSs), power distribution units (PDUs), etc., normalized by the computing equipment Load.

Individual components may be measured in order to determine various information related to power efficiency metrics. In various embodiments described herein, equipment power is determined for various individual components, and this information provided to determine power usage related to that equipment. In various embodiments, a PDU is provided that senses and outputs the power used by various different components, including monitoring both the input power of the PDU and the power output to various components powered by the PDU. For example, to determine total computing equipment power (Power is (Volts× Amperes) or Watts) a PDU may measure Watts for each input cord to the PDU(s), or the input power at various subcomponents that provide power to one or more pieces of computing equipment. The sum of all the power output to pieces of equipment measures the total computing equipment power consumed by the computing equipment assuming all computing equipment assets are plugged into a PDU having the ability to measure power.

In other embodiments, an individual piece of computing equipment efficiency is determined according to MIPS/ Watts. MIPS, as is well known, is Million Instructions Per Second, and is a measure of the speed of execution of a processor. Thus, a performance efficiency for a server, for example, may be measured and a cumulative efficiency calculated for all equipment in a data center. In embodiments that provide such metrics, each outlet measures power that is delivered from the outlet. The MIPS value may be read, for example, from the BIOS for the specific asset and provide a measure of performance efficiency. The sum of all the 'per outlet Watts' on a PDU may be used to measure the PDU's efficiency when compared to the input cord power to the PDU. In some embodiments, an individual piece of equipment may receive operating power from multiple power supplies. In such embodiments, the outlets that provide power to the piece of equipment are grouped with power from each outlet summed to provide the corresponding power measurement for the specific asset that is acquiring it power from multiple PDUs or multiple power supplies. Other embodiments provide the ability for an expense charge for the power consumed by each specific asset, and each outlet may record the amount of power used (Watts/ hours) in the same manner as a utility meter.

Figure 2:
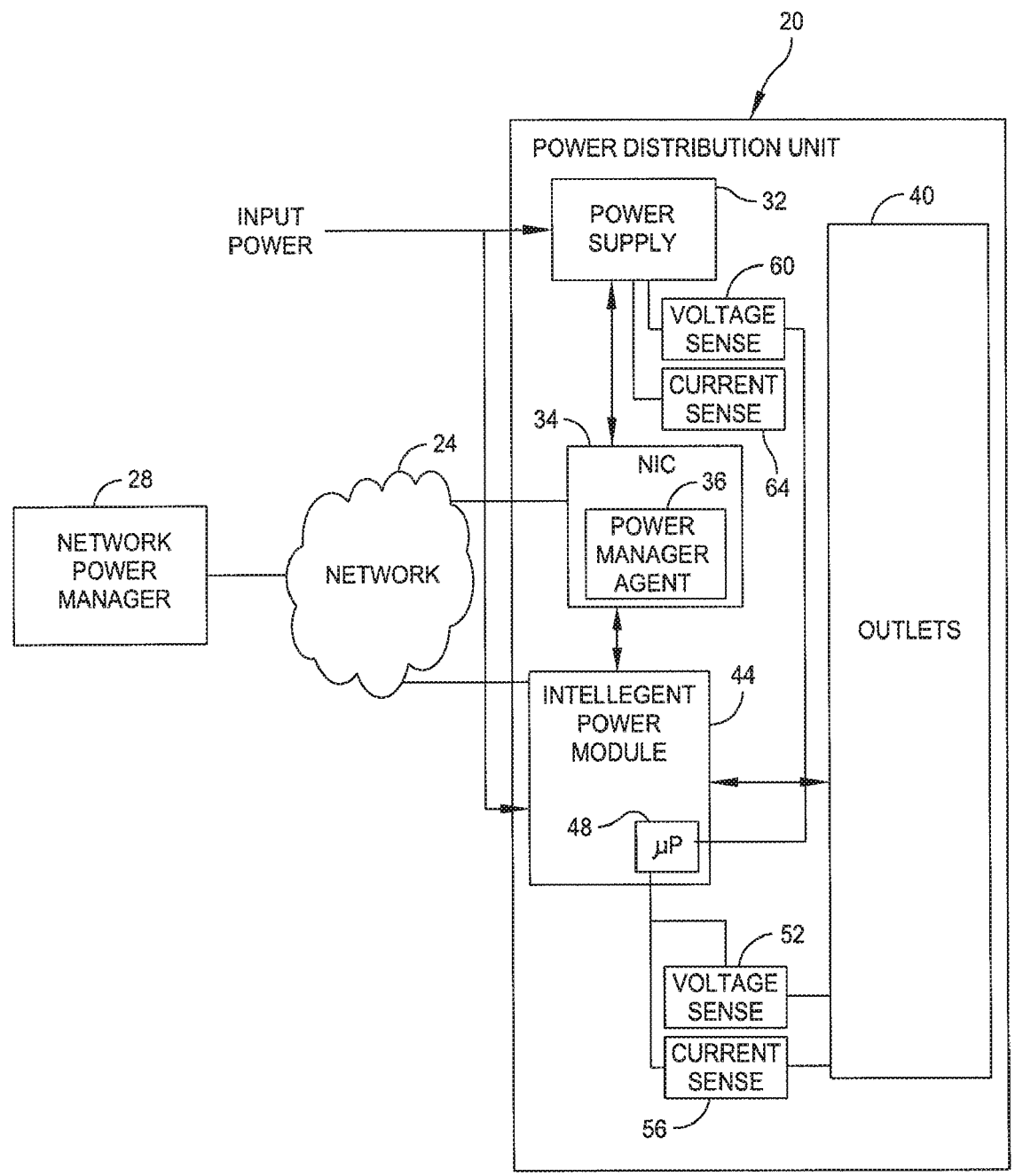
FIG. 2 is a block diagram illustration of a system of an exemplary embodiment of the present disclosure.

With reference now to FIG. 2, a block diagram of an exemplary system of an embodiment is now described. A power distribution unit (PDU) 20 is provided that supplies power to one or more associated computing assets. The PDU 20 may be a stand-alone device or incorporated with other components or modules to form a cabinet distribution unit (CDU) which includes, for example, fuse modules, environmental monitors, communications modules, other PDUs, etc. The PDU is useable in a computer network 24, and may communicate over the computer network 24 with a network power manager application 28. In cases where the PDU 20 is included in a CDU, communication with network power manager 28 is conducted through a communications module within the CDU. The network power manager 28 may reside in a workstation or other device that is used in the management of a data center or other enterprise management, and issues network commands over a network communications connection. The PDU 20 of this embodiment includes a power supply 32, a network interface card (NIC) 34 that has application firmware and hardware that interfaces to network the PDU 20 with other modules within a CDU, and in this embodiment includes a power manager agent application 36. The PDU 20 includes a plurality of power outlets 40 arranged in a power distribution plugstrip, and an intelligent power module (IPM) 44. The IPM 44, NIC 34, and power manager agent 36 are connected to the computer network 24. The intelligent power module 24 controls the application of power from the input power to a corresponding power outlet among the power outlets 40, and is in communication with the power manager agent application 36 to provide power and power cycling on-off for one or more of the corresponding power outlets. The IPM 44 may also provide power state sensing and/or load-sensing with respect to the corresponding power outlet in response to one or more commands. The IPM 44 in this embodiment includes a microprocessor 48 used to control the power applied to a corresponding power outlet. The microprocessor also is connected to a voltage sensing device 52 and a current sensing device 56 to sense the voltage and current at corresponding individual power outlet(s). The microprocessor 48 uses this information to determine the power supplied to an outlet, as will be described in more detail below. The microprocessor 48 also receives a power measurement from the input power supply 32 through an input voltage sensing device 60 and an input current sensing device 64.

Figure 3:
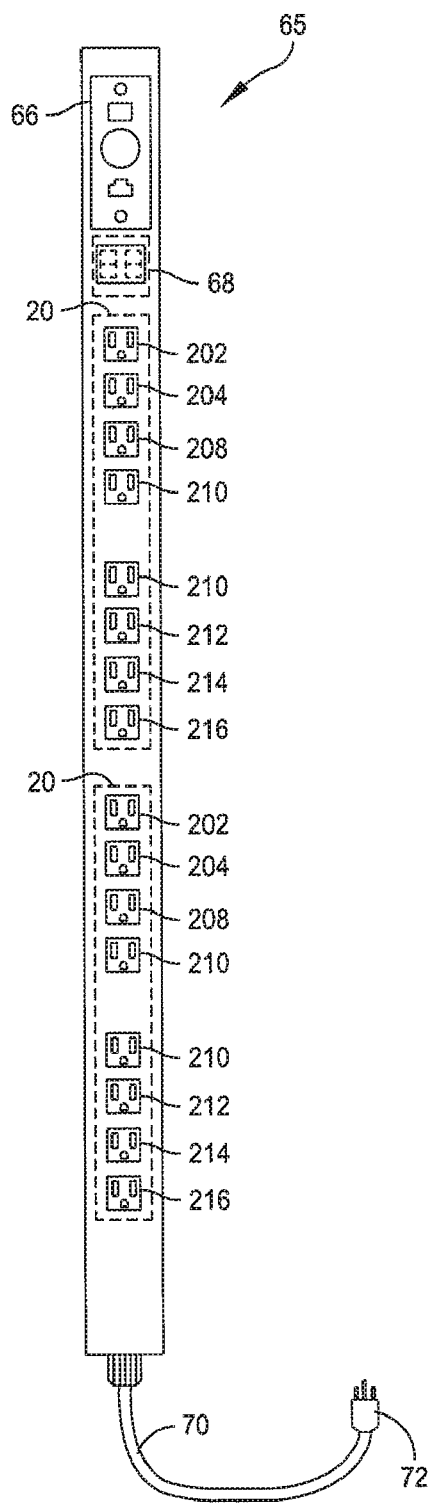
FIG. 3 is a block diagram illustration of an input current and voltage sensing system of an exemplary embodiment.

The network power manager 28 of FIG. 2 communicates with the power manager agent 36 and IPM 44. The network power manager 28 may receive information from, and provide instructions to, the IPM 44 and power manager agent 36. The network power manager 28 may also receive related power measurements from the IPM 44 and report power information related to the PDU 20, and related to one or more individual outlets (and thus power information for individual assets powered by the outlet) of the PDU 20. FIG. 3 is an illustration of a CDU 65 that includes PDUs 20, along with a communications module 66 that provides communications functions, an environmental monitor 68, and an input power cord 70 with associated plug 72. The PDUs 20 each include eight outlets 202-216 that supply power to assets that may be mounted into an equipment rack. Such equipment racks are well known, and often include several individual assets that are used in operation of a data center. The CDU 65, as illustrated in FIG. 3, is configured to be vertically mounted in an equipment rack. As is well known, numerous equipment racks may be included in a data center, and in various embodiments each asset in each equipment rack may be monitored for power usage through one or more associated PDUs 20.

Figure 4:
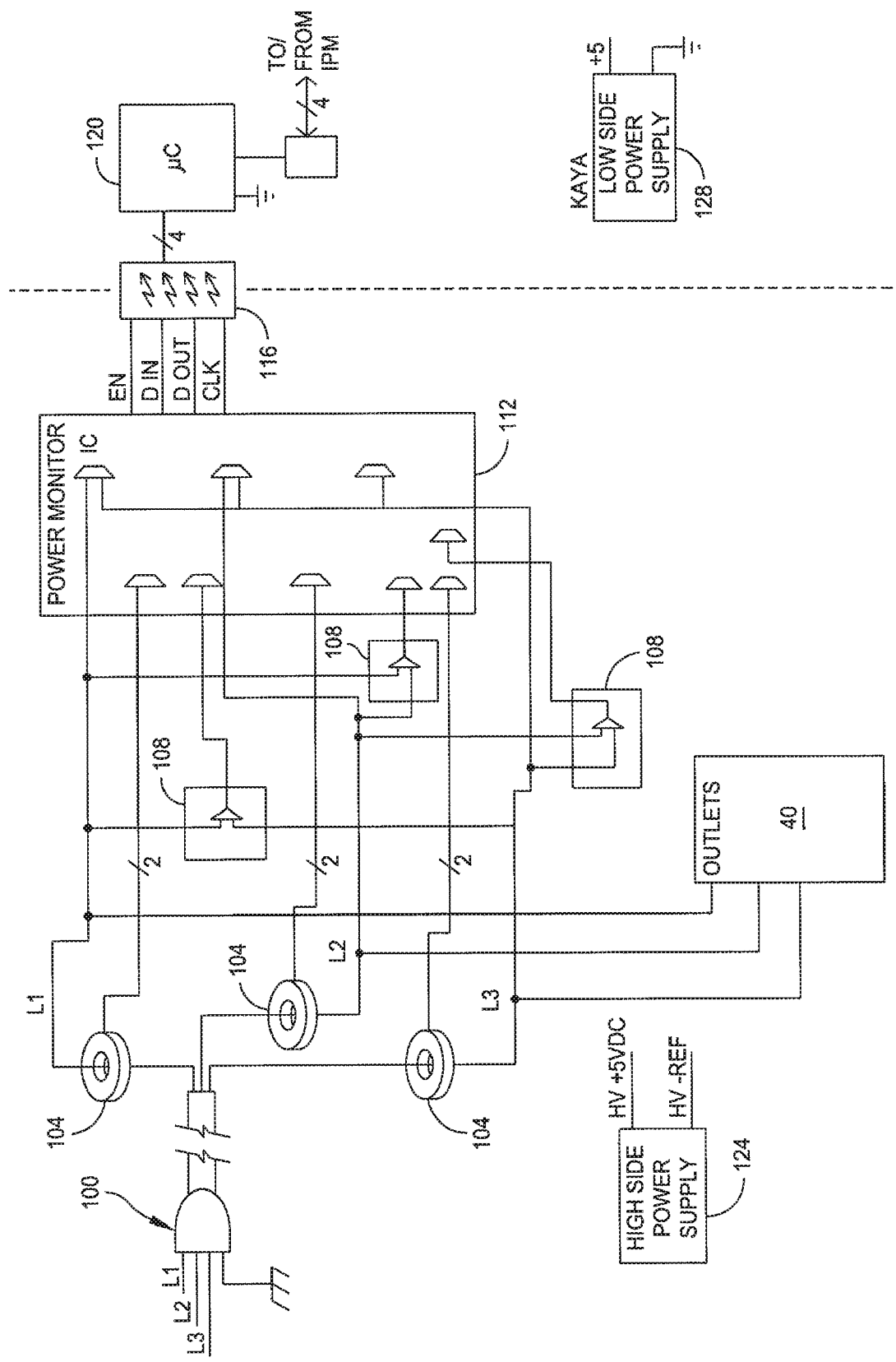
FIG. 4 is a block diagram illustration of an input current and voltage sensing system of another exemplary embodiment.

With reference now to FIG. 4, a block diagram illustration of an input power sensing system is described for an exemplary embodiment. An input power source 100 can be either single or polyphase, with a polyphase three-phase power input illustrated in FIG. 4. Toroidal transformers 104 are located such that a power lead (L1, L2, and L3) from each of the three phases is routed through a toroidal transformer 104, and provide current sensing to output a present current level for the associated power lead L1, L2, and L3. These toroidal transformers 104 are electrically attached at voltage taps 108 between the phases that are connected to an power measurement circuit 112. The voltage taps 108 include a resistor divider and an amplifier to determine a line voltage for the particular phase that is provided to the power measurement circuit 112. The power measurement circuit 112, in an exemplary embodiment, includes a serial output 116 that is in optical isolated communication with a microcontroller 120 that will communicate power information from the power measurement circuit 112, via a communications bus to a network communications board within the IPM. The IPM then makes this information available to a remote or local user via a network power manager. In one embodiment, isolation is required between the energy measurement chip 112 that is referenced to line voltage, and the microcontroller 120, that is required to be referenced to non-hazardous voltage. In this embodiment, a high side power supply 124 and a low side power supply 128 supply power to respective sides of the isolation, and are isolated from each other.

Figure 5:
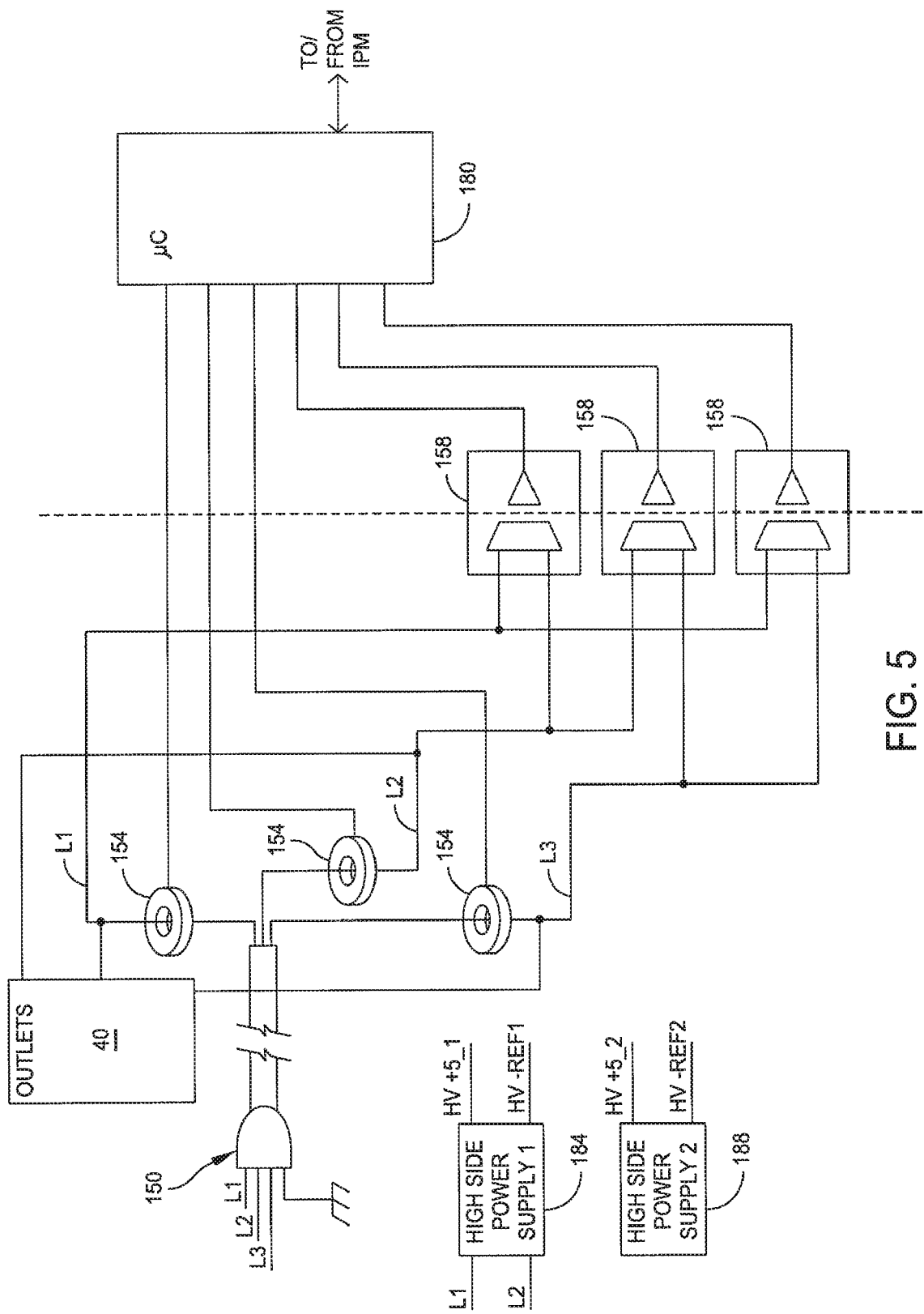
FIG. 5 is a block diagram illustration of a per output current and voltage sensing system of an exemplary embodiment.

Referring now to FIG. 5, another exemplary embodiment of an input power monitor is described. This embodiment provides a discrete digitized solution. A power source 150 can be either single or polyphase, with a three-phase polyphase power supply illustrated. A torroidal transformer 154 is located such that a power lead (L1, L2, and L3) from each of the three phases is routed through the toroidal transformer 154, and provide current sensing. These toroidal transformers 154 along with voltage taps 158 between the phases are connected to a single microcontroller 180 that performs the power calculation operations. In the illustrated embodiment, isolation of the line side (high voltage) sensing circuits from the low voltage microcontroller 180 is provided, such that user accessible communications ports do not have high voltages present. This isolation is provided by the isolation amplifiers within voltage taps 158. A first high side power supply 184 and a second high side power supply 188 supply power to respective components on the line side of the isolation.

Figure 6:
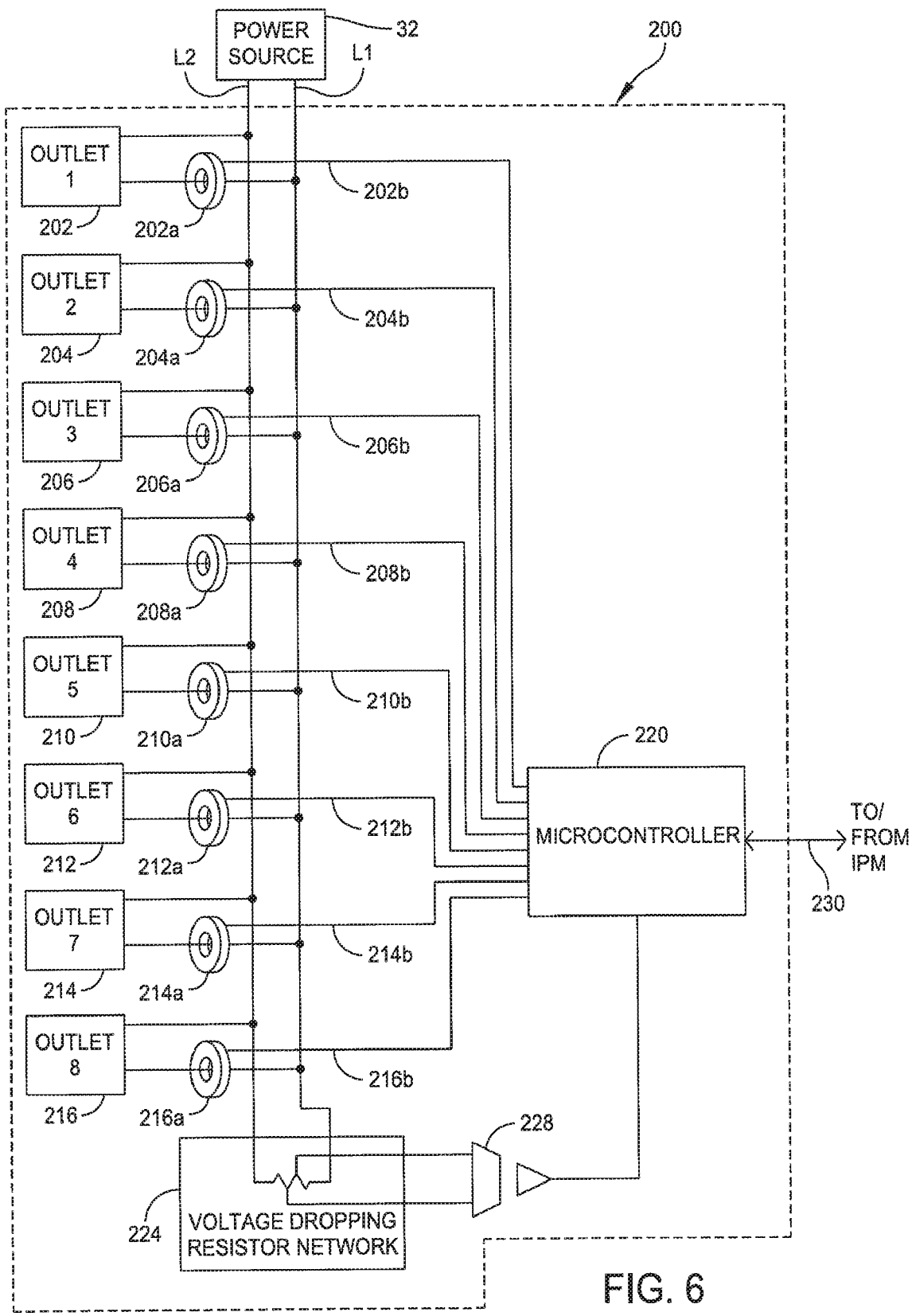
FIG. 6 is a block diagram illustration of a per output current and voltage sensing system of another exemplary embodiment.

With reference now to FIG. 6, a block diagram illustration of output power reporting components is now described for an exemplary embodiment. In this embodiment, the PDU includes a power outlet plugstrip 200, also referred to as a power outlet module 200, that includes eight power outlets, 202-216. Each outlet 202-216 is connected to power lines L1 and L2 and to power source 32. In this embodiment, the power line L1 from power source 32 is connected to line power in the power source 32, and the power line L2 is connected to neutral in the power source 32. Each outlet 202-216 is also interconnected to a ground in the power source 32, although this line connection from the outlets 202-216 is not illustrated in FIG. 6. Each outlet 202-216, in this embodiment, has an associated torroidal transformer 202a-216a that is used to sense the current that is flowing through the line L1 for each respective outlet 202-216. The line L1 interconnected to each outlet 202-216 is wired through the respective toroid 202a-216a. The torroidal transformers 202a-216a each have a current reporting line 202b-216b that provides instantaneous current information related to the respective toroidal transformer 202a-216a to microcontroller 220. The microcontroller 220 receives this current information related to each respective outlet 202-216. The power outlet module 200 also includes a line voltage detector that includes a voltage dropping resistor network 224, and an opto-isolated operational amplifier 228, and provides in indication of instantaneous line voltage for the power source 32. The line voltage detector, in other embodiments, includes a voltage sense transformer that provides isolation and allows voltage to be determined based on the voltage across the transformer and the turns ratio of the transformer. The microcontroller uses the current information related to each of the respective outlets 202-216, along with the line voltage to calculate the power being consumed through the individual outlets 202-216. This information may be communicated to the IPM and/or other components through communications link 230 through, for example, a communications bus.

In one embodiment, the power outlet module 200 includes eight outlets (202-216) each of NEMA 5-20R type, contained in a housing. It will be understood that this embodiment, and other embodiments described herein as having NEMA 5-20R type outlets, are exemplary only and that any of various other types of outlets alternatively can be used. For example, the "outlets" can be other NEMA types (e.g., NEMA 5-15R, NEMA 6-20R, NEMA 6-30R or NEMA 6-50R) or any of various IEC types (e.g., IEC C13). It also will be understood that all the "outlets" in a particular power outlet module 200, or other module-outlet described herein, need not be identical. It also will be understood that the "outlets" are not limited to three-prong receptacles; alternatively, one or more of the "outlets" can be configured for two or more than three prongs in the mating male connector. It also will be understood that the "outlets" are not limited to having female prong receptacles. In any "outlet," one or more of the "prong receptacles" can be male instead of female connection elements, as conditions or needs indicate. In general, as used herein, female and male "prong receptacles" are termed "power-connection elements." Furthermore, the principles described herein also are applicable to devices that may be hard-wired into an outlet module. While outlet module 200 of this embodiment includes eight outlets, it will be understood that this is but one example and that an outlet module may include a different number of outlets.

The housing for an outlet module may be any suitable housing for such a device, as is known to one of skill in the art, and illustrated, for example in FIG. 3. Such a housing generally includes a front portion and a rear portion, the front portion is substantially planar, and the rear portion is substantially planar and parallel to the front portion. The housing also includes longitudinally extending side portions and transverse end portions. The front portion, rear portion, side portions, and end portions are generally orthogonal to each other in a generally rectangular or box-type configuration. The housing can be made of any suitable, typically rigid, material, including, for example, a rigid polymeric ("plastic") material. In at least certain embodiments, the front and rear portions are made from an electrically insulative material. The side portions and the end portions may be integrally formed, optionally along with the front portion or the rear portion. Furthermore, while the outlet module described in this embodiment includes a housing, other embodiments may include an outlet module that does not include a housing. For example, an outlet module may include a number of outlets coupled together with no exterior housing that may then be installed into another piece of equipment.

Each outlet 202-216 is interconnected to the power source 32 through any of a number of well known connection schemes, such as spade, lug, plug connectors, screw connectors, or other suitable type of connector. Furthermore, if desired, one or more of these electrical connectors can be located inside the housing or outside the housing, in embodiments where the power outlet module includes a housing.

The microcontroller 220, in an embodiment, receives information for each outlet 202-216, along with voltage information and calculates power output per outlet, with this information reported through the communications link 230. The power per outlet is determined by multiplying the instantaneous voltage by the instantaneous current for a particular outlet, and integrating this product against time to give energy used (kilowatt hours, etc.) In an embodiment, the microcontroller computes the RMS watts for each respective outlet 202-216 by multiplying the RMS voltage by the RMS current. RMS current and voltage, in an embodiment, are calculated per AC cycle. In this embodiment, the microcontroller 220 includes eight current input channels, one per outlet, which are electrically connected to the toroidal transformers. In this embodiment, the microcontroller includes ADC inputs that digitize the analog signal from toroidal transformers 202a-216a. The microcontroller 220 then performs power computations based on the ADC input for a particular output and the voltage information.

Figure 7:
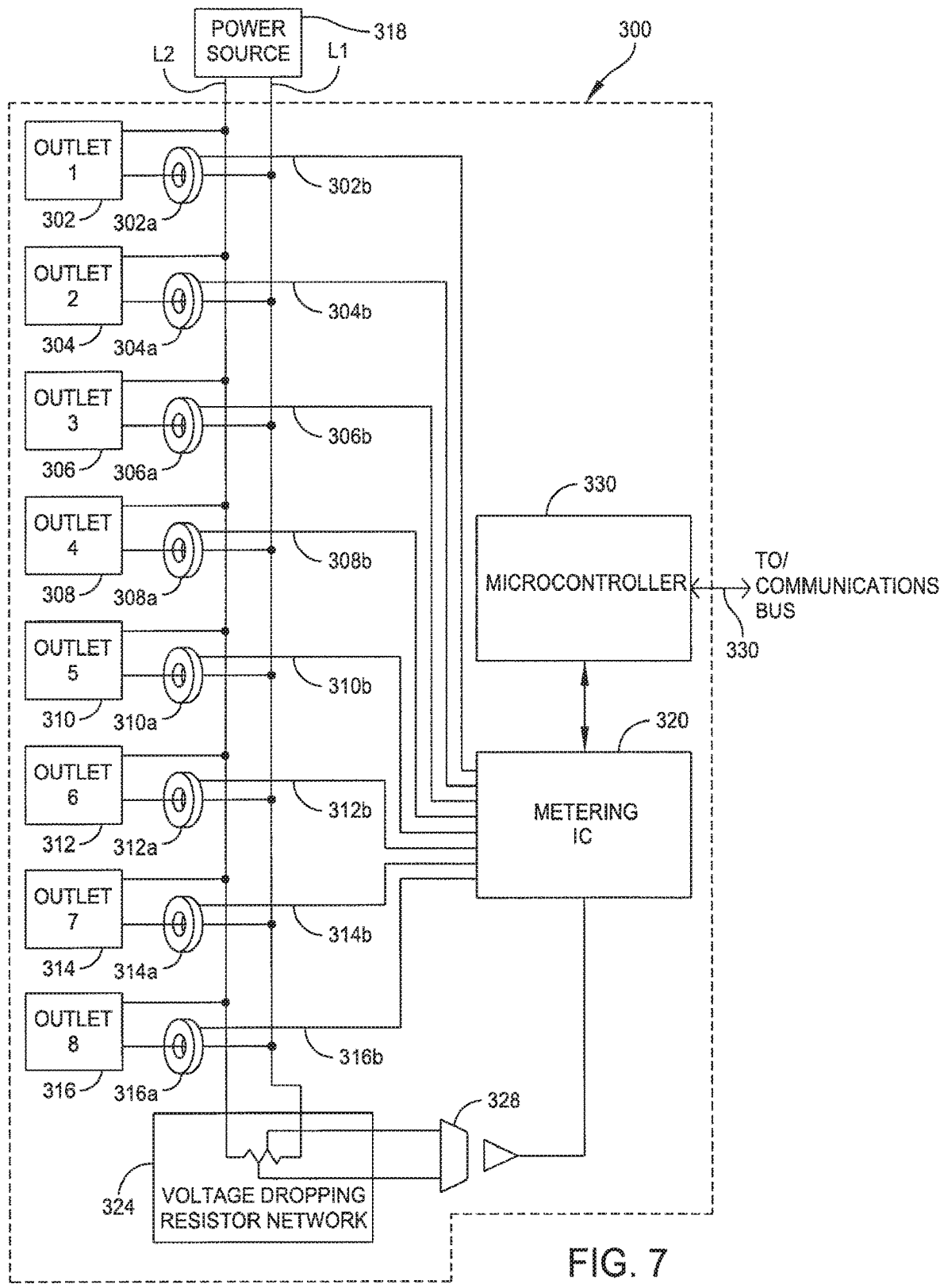
FIG. 7 is a block diagram illustration of a per output current and voltage sensing system of another exemplary embodiment.

With reference now to FIG. 7, a block diagram illustration of a power outlet module 300 with associated power reporting components is now described for another exemplary embodiment. Similarly as in the embodiment of FIG. 6, the power outlet module 300 of the embodiment of FIG. 7 includes eight power outlets, 302-316. Each outlet 302-316 is connected to power lines L1 and L2 and to power source 318. Power source 318 may be, for example, a standard 120V power feed, or may be a particular phase of a polyphase power source. In one embodiment, the power line L1 from power source 318 is connected to line power in the power source 318, and the power line L2 is connected to neutral in the power source 318. Each outlet 302-316 is also interconnected to a ground in the power source 318, although this line connection from the outlets 302-316 is not illustrated in FIG. 7. Each outlet 302-316, in this embodiment, has an associated toroidal inductor 302a-316a that is used to sense the current that is flowing through the line L1 for each respective outlet 302-316. The line L1 interconnected to each outlet 302-316 is wired through the respective toroidal inductor 302a-316a. The toroidal inductors 302a-316a each have a current reporting line 302b-316b that provides instantaneous current information related to the respective toroidal inductor 302a-316a to metering integrated circuit 320. The metering integrated circuit 320 receives this current information related to each respective outlet 302-316. The power outlet module 300 also includes a line voltage detector that includes a voltage dropping resistor network 324, and an opto-isolated operational amplifier 328, and provides in indication of instantaneous line voltage for the power source 318 to the metering integrated circuit 320. Similarly as described above, the line voltage detector in other embodiments includes a voltage sense transformer that provides isolation and allows voltage to be determined based on the voltage across the transformer and the turns ratio of the transformer. The metering integrated circuit 320 uses the current information related to each of the respective outlets 302-316, along with the line voltage to calculate the power being consumed through the individual outlets 302-316. This information is transferred to a microcontroller 330, which may communicate with other external components through communications link 332 through, for example, a communications bus. Each of the outlets 302-316, similarly as in the embodiment of FIG. 6, may be connected to the power source 32 through electromechanical relays, with each operable to monitor and/or control the power transmitted to a respective individual outlet.

In the embodiment of FIG. 7, a metering integrated circuit 320 is connected to each of the toroidal inductors 302a-316a and the voltage dropping resistor network 324 and operational amplifier 328. The metering integrated circuit 320 performs various power calculations for each outlet based on RMS current and voltage values. The metering integrated circuit 320 provides this information, in the form of RMS power information, to microcontroller 330. In this manner, discrete components are used for determining power consumption of each outlet and for providing this information to various external components. Such an embodiment may be desirable in applications where specific metering requirements are desired and a metering integrated circuit that is specifically designed for power metering provides such requirements. For example, the power outlet module 300 may be installed into a PDU system that provides power to a number of different electronic components that are used in a computing network. In some applications, for example, the cost for providing power to a specific component may be billed to an entity. In such applications, it may be desirable to have a dedicated metering integrated circuit to provide power consumption data. It also may be desirable for computing network managers, such as information technology (IT) personnel, to monitor the power used by various different individual components, and the described power outlet modules may provide such reporting functionality.

The metering integrated circuit 320, in this embodiment, receives information for each outlet 302-316, along with voltage information and calculates power output per outlet, with this information reported to the microcontroller 330. The microcontroller receives this information, and through the communications link 332, provides the power consumption information for the specific outlets. The metering integrated circuit may determine power per outlet according to one of a number of different algorithms. For example, power may be determined as the product of the instantaneous voltage and the instantaneous current integrated against time for a particular outlet, or power may be computed using a compensation scheme that corrects for phase differences in received signals.

Figure 8:
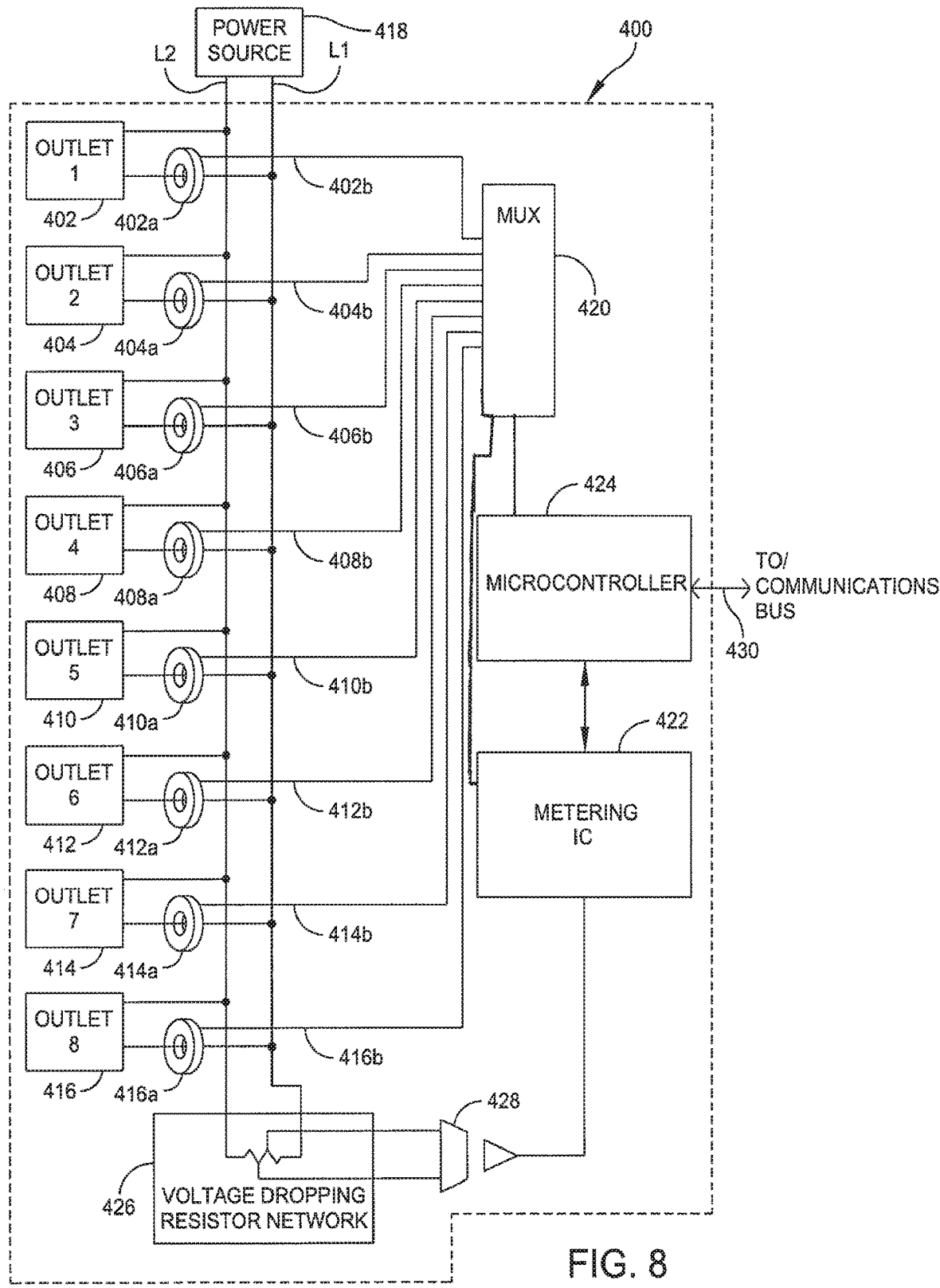
FIG. 8 is a schematic illustration of an output circuit of an exemplary embodiment.

With reference now to FIG. 8, a block diagram illustration of a power outlet module 400 with associated power reporting components is now described for yet another exemplary embodiment. In this embodiment, similarly as in the embodiments of FIGS. 6-7, the power outlet module 400 includes eight power outlets, 402-416. Each outlet 402-416 is connected to power lines L1 and L2 and to power source 418. Power source 418 may be, for example, a standard 120V power feed, or may be a particular phase of a polyphase power source. In one embodiment, the power line L1 from power source 418 is connected to line power in the power source 418, and the power line L2 is connected to neutral in the power source 418. Each outlet 402-416 is also interconnected to a ground in the power source 418, although this line connection from the outlets 402-416 is not illustrated in FIG. 8. Each outlet 402-416, in this embodiment, has an associated toroidal inductor 402a-416a that is used to sense the current that is flowing through the line L1 to each respective outlet 402-416. The line L1 interconnected to each outlet 402-416 is wired through the respective toroidal inductor 402a-416a. The toroidal inductors 402a-416a each have a current reporting line 402b-416b that provides instantaneous current information related to the respective toroidal inductor 402a-416a to a multiplexer 420. The multiplexer 420 receives this current information related to each respective outlet 402-416, and provides information from one of the outlets to a metering integrated circuit 422. A microcontroller 424 provides a multiplexer control signal to the multiplexer 420 that determines which of the outlets 402-426 the multiplexer 420 outputs, and the metering integrated circuit 422 receives the current information for the outlet selected by the microcontroller 424. The power outlet module 400 also includes a line voltage detector that includes a voltage dropping resistor network 426, and an opto-isolated operational amplifier 428, and provides in indication of instantaneous line voltage for the power source 418. The metering integrated circuit 422 uses the current information related to the outlet that is being output by the multiplexer 420 along with the line voltage to calculate the power being consumed through the selected outlet 402-416. This information is communicated to the microcontroller 424 that then may report the information to other, external, components through a communications line 430 to a communications bus. Each of the outlets 402-416, while not illustrated in FIG. 7, may be connected to the power source through electromechanical relays, with each operable to monitor and/or control the power transmitted to a respective individual outlet.

The power outlet module 400 may be installed into a PDU system that provides power to a number of different electronic components that are used in a computing network. It may be desirable for computing network managers, such as information technology (IT) personnel, to monitor the power used by various different individual components, and the described power outlet modules may provide such reporting functionality. The power per for the selected outlet is determined by multiplying the instantaneous voltage by the instantaneous current for a particular outlet, and integrating this product against time to give energy used (kilowatt hours, etc.) In an embodiment, the microcontroller computes the RMS watts for each respective outlet 402-416 by multiplying the RMS voltage by the RMS current.

With reference now to FIGS. 9-13, schematic diagrams of another exemplary embodiment are now discussed. In this embodiment, various different components of an outlet module may be assembled onto separate circuit boards that are then assembled into a power outlet module. In such a manner, component boards may be assembled to include features that are ordered by a particular customer or user of a PDU in which the outlet module will be used. Furthermore, a user or customer may desire some, but not all, of the outlets in a PDU to have the capability of reporting power usage related to individual outlets, and thus different outlet modules, or subsets of outlets in a outlet module, may be assembled with the additional component boards to provide such capability.

Figure 9:
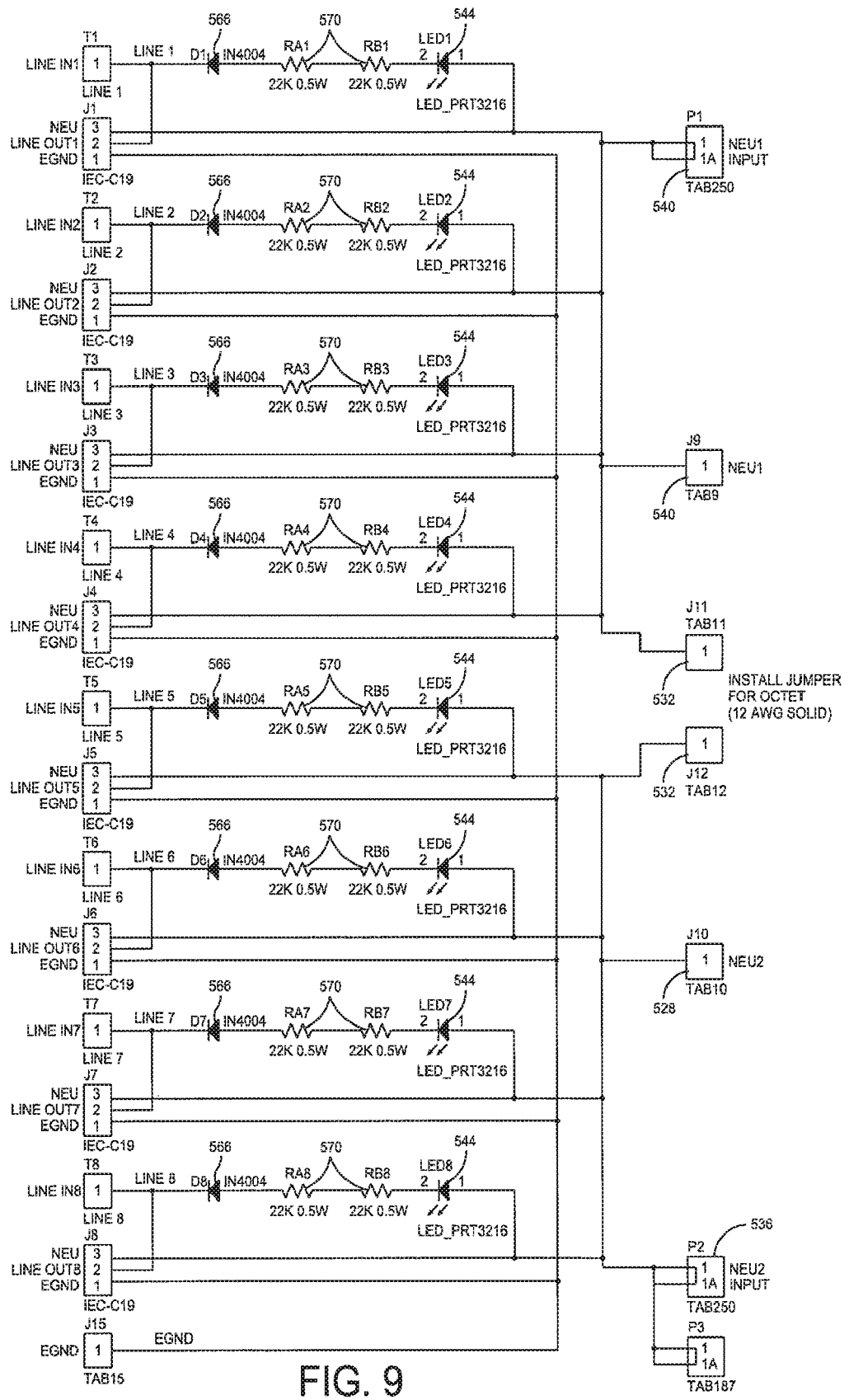
FIG. 9 is a schematic illustration of a relay circuit of an exemplary embodiment.

In one embodiment, an outlet module includes eight (8) individual outlets, that are organized into logical groups of four outlets each. Illustrated in FIG. 9 is a schematic illustration of an outlet circuit 500 for such an embodiment. In this embodiment, eight outlets 502-516 are assembled to be included in an outlet module. In this embodiment, outlet 502 and 516 are IEC-C19 type connectors, and outlets 504-514 are each IEC-C13 type connectors, although it will be readily recognized that outlets may be any suitable outlet type as required for a particular application. The outlet circuit 500 includes a ground input 520 that is electrically connected to a ground connection in each respective outlet 502-516. A neutral line may be electrically connected to each outlet 502-508 through a neutral input 524 that is provided for the four outlets 502-508, with a neutral line electrically connected to each outlet 510-516 through a second neutral input 528. Alternatively, if all eight outlets 502-516 are to be connected to a single power source, the neutral line for each set of four outlets may be connected through jumper connection 532, with neutral inputs 536, 540 provided to electrically connect the neutral for each outlet 502-526. As will be readily understood, a line voltage may be provided in place of a neutral connection in applications requiring higher voltages for the outlets 520-516. With continuing reference to FIG. 9, this embodiment provides a visual indicator at each outlet 502-516 that power is present at the outlet 502-516. The visual indicator is provided through a LED 544 that is interconnected between line power and neutral for each outlet 502-516. Line power for each outlet 502-516, in this embodiment, is provided through line inputs 548-562. Each line input 548-562 may be connected through a switch to line power from a power source, as will be described in more detail below. In such a manner, when a respective switch is configured to supply power to an outlet 502-516, the LED 544 associated with the outlet 502-516 will illuminate, thus providing a visual indicator that power is being provided to a particular outlet 502-516. The LED 544, in this embodiment, is electrically connected between the line input and neutral through a current limiting diode 566 and resistors 570. In other embodiments, such a visual indicator may not be desired, and in such embodiments the components related to the visual indicator may be omitted. As mentioned, line power is provided through separate line inputs 548-562 for each respective outlet 502-516. In some embodiments, the line inputs 548-562 are electrically connected to switches to provide switched electrical outputs 502-516, and in other embodiments some or all of the line inputs 548-562 may be connected in an unswitched configuration to a line power input to provide unswitched outputs.

Figure 10:
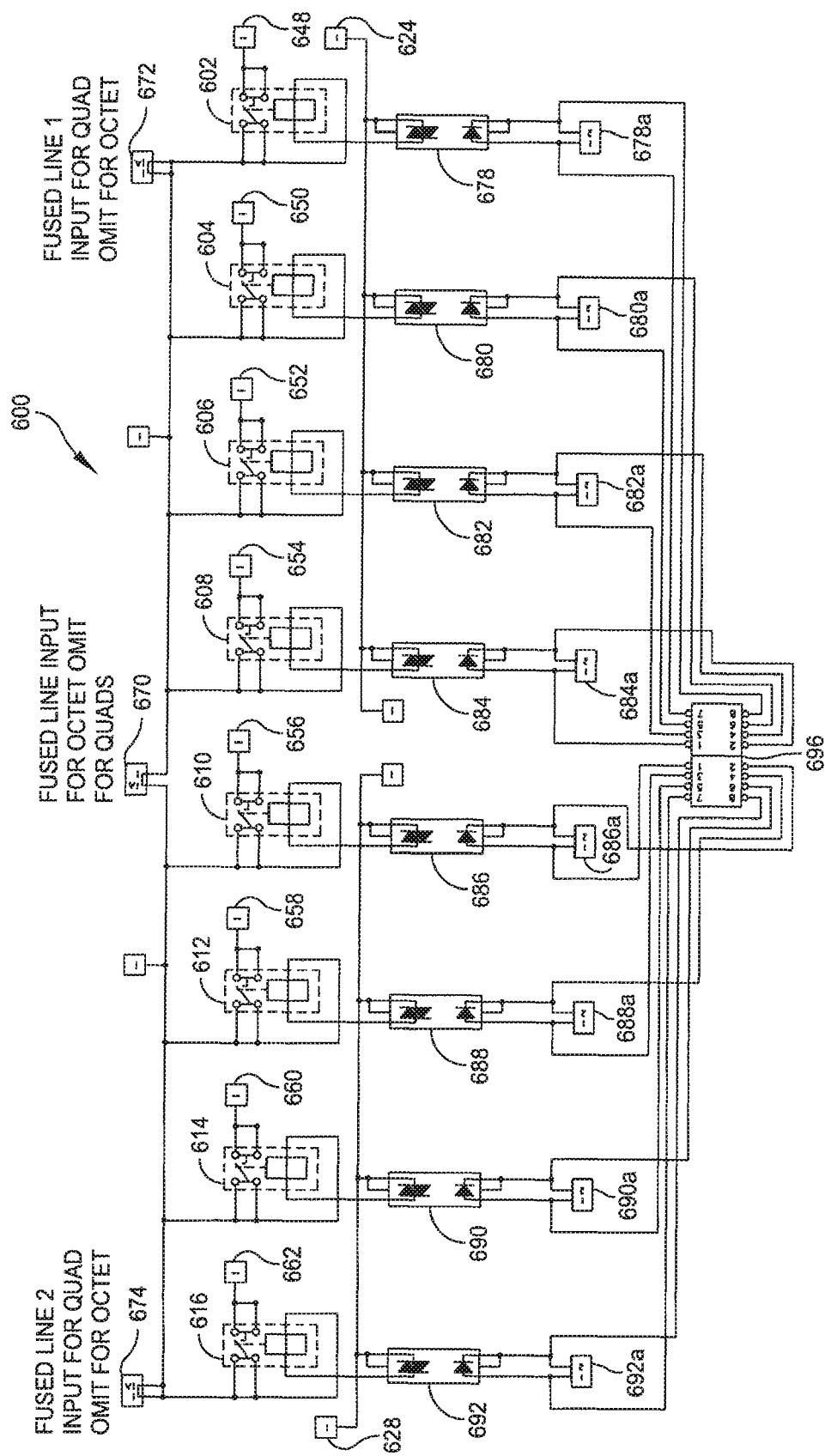
FIG. 10 is a schematic illustration of a current sensing circuit of an exemplary embodiment.

As mentioned, in some embodiments switched outputs are provided. With reference now to FIG. 10, provided in this embodiment is a relay circuit 600. The relay circuit 600 may be provided on a separate printed circuit board that is sized and configured to couple with the outlet circuit 500. In such a manner, if switched outlets are required for an outlet module, the relay circuit may be assembled with the outlet module to provide such functionality. The relay circuit 600 includes relays 602-616 that provide line power to each outlet 502-516, respectively. The output of each relay 502-516 is provided to line power outputs 648-662 that, when coupled to outlet circuit 500, and connected to line inputs 548-562, respectively. Line power is provided to the relay circuit 600 through line power input 670 when all eight outlets 502-516 receive power form one line power input, and through power inputs 672 and 674 when a line power input is provided for each set of four outlets 502-508, and 510-516, respectively. Each relay 602-616 is connected to a relay driver circuit 678-692, respectively, that provide signals to switch the relays 602-616. The relay driver circuits 678-692 are electrically connected to a relay control through connections 678a-692a, respectively, and/or through electrical connector 696 that is connected to a relay control circuit. Relay driver circuits 678-692 are connected to line power through the respective relay 602-616 and to the neutral input through inputs 628 and 624. In the event that a single neutral is provided for all of the outlets, a jumper 676 connects neutral lines for each set of four relay controls. 678-684, and 686-692, respectively.

Figure 11:
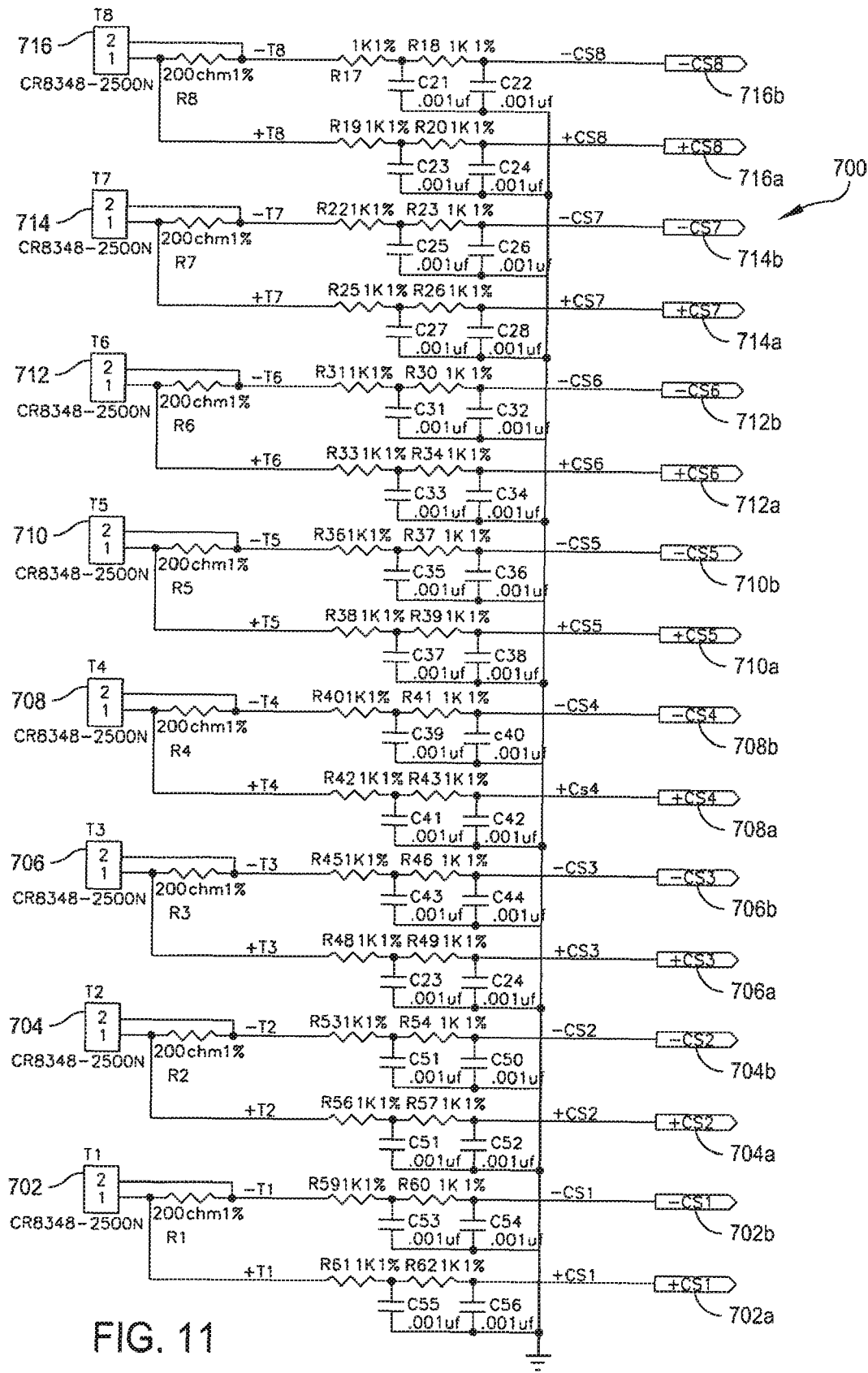
FIG. 11 is a schematic illustration of a voltage sensing circuit of an exemplary embodiment.
Figure 12:
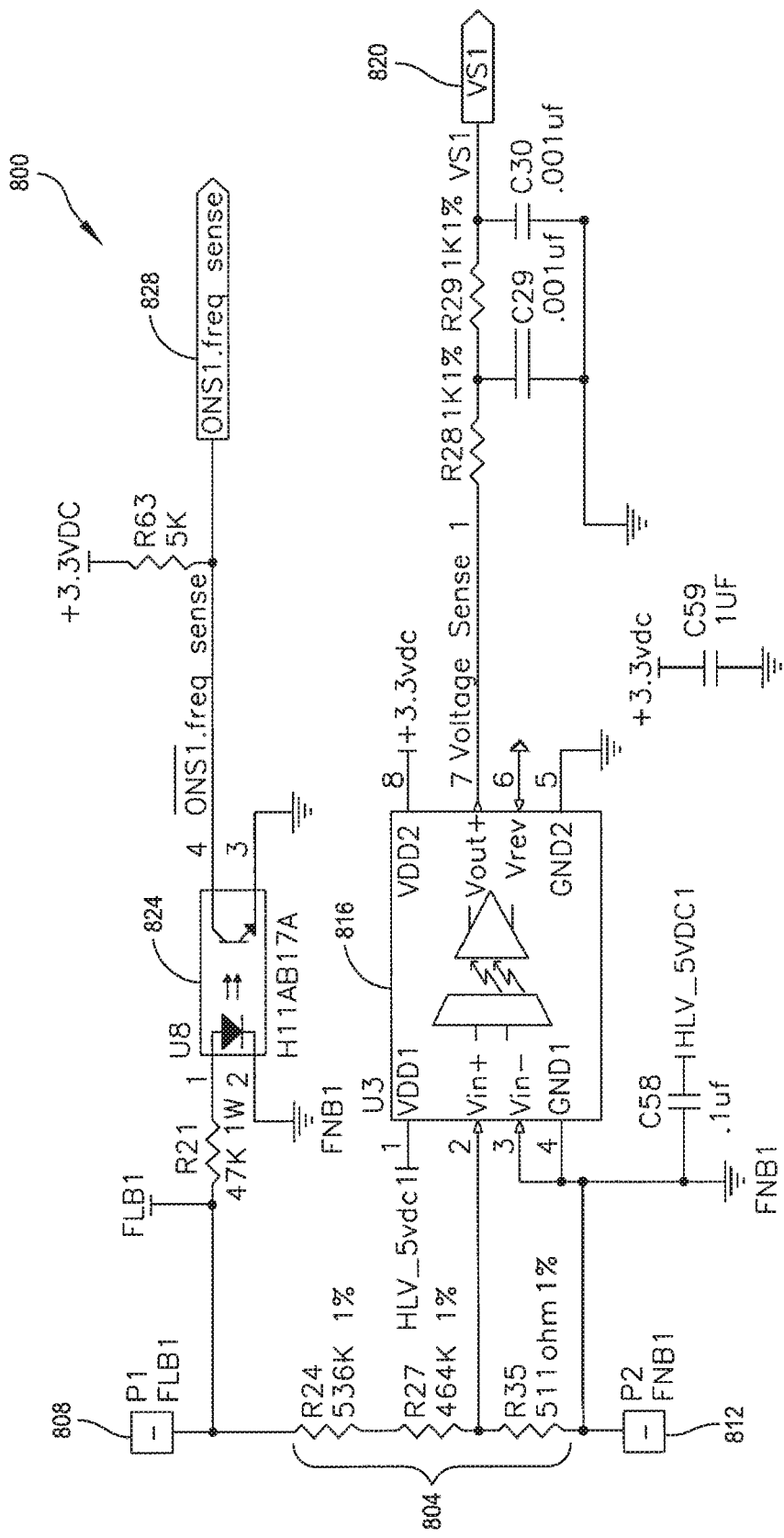
FIG. 12 is a schematic illustration of a power sensing circuit of an exemplary embodiment.
Figure 13:
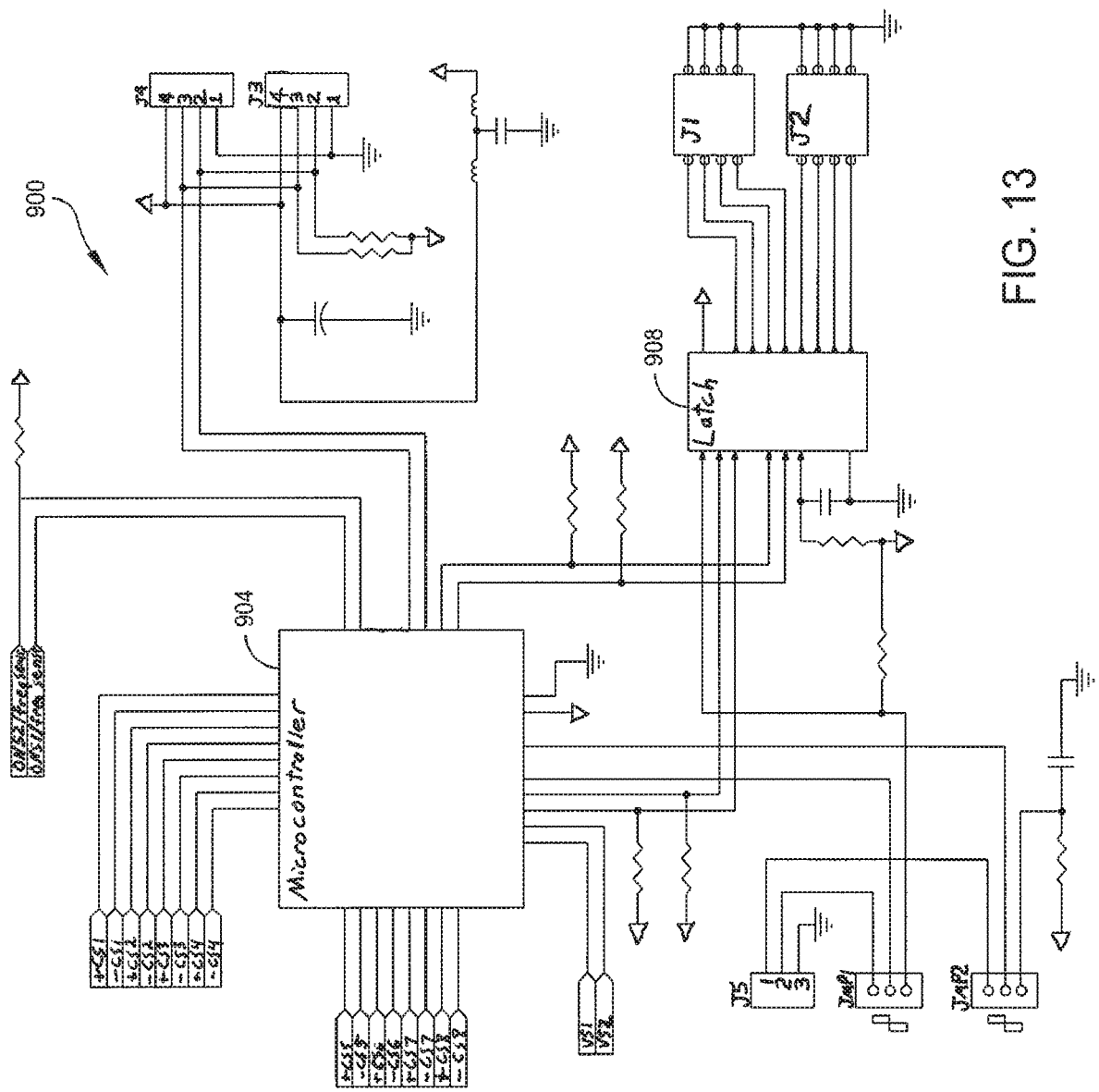
FIG. 13 is an illustration of an exemplary environment in which various embodiments may be practiced.
Figure 14:
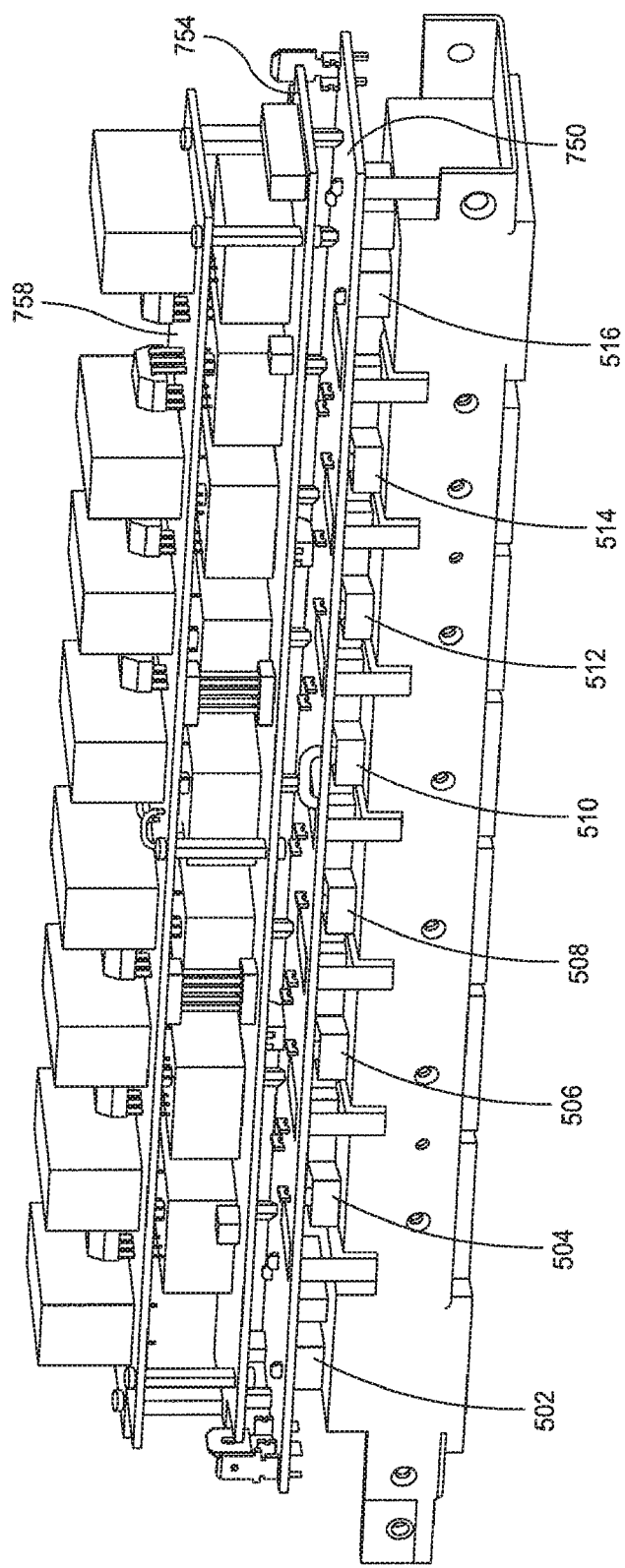
FIG. 14 is an illustration of a three printed circuit board PDU assembly of an embodiment.

With reference now to FIG. 11, current sensing is described for this embodiment. A current sensing circuit 700, in this embodiment, is included as a separate printed circuit board that can be assembled into a power outlet module when it is desired to have the capability to provide current information related to each individual outlet in an outlet module. Such a circuit board may be used in conjunction with other circuit boards, such as the relay circuit 600 of FIG. 10. Such a configuration is illustrated in FIG. 14, in which the circuitry of FIG. 9 is contained on the lower printed circuit board 750, the circuitry of FIGS. 11-13 are contained on the middle circuit board 754, and the circuitry of FIG. 10 is contained on the upper circuit board. The electrical connections of each of the circuit boards may be designed such that the boards may be assembled with related inputs/outputs and connections that are aligned so as to provide for efficient modular assembly of power outlet modules that incorporate some or all of the features described herein through the addition of one or more related printed circuit boards. As illustrated in FIG. 11, current transformers (CTs) 702-716 are provided that sense current flowing in an associated conductor that is routed through the individual CT 702-716. The current transformers 702-716 in this embodiment are toroidal inductors that each have two output lines, the output proportional to the magnitude of the current that is flowing through the conductor associated with the CT. In this embodiment, the line power conductor for each outlet 502-516 is routed through a corresponding CT 702-716. The respective CT 702-716 outputs a signal that corresponds to the magnitude of the current which, in this embodiment, is output on two output leads. In the embodiment of FIG. 11, the outputs are connected to related smoothing circuitry that includes resistors and capacitors to provide current sense outputs 702a, 702b through 716a, 716b for each outlet. The current sense outputs 702a, 702b-716a, 716b, are provided to a power sensor for use in determining the power that is being provided to a particular outlet. Also provided to the power sensor is information related to the line voltage that is present on each outlet so as to provide voltage and current information for use in determining power. In this embodiment, as will be described in more detail below, the power sensor is a processor that includes inputs for the current sense outputs 702a, 702b through 716a, 716b, as well as voltage sense inputs for line voltage.

Line voltage measurements are provided, in this embodiment, through a voltage sensor circuit 800 that is illustrated in FIG. 12. The voltage sensor circuit 800 includes a voltage dropping resistor circuit 804 that is connected to line power source at a first end 808, and connected to the neutral input at a second end 812. The voltage dropping resistor network 804 is tapped between resistors and at the neutral input with the taps provided to positive and negative Voltage inputs to an opto-isolated amplifying circuit 816. Similarly as described above, a voltage sense transformer may be used instead of a voltage dropping resistor network. The output of the opto-isolated amplifying circuit 816 is provided as a voltage sense signal 820. In the embodiment of FIG. 12, an optocoupler 824 is connected to the line input and provides a frequency sense signal 828 to indicate that AC line voltage is present. In embodiments where all of the outlets of an outlet module are powered by a single power source, a single voltage sensor circuit 800 is used, and in embodiments where different outlets in the outlet module are supplied power from different power sources, a second voltage sensor circuit is provided for the second power input to the outlet module. As discussed above, this embodiment may be implemented using printed circuit boards that provide circuitry for various features described. In this embodiment, the voltage sensor circuit(s) are provided on the same printed circuit board as the current sensor circuit 700, although it will be readily recognized that other configurations may be implemented.

Referring now to FIG. 13, a power sensor and control circuit 900 is described for an embodiment. The power sensor and control circuit 900, in this embodiment, is included in the same printed circuit board as the current and voltage sensor circuits 700, 800, although other implementations will be readily recognized. The power sensor and control circuit 900 includes a microcontroller 904 that receives all of the current sense signals 702*a*, 702*b* through 716*a*, 716*b*, are receives voltage sense signal(s) 820. These signals are received and processed to determine the power being provided to each outlet 502-516 in the outlet module. The microcontroller 904 is interconnected to an addressable latch 908 that provides control signals to the relays 602-616, if present. The microcontroller 904 also includes communications inputs that may be coupled to a communications bus to receive and transmit data from/to the bus. In this embodiment, the microcontroller 904 has 16 current input channels, two per outlet, which are electrically connected to the current sense outputs 702*a*, 702*b* through 716*a*, 716*b*. The microcontroller includes ADC inputs that digitize the current and voltage sense signals. Relative to the current sense signals, the ADC includes a differential ADC input based on the two inputs for each outlet. In this embodiment, the microcontroller 904 filters the current and voltage sense signals to reduce noise that may be present. The digitized current sense signals are scaled for 16 Amps with a 3.0 crest factor, in this embodiment. The voltage sense signals(s) are received on up to two voltage input channels, one per branch, with a single-ended ADC input and a digitized output scaled for +/−390 volt peaks. The frequency sense signals is also provided to the microcontroller which is used for frequency determination and timing of cycle sampling, auto-adjusted every second to compensate for microcontroller 904 RC-clock temperature drift. The microcontroller 904, in this embodiment, also provides for calibrations to account for system phase error and provide near-zero to near-full-span voltage and near-zero to near-full-span current digitization.

Power information is generated from the microcontroller 904 in this embodiment by sampling the current sense signals from an outlet along with the voltage sense signal for that outlet branch (if more than one voltage sense signal is provided) over a full AC cycle. The sampling is followed by processing time to determine the power related to the outlet for the cycle. This process is then repeated for the next outlet, and so on. Sampling in this embodiment is done at a rate of 120 samples per-cycle, or each three degrees, which is four times the Nyquist rate for the 14th harmonic at 50 or 60 Hz. Sampling may be delayed between voltage and current sense signals to correct for phase error introduced by the system through, for example, the current transformer toroid, filters, etc. For each AC cycle, the microcontroller 904 calculates RMS Voltage (square root of the sum of the squares of the difference of each data point from the mean of all the data points), and RMS Current (square root of the sum of the squares of the difference of each data point from the mean of all the data points). A pseudo-running-average mean of the most-recent eight AC cycles is computed, which provides a less-varying DC offset of the differential current ADC input channel (i.e. a low-pass filter approach). The microcontroller 904, in this embodiment, also computes Apparent Power as the product of the RMS Voltage and the RMS Current, and Active Power as an integration of the product of instantaneous voltage and current data points with the mean removed from each and sign preserved. A Power Factor is also computed as the inverse cosine of the quotient of active power divided by apparent power. As discussed above, the microcontroller 904 is interconnected to a communications bus (such as an I2C bus or SMBus). The microcontroller 904 reports over the bus, for each outlet/channel: (a) Voltage RMS (Vrms)—the pseudo-running-average of the eight most-recent Vrms values reported to a tenth volt; (b) Current RMS (Irms)—the pseudo-running-average of the eight most-recent Irms values reported to a hundredth Ampere; (c) Apparent Power (VA)—the pseudo-running-average of the eight most-recent VA values reported to in whole volt-amps; (d) Active Power (W)—the pseudo-running-average of the eight most-recent active power values reported in whole watts; and (e) Power Factor (pF)—the pseudo-running-average of the eight most-recent pF values reported to a tenth. This data may be received by an external system that collects the data and related outlet for which the data is provided, and used to determine metrics or provide information such as described above.

Figure 15:
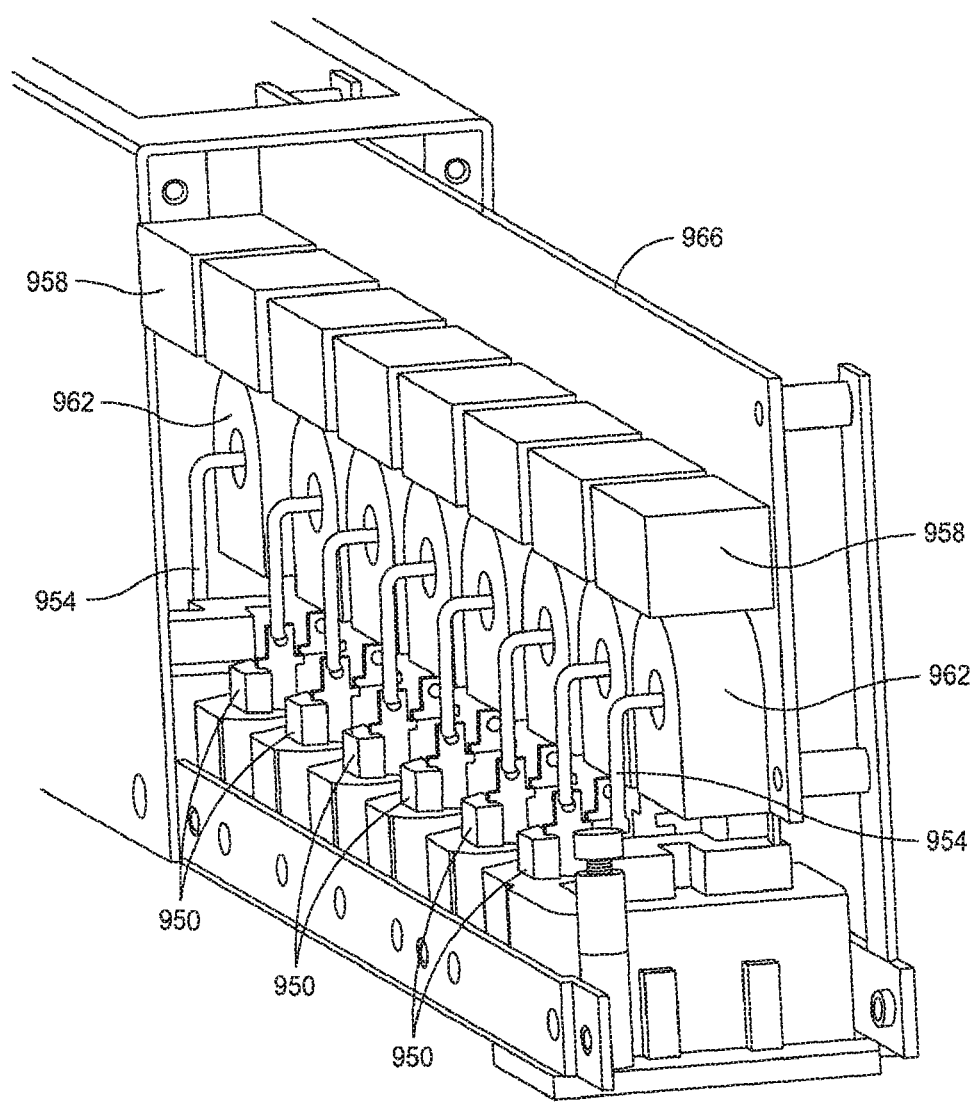
FIG. 15 is an illustration of a single printed circuit board PDU assembly of an embodiment.

FIG. 15 is an illustration of a circuit board configuration of another embodiment. In this embodiment, the components described above with respect to the three circuit boards as illustrated in FIG. 14 are provided on a single circuit board. In this embodiment, power outlets 950 are provided that have a neutral line and a ground that are provided by a bus bar (not shown). The line power is provided to outlets 950 through a line connection 954 that is routed through a relay 958 and an associated current transformer 962. The relays 958 and current transformers 962 are interconnected to control and monitoring circuitry such as illustrated in FIGS. 9-13. In this embodiment, the printed circuit board 966 is mounted at a 90 degree angle relative to the plane of the outlets 950. In this manner, the additional surface area required by the circuit board 966 is provided in a plane that is generally perpendicular to the plane of the outlets 950, rather than in a parallel plane as illustrated in the embodiment of FIG. 14. By configuring the circuit board 966 perpendicular to the plane of the outlets 950, this additional surface area can be accommodated simply be making the PDU housing somewhat deeper, with the width of the housing remaining substantially the same as the embodiment of FIG. 14. Using a single printed circuit board 966 allows a reduced manufacturing cost and provides efficiencies in manufacturing due to reduced assembly steps relative to embodiments with more than one printed circuit board.

Figure 16:
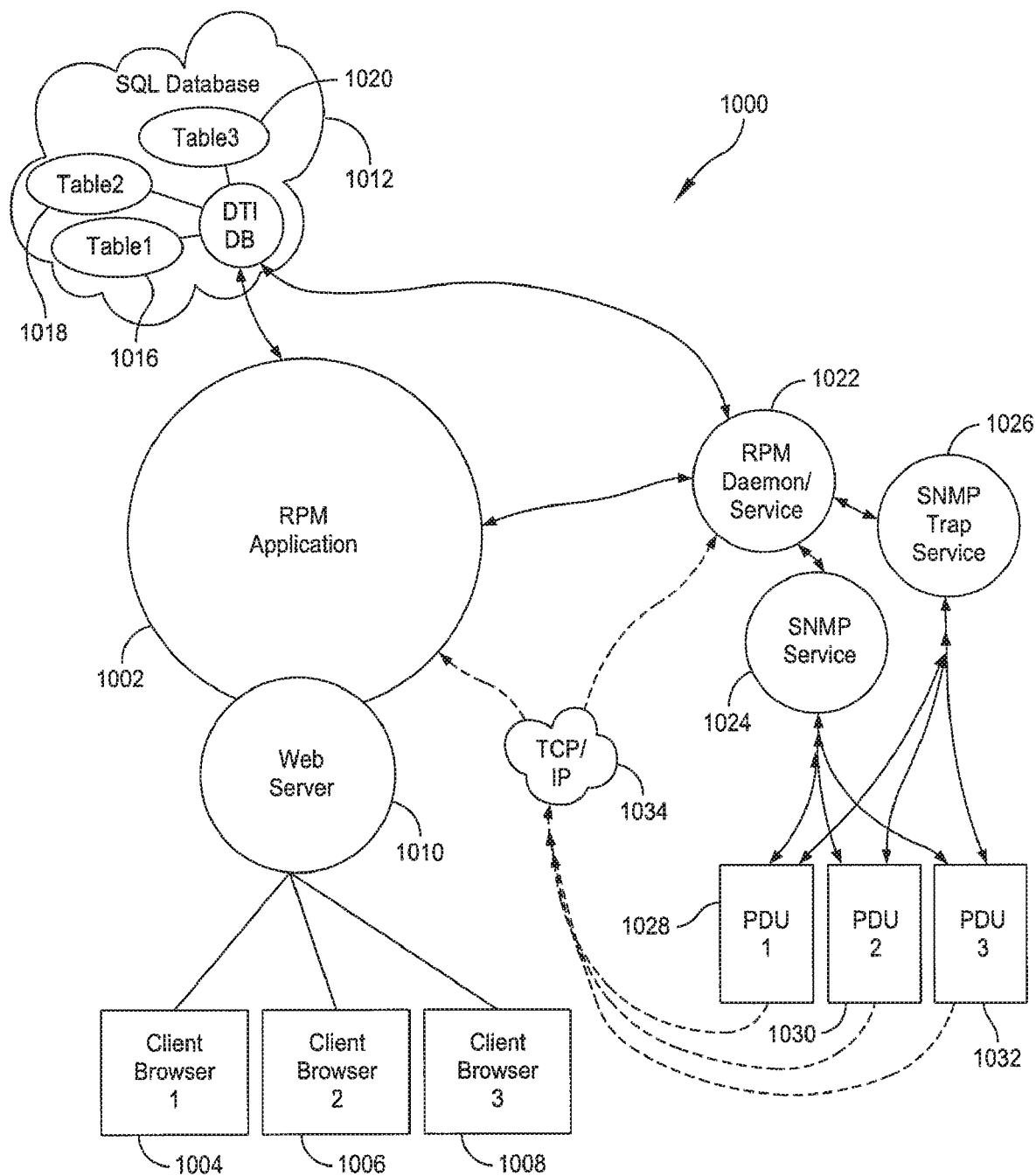
FIG. 16 is a flow chart illustrating a method of an embodiment.

FIG. 16 shows an exemplary environment generally 1000 in which embodiments of the invention may be practiced. A remote power manager (RPM) 1002 may be configured for various kinds of user interactions. In the embodiment shown, the RPM is provided as an Internet-based application that communicates with client web browsers 1004, 1006 and 1008 through a web server 1010. The RPM may create, maintain, access and update a database 1012 of tables 1016, 1018 and 1020 such as the tables to be described below. The database may be a Microsoft SQL Server database. The RPM may access the database directly or through a daemon/ service 1022 that eases any processing burden on the RPM and network traffic to and from the RPM.

The daemon/service or the RPM itself may communicate with a simple network management protocol (SNMP) service 1024 and an SNMP trap service 1026. The SNMP service in turn communicates with one or more power distribution units (PDUs) 1028, 1030 and 1032.

The PDUs may comprise, for example, PDUs as described above and distributed by Server Technology, Inc. (STI) of Reno, Nev. A PDU may be monitored and controlled by an electronic control system, of which one example is the Mt. Rose controller board distributed by STI. Each PDU may include one or more electrical outlets and sensors that indicate voltage present at the outlets and current flow through each outlet.

Data obtained from the PDUs may be retrieved through the SNMP service and stored in the database. Similarly, data stored in the database may be used to configure or control the PDUs via the SNMP service. Communication protocols other than SNMP could also be used.

Messages spawned proactively or reactively by the PDUs may be sent to the daemon service through the SNMP trap service. Or the PDUs may communicate directly with the RMP by a TCP/IP communication protocol 1034 or another communication channel or protocol.

Figure 17:
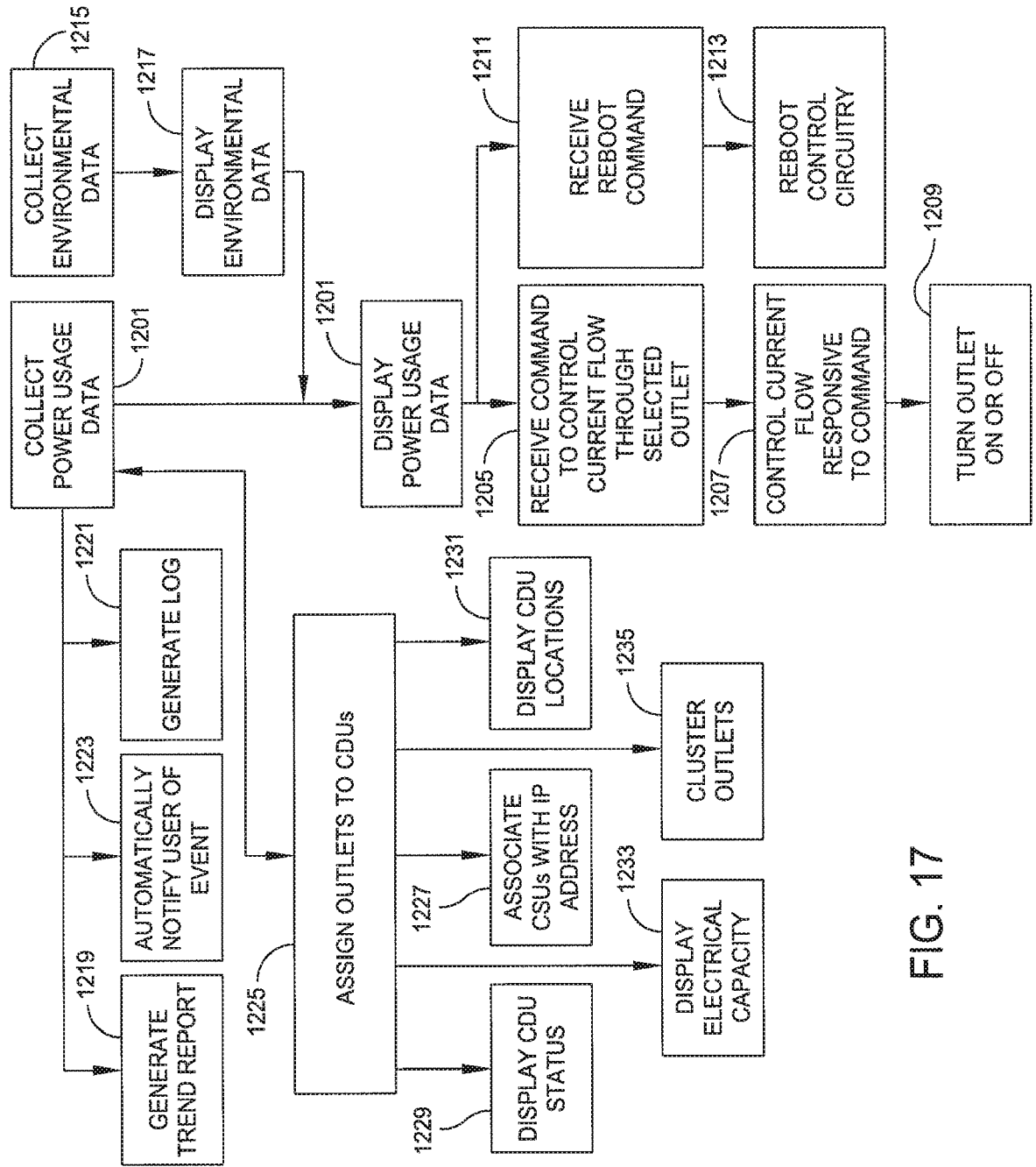
FIG. 17 is a screen shot illustrating a user interface of an embodiment.

FIG. 17 illustrates a method of managing electrical power usage according to the principles of the invention. The method includes collecting 1201 power usage data indicative of electrical current flow through each of a plurality of the electrical outlets in the system, displaying 1203 the power usage data to a user, receiving 1205 a user-initiated command to control current flow through any outlet selected by the user, and controlling 1207 current flow through the selected outlet responsive to the command. Controlling current flow through an outlet may be accomplished by turning the outlet on or off 1209.

The method may include receiving 1211 a user-initiated command to reboot control circuitry associated with one or more of the outlets and rebooting 1213 the control circuitry responsive to the command.

The method may include collecting 1215 environmental data indicative of environmental conditions of the electrical outlets and displaying 1217 the environmental data to the user. The environmental data may include temperature or humidity (or both) or other environmental factors as desired.

A report descriptive of a power usage trend may be generated 1219 automatically or responsive to a user request. A log of events may be generated 1221. A message may be automatically sent 1223 to a user if a user-defined event occurs. Such an event may be, for example, sensing of any of a predetermined temperature, a predetermined humidity, or a predetermined amount of electrical power usage by one or more outlets. The user may specify the parameters of an event for a one-time report or a report may be sent automatically each time the event occurs. Or an SNMP trap may be used when an event occurs.

The method may include assigning 1225 each outlet in any one location to a cabinet distribution unit (CDU) in that location. At least one unique IP address may be associated 1227 with each location having one or more CDUs. If there are several CDUs at a given location, each may get a separate IP address or a single IP address may be used for some or all of the CDUs at that location. Collecting power usage data respecting an outlet may be accomplished by communicating via the Internet with the IP address associated with the CDU containing that outlet.

Displaying information to the user may include displaying 1229 the status of one or more CDUs. The status of a CDU may be any of critical, changed, normal, no data, maintenance, or snooze. "Critical" denotes a condition that may require immediate corrective action. "Changed" denotes that a parameter has changed since a previous report or display. "Normal" denotes all parameters are within limits that the user may specify or that may have been predetermined at some prior time. "No data" indicates a communication failure between the CDU in question and the power manager. "Maintenance" indicates that the CDU in question is being maintained and will remain in that status until manually changed. "Snooze" indicates that the CDU in question is temporarily off-line but will return to on-line status at a predetermined future time.

The method may include displaying 1231 a graphical representation of locations of CDUs in the power distribution system. This graphical representation may take the form of a world map with indicators such as icons placed over CDU locations. Maps drawn to various scales may be provided; for example, a map of the United States may indicate all CDU locations in that country, a map of Nevada may indicate all CDU locations in Nevada, and a map of Reno may indicate all CDU locations there.

The method may include displaying 1233 an amount of electrical power available to a CDU. This may be, for example, the capacity of the electrical feed at a given location, or into the CDU cabinet or into a particular CDU.

The method may include clustering 1235 a plurality of outlets. This includes assigning a plurality of outlets in a CDU having one IP address and a plurality of outlets in a CDU having another IP address to a cluster. Once this has been done, various ones of the above-described steps may conveniently be applied to all outlets in the cluster. For example, the status of the cluster may be displayed, a user-initiated command to control current flow through all outlets in a cluster selected by the user may be received, and current flow through all outlets in the user-selected cluster may be controlled responsive to the command.

Typically, every outlet has its own current sensor, and every outlet or every bank of outlets connected to a single electrical supply line has a voltage sensor. Data gathered by these sensors may be used locally, for example to calculate power consumption of each outlet which information is thereupon transmitted to the RPM 1002 (see FIG. 1) or the sensor data may be transmitted directly to the RPM.

Tables that may be used in embodiments of the invention will now be described. These tables may include, for example, SYSTEM tables, TOWER tables, INFEED tables, OUTLET tables, ENVMON tables, TEMPHUMID tables, CONTACTCLOSURE tables, STATUS LOOKUP tables, SNMP OID LOOKUP tables, OUTLET CLUSTER tables, TRENDING tables, USERS tables, DISCOVERY tables, GRAPHICAL DISPLAY tables, ALERT tables and REPORT tables.

A SYSTEM table may represent the highest level in a hierarchy. This table may contain system-wide information such as the name and IP address of an entire system. Table 1 is an exemplary system table:

TABLE 1

| | MRSystem Table | |
|---|---|---|
| FIELD NAME | Description | How Obtained |
| MRSYSTEMID | Primary Key | Generated when added |
| MRSYSTEM_NAME | User Assigned Name | From SNMP GET or from User entry |
| MRSYSTEM_IP_TYPE | IP type - 0 = IPV4, 1 = IPV6 | Defaults to 0 |
| MRSYSTEM_IPADDR | System IP address | From device discovery or from User entry |
| MRSYSTEM_TCPIP_PORT | include for future expansion | Defaults to 161 |
| MRSYSTEM_LOCATION | User defined location string | From SNMP GET or from User entry |
| MRSYSTEM_CONTACT | User specified system contact | From SNMP GET or from User entry |
| MRSYSTEM_DESCR | User specified system description | From SNMP GET or from User entry |
| MRSYSTEM_WATTS_PER_UNIT_AREA | System calculated value | From SNMP Poll |
| MRSYSTEM_AREA | User specified area powered by this system | From SNMP GET or from User entry |
| MRSYSTEM_TOTAL_POWER | Total power being used | From SNMP Poll |
| MRSYSTEM_ENV_MON_COUNT | Number of environmental monitors on this system | From SNMP GET |
| MRSYSTEM_TOWER_COUNT | Number of towers on this system | From SNMP GET |
| MRSYSTEM_NIC_SERIALNUMBER | Network interface card serial number | From SNMP GET |
| MRSYSTEM_VERSION | Firmware version on this system | From SNMP GET |
| MRSYSTEM_SNMP_PUBLIC | The SNMP public access string - default to "PUBLIC" | User entered or from discovery tables |
| MRSYSTEM_SNMP_PRIVATE | The SNMP private access string - default to "PRIVATE" | User entered or from discovery tables |
| Icon | Not Used | Not Used |
| DisplayMapID | Not Used | Not Used |
| XLoc_Level1 | Not Used | Not Used |
| YLoc_Level1 | Not Used | Not Used |
| Status_Change_Time | Timestamp of last update to the device | System derived |
| Status_Critical | Number of critical alarms this CDU has | System derived |
| Status_Warning | Number of warning alarms this CDU has | System derived |
| Status_Unreachable | Flag whether this CDU is unreachable or not | System derived |
| Status_Maintenance | Flag whether this CDU is in maintenance mode or not | System derived |
| Current_Val | This systems highest current reading | System derived |
| Power_Val | This systems highest power reading | System derived |
| Temp_Val | This systems highest temperature reading | System derived |
| Humid_Val | This systems highest humidity reading | System derived |
| Snooze_Start | Time this system has gone into maintenance mode | User assigned |
| Snooze_End | Time this system will leave maintenance mode | User assigned |

TABLE 1-continued

| | MRSystem Table | |
|---|---|---|
| FIELD NAME | Description | How Obtained |
| RackID | Link to the Racks table | Assigned by an admin on the GUI |
| MRSystem_Cap | System capacity of Watts per area unit | Entered via the Admin on the GUI |
| MRSystem_Area_Unit | Area unit used to derive system capacity | SNMP Get |
| MRSystem_PowerFactor | The power factor used in power calculations performed by the system. | SNMP Get |

Note that most of the fields in this table may be populated via SNMP GETs. For the fields that can be either SNMP specified or user specified, the RPM may attempt to get the value via SNMP when the device is discovered. If unable, no value or a user specified value can be used. When the user specifies a value, an attempt will be made to set the new value on the actual system, but the value in the table is the overriding value if the value on the system differs from the value on the device. Values that are retrieved only via an SNMP GET are not settable by the user, since they are hardware configuration values from the system. The values that are retrieved via an SNMP Poll are dynamic values that may change as the system is used. The polling operations may occur as the data is required by the RPM (e.g., as the data is required by a graphical user interface (GUI) of the RPM), and the polling data may or may not be saved in the database (the labels may remain in the database for OID table lookup reasons). Much of the data retrieved via SNMP Poll operations may be stored in a TREND table for purposes of a trending feature. That is, data may be stored in a TREND table for the purpose of monitoring data trends, viewing or printing reports, or taking appropriate action based on a trend.

The SYSTEM table may have a one-to-many relationship with the TOWER, ENVIRONMENTAL MONITOR, CONTACT CLOSURE, TEMPERATURE/HUMIDITY PROBE, INFEED and OUTLET tables/devices in the system. In one embodiment, all of the children (tables) of a SYSTEM table contain the primary key of their SYSTEM table. This characteristic may be true of the tables in several portions of the database, including the SYSTEM tables, TOWER tables, INFEED tables, OUTLET tables, and ENVMON tables. As a result, the entire system may be described by queries that request the parent's primary key. The SNMP public and private access strings may be included in the system table. These values can be set by the user and may correspond to strings in the controller board firmware. The DISCOVERY tables may contain the strings to use, and these fields may be initially set from these values.

Additional fields may be added to a SYSTEM table to support GUI functions such as the display of custom graphics (e.g., icons, schematics or photos representing managed devices or device groups).

An exemplary TOWER table will now be described. A tower may be a PDU or other device having a processor such as an ARM processor. One or a plurality of towers may exist within a system. Table 2 shows an exemplary TOWER table.

TABLE 2

| | Mt. Rose TOWER table | |
|---|---|---|
| FIELD NAME | Description | How Obtained |
| MRTOWERID | Primary Key | Generated when added |
| MRTOWER_NAME | User Assigned Name | From SNMP GET or from User entry |
| MRTOWER_ABS_NAME | System Generated with the first tower, for example, being A, the second B, etc. All towers have a unique absolute name, which may be the system IP address appended with the absolute name | From SNMP GET |
| MRSYSTEMID | Primary key of the system table to which this tower belongs | Determined when added |
| MRTOWER_CAPABILITIES | A 4 byte bit map with each bit corresponding to a capability | SNMP GET |
| MRTOWERSTATUSID | Primary key into a tower status table which contains strings corresponding to the tower status | SNMP POLL |
| MRTOWER_INFEED_COUNT | Number of INFEEDS associated with this tower | SNMP GET |

TABLE 2-continued

Mt. Rose TOWER table

| FIELD NAME | Description | How Obtained |
|---|---|---|
| MRTOWER_PRODUCT_SN | Tower serial number | SNMP GET |
| MRTOWER_MODEL_NUMBER | Tower Model number | SNMP GET |
| Icon | Not Used | Not Used |
| DisplayMapID | Not Used | Not Used |
| XLoc_Level1 | Not Used | Not Used |
| YLoc_Level1 | Not Used | Not Used |

The term "Mt Rose" refers to a device embodying portions of the invention.

As with the SYSTEM table, most of the fields in the TOWER table may be populated via SNMP. For the fields that can be either SNMP specified or user specified, the RPM may attempt to get the value via SNMP when the device is discovered. If unable, no value or a user specified value may be used. When the user specifies a value, an attempt may be made to set the new value on the actual tower, but the value in the table may override the value if the value in the TOWER table differs from the value on the tower. The values that are only retrieved via an SNMP GET are not settable by the user since they are hardware configuration values from the tower. The values that are retrieved via an SNMP Poll are dynamic values that may change as the system is used. The polling operations will occur as the data is required by the RPM (or its GUI), and the polling data may or may not be saved in the database (the labels may remain in the database for OID table lookup reasons). Much of the data retrieved via SNMP Poll operations may be stored in a TREND table for use with a trending feature.

A TOWER table has a one-to-one relationship with a SYSTEM table. The primary key of the associated SYSTEM table may be held in the TOWER table. A TOWER table may have a one-to-may relationship with INFEED and OUTLET tables/devices. The INFEEDS associated with a TOWER can be retrieved with a query of the INFEED table using the TOWERID primary key as the search key. Additional fields may be added to a TOWER table to support GUI functions such as the display of custom graphics.

An "infeed" is a power input, such as a connection to a power source. A tower may have one or multiple infeeds. Table 3 provides an example of an INFEED table.

TABLE 3

Mt. Rose INFEED Table

| FIELD NAME | Description | How Obtained |
|---|---|---|
| MRINFEEDID | Primary Key | Generated when added |
| MRINFEED_NAME | User Assigned Name | From SNMP GET or from User entry |
| MRINFEED_ABS_NAME | System Generated - may be a concatenation of the TOWER absolute name and the number of the infeed. The first infeed on the first tower, for example, may be AA, the second may be AB. The first infeed on the second tower may be BA, the second may be BB etc. All infeeds have a unique absolute name that may be the system IP address appended with the absolute name | From SNMP GET |
| MRTOWERID | Primary key of the tower table to which this infeed belongs | Determined when added |
| MRSYSTEMID | Primary key of the system table to which this infeed belongs | Determined when added |
| MRINFEED_CAPABILITIES | A 4 byte bit map with each bit corresponding to a capability | SNMP GET |
| MRINFEEDSTATUSID | Primary key into an infeed status table which contains strings corresponding to the infeed status | SNMP POLL |
| MRINFEEDLOADSTATUSID | Primary key into an infeed status table which contains strings corresponding to the infeed load status | SNMP POLL |
| MRINFEED_LOAD_VALUE | Infeed load as determined by the SNMP poll | SNMP POLL |

TABLE 3-continued

Mt. Rose INFEED Table

| FIELD NAME | Description | How Obtained |
|---|---|---|
| MRINFEED_LOAD_HIGH_THRESH | The SNMP load high threshold on the infeed. This value can be set by user input to the SPM using SNMP PUT processing. | SNMP GET |
| MRINFEED_OUTLET_COUNT | Number of outlets associated with this infeed | SNMP GET |
| MRINFEED_VOLTAGE | Voltage on the infeed as of the last SNMP poll | SNMP POLL |
| MRINFEED_POWER | Power at the infeed as of the last SNMP poll | SNMP POLL |
| MRInfeed_Capacity | The load capacity of the input feed. | SNMP POLL |
| Icon | Not Used | Not Used |
| DisplayMapID | Not Used | Not Used |
| XLoc_Level1 | Not Used | Not Used |
| YLoc_Level1 | Not Used | Not Used |
| MRInfeed_ApparentPower | The apparent power consumption of the input feed. | SNMP POLL |
| MRInfeed_PowerFactor | The power factor of the input feed. | SNMP POLL |
| MRInfeed_CrestFactor | The crest factor for the load of the input feed. | SNMP POLL |

As with the previously-described tables, most of the fields in this table may be populated via SNMP. For the fields that can be either SNMP specified or user specified, the RDCM may attempt to get the value via SNMP when the device is discovered. If unable, no value or a user specified value may be used. When the user specifies a value, an attempt may be made to set the new value on the actual infeed. If the value to be set is the MRINFEED_LOAD HIGH THRESH, the value must be successfully set on the infeed in order for it to take affect. This is because this value is an SNMP threshold for traps that are recognized and generated by the device firmware. Other values in the table may override the firmware values if the value in the INFEED table differs from the value on the actual infeed. The values that are only retrieved via an SNMP GET are not settable by the user since they are hardware configuration values from an infeed. The values that are retrieved via an SNMP Poll are dynamic values that may change as the system is used. The polling operations may occur as the data is required by the RPM (or its GUI), and the polling data may or may not be saved in the database (the labels may remain in the database for OID table lookup reasons). Much of the data retrieved via SNMP Poll operations may be stored in a TREND table for use with a trending feature.

An INFEED table has a one-to-one relationship with a SYSTEM table and a TOWER table. The primary keys of the associated SYSTEM table and TOWER table may be held in the INFEED table. An INFEED table may have a one-to-may relationship with OUTLET tables or devices. The OUTLETS associated with an INFEED can be retrieved with a query of the OUTLET table, using the INFEED primary key as the search key. Additional fields may be added to an INFEED table to support GUI functions such as the display of custom graphics.

An outlet is a power output, such as a connection to a powered (or unpowered) device. A tower may have one or multiple outlets. Table 4 presents an exemplary description of an OUTLET table.

TABLE 4

Mt. Rose OUTLET table

| FIELD NAME | Description | How Obtained |
|---|---|---|
| MROUTLETID | Primary Key | Generated when added |
| MROUTLET_NAME | User Assigned Name | From SNMP GET or from User entry |
| MROUTLET_ABS_NAME | System Generated - may be a concatenation of the TOWER absolute name, the INFEED absolute name, and the number of the outlet. The first outlet on the first tower on the first infeed may be AAA, the second may be AAB. The first outlet on the second tower on the second infeed on the second tower | From SNMP GET |

TABLE 4-continued

Mt. Rose OUTLET table

| FIELD NAME | Description | How Obtained |
| --- | --- | --- |
| | may be BBA, the second may be BBB etc. All outlets have a unique absolute name that may be the system IP address appended with the absolute name. | |
| MRINFEEDID | Primary key of the infeed table to which this outlet belongs. | Determined when added |
| MRTOWERID | Primary key of the tower table to which this outlet belongs. | Determined when added |
| MRSYSTEMID | Primary key of the system table to which this outlet belongs. | Determined when added |
| MROUTLET_CAPABILITIES | A 4 byte bit map with each bit corresponding to a capability. | SNMP GET |
| MROUTLETSTATUSID | Primary key into an outlet status table which contains strings corresponding to the outlet status. | SNMP POLL |
| MROUTLETLOADSTATUSID | Primary key into an outlet status table which contains strings corresponding to the outlet load status. | SNMP POLL |
| MROUTLET_LOAD_VALUE | Outlet load as determined by the SNMP poll. | SNMP POLL |
| MROUTLET_LOADLOW_THRESH | The SNMP load low threshold on the outlet. This value can be set by user input to the SPM using SNMP PUT processing. | SNMP GET |
| MROUTLET_LOADHIGH_THRESH | The SNMP load high threshold on the outlet. This value can be set by user input to the SPM using SNMP PUT processing. | SNMP GET |
| MROUTLETCONTROLSTATEID | Primary key into an outlet lookup table which contains strings corresponding to the outlet control state. | SNMP POLL |
| MROUTLETCONTROLACTIONID | Primary key into an outlet lookup table which contains strings corresponding to the outlet control action. | SNMP POLL |
| MRASSET | Not used | Not used |
| ICON | Not used | Not used |
| DISPLAYMAPID | Not used | Not used |
| XLOC_LEVEL1 | Not used | Not used |
| YLOC_LEVEL1 | Not used | Not used |
| MROutlet_Power | The active power consumption of the device plugged into the outlet. | SNMP POLL |
| MROutlet_Capacity | The load capacity of the outlet. | SNMP POLL |
| MROutlet_Voltage | The voltage of the outlet. | SNMP POLL |
| MROutlet_ApparentPower | The apparent power consumption of the device plugged into the outlet. | SNMP POLL |
| MROutlet_PowerFactor | The power factor of the device plugged into the outlet. | SNMP POLL |
| MROutlet_CrestFactor | The crest factor for the load of the device plugged into the outlet. | SNMP POLL |

As with the previous tables, most of the fields in the OUTLET table may be populated via SNMP. For the fields that can be either SNMP specified or user specified, the RPM may attempt to get the value via SNMP when the device is discovered. If unable, no value or a user specified value may be used. When the user specifies a value, an attempt may be made to set the new value on the actual outlet device firmware. If the value to be set is the MROUTLET_LOAD HIGH THRESH or MROUTLET_LOADLOW_THRESH, the value must be successfully set on the outlet device firmware in order for it to take effect. This is because these values are SNMP thresholds for traps that are recognized and generated by the device firmware. Other values in the table may override the firmware values if the value in the OUTLET table differs from the value on the actual outlet. The values that are only retrieved via an SNMP GET are not settable by the user since they are hardware configuration values from the OUTLET. The values that are retrieved via an SNMP Poll are dynamic values that may change as the system is used. The polling operations may occur as the data is required by the RPM (or its GUI), and the polling data may or may not be saved in the database (the labels may remain in the database for OID table lookup reasons). Much of the data retrieved via SNMP Poll operations may be stored in a TREND table for use with a trending feature.

An OUTLET table has a one-to-one relationship with a SYSTEM table, a TOWER table, and an INFEED table. The primary keys of the associated SYSTEM table, TOWER table, and INFEED table may be held in the OUTLET table. Additional fields may be added to an OUTLET table to support GUI functions such as the display of custom graphics.

An ENVMON table may be used for monitor and control of environmental monitoring or control devices in a system, such as a temperature sensor, humidity sensor, water sensor, etc. Table 5 is an exemplary ENVMON table.

TABLE 5

| | ENVMON Table | |
|---|---|---|
| FIELD NAME | Description | How Obtained |
| MRENVMONID | Primary Key | Generated when added |
| MRENVMON NAME | User Assigned Name | From SNMP GET or from User entry |
| MRENVMON_ABS NAME | System Generated - for example, with the first monitor being A, the second B, etc. All monitors have a unique absolute name that may be the system IP address appended with the absolute name | From SNMP GET |
| MRSYSTEMID | Primary key of the system table to which this tower belongs | Determined when added |
| MRENVMONSTATUSID | Primary key into a monitor status table which contains strings corresponding to the status | SNMP GET |
| MRENVMON WATERSENSOR NAME | User assigned name for the water sensor monitor | SNMP GET or user entered |
| MRENVMONWATERSENSORSTATUSID | Primary key into a water sensor monitor status table which contains strings corresponding to the status | SNMP POLL |
| MRENVMON_ADC NAME | User assigned name for the analog to digital converter | SNMP GET or user entered |
| MRENVMONADCSTATUSID | Primary key into an ADC status table which contains strings corresponding to the status | SNMP POLL |
| MRENVMON_ADC_COUNT | The 8-bit count value from the analog-to-digital converter. A non-negative value may indicate the digital value retrieved from the ADC, and a negative value may indicate that a digital value was not able to be retrieved. | SNMP POLL |
| MRENVMON_ADC_LOWTHRESH | SNMP trap low threshold | SNMP GET |
| MRENVMON_ADC HIGHTHRESH | SNMP trap high threshold | SNMP GET |
| MRENVMONTEMPHUMID_SENSOR_COUNT | The number of temperature/ humidity sensors on the environmental monitor. | SNMP GET |
| MRENVMON_CONTACTCLOSURE COUNT | The number of contact closures on the environmental monitor. | SNMP GET |

As with the previous tables, most of the fields in the ENVMON table may be populated via SNMP. For the fields that can be either SNMP specified or user specified, the RPM may attempt to get the value via SNMP when the device is discovered. If unable, no value or a user specified value may be used. When the user specifies a value, an attempt may be made to set the new value on the actual device firmware. If the value to be set is one of the SNMP trap thresholds, the value must be successfully set on the outlet device firmware in order for it to take effect. This is because these values are SNMP thresholds for traps that are recognized and generated by the device firmware. Other values in the table may override the firmware values if the value in the table differs from the value on the actual hardware. The values that are only retrieved via an SNMP GET are not settable by the user since they are hardware configuration values from the Mt. Rose system. The values that are retrieved via an SNMP Poll are dynamic values that may change as the system is used.

The polling operations may occur as the data is required by the RPM (or its GUI), and the polling data may or may not be saved in the database (the labels may remain in the database for OID table lookup reasons). Much of the data retrieved via SNMP Poll operations may be stored in a TREND table for use with a trending feature.

An ENVMON table has a one-to-one relationship with a SYSTEM table. The primary key of the associated SYSTEM table may be held in the ENVMON table. An ENVMON table may have a one-to-may relationship with TEMPHUMID and CONTACTCLOSURE tables/devices in a system. The monitors associated with an ENVMON table can be retrieved with a query of the associated tables using the ENVMONID primary key as the search key. Additional fields may be added to an ENVMON table to support GUI functions such as the display of custom graphics.

Table 6 provides an example of a temperature and humidity monitor (TEMPHUMID) table.

TABLE 6

TEMPHUMID table

| FIELD NAME | Description | How Obtained |
|---|---|---|
| MRTEMPHUMIDID | Primary Key | Generated when added |
| MRTEMPHUMID NAME | User Assigned Name | From SNMP GET or from User entry |
| MRTEMPHUMID_ABS NAME | System Generated - for example, as a concatenation of the ENVMON absolute name and the number of the TEMPHUMID monitor. The first TEMPHUMID monitor on the first ENVMON may be AI, the second may be A2. The first on the second ENVMON may be B I, the second may be B2 etc. All TEMPHUMID monitors have a unique absolute name that may be the system IP address appended with the absolute name | From SNMP GET |
| MRENVMONID | Primary key for the ENVMON associated with this TEMPHUMID monitor | Determined when added |
| MRSYSTEMID | Primary key of the system table to which this device belongs | Determined when added |
| MRTEMPHUMIDSTATUSID | Primary key into a monitor status table which contains strings corresponding to the status | SNMP POLL |
| MRTEMPHUMIDTEMPSTATUSID | Primary key into a monitor status table which contains strings corresponding to the status | SNMP POLL |
| MRTEMPHUMID_TEMP_VALUE | Temperature value as of the last SNMP poll in degrees. | SNMP POLL |
| MRTEMPHUMID_TEMP_LOW THRESH | The temperature low threshold value of the sensor in degrees, using the scale selected by tempHumidSens orTempScale. The default is Celsius. | SNMP GET |
| MRTEMPHUMID_TEMP HIGHTHRESH | The temperature high threshold value of the sensor in degrees, using the scale selected by tempHumidSensorTempScale. The default is Celsius. | SNMP GET |
| MRTEMPHUMIDHUMIDSTATUSID | Primary key into a monitor status table which contains strings corresponding to the status | SNMP POLL |
| MRTEMPHUMID_HUMID VALUE | The humidity measured by the sensor. A non-negative value indicates the measured humidity in percentage relative humidity. A negative value indicates that a humidity value was not able to be measured. | SNMP POLL |

TABLE 6-continued

TEMPHUMID table

| FIELD NAME | Description | How Obtained |
| --- | --- | --- |
| MRTEMPHU1V1ID_HUMID LOWTHRESH | The humidity SNMP trap low threshold value of the sensor in percentage relative humidity. | SNMP GET |
| MRTEMPHUMID HUMID HIGHTHRESH | The humidity SNMP high threshold value of the sensor in percentage relative humidity. | SNMP GET |
| MRTEMPHUMIDTEMPSCALEID | Primary key into a table which contains strings corresponding to the scale used for temperature values. The default is Celsius. | SNMP GET |

As with the previous tables, most of the fields in a TEMPHUMID table are populated via SNMP. For the fields that can be either SNMP specified or user specified, the RPM may attempt to get the value via SNMP when the device is discovered. If unable, no value or a user specified value may be used. When the user specifies a value, an attempt may be made to set the new value on the actual device firmware. If the value to be set is one of the SNMP trap thresholds, the value must be successfully set on the outlet device firmware in order for it to take effect. Other values in the table may override the firmware values if the value in the table differs from the value on the actual hardware. The values that are only retrieved via an SNMP GET are not settable by the user since they are hardware configuration values from the system. The values that are retrieved via an SNMP Poll are dynamic values that may change as the system is used. The polling operations may occur as the data is required by the RPM (or its GUI), and the polling data may or may not be saved in the database (the labels may remain in the database for OID table lookup reasons). Much of the data retrieved via SNMP POLL operations may be stored in a TREND table for use with a trending feature.

A TEMPHUMID monitor table has a one-to-one relationship with a SYSTEM table and ENVMON table. The primary keys of the associated SYSTEM table and ENVMON table may be held in the TEMPHUMID table. Additional fields may be added to a TEMPHUMID table to support GUI functions such as the display of custom graphics.

Table 7 provides an exemplary CONTACTCLOSURE monitor table, which may be used for the monitor and control of contact closures, such as cabinet closures, water contact sensors, or other devices.

TABLE 7

CONTACTCLOSURE table

| FIELD NAME | Description | How Obtained |
| --- | --- | --- |
| MRCONTACTCLOSUREID | Primary Key | Generated when added |
| MRCONTACTCLOSURE NAME | User Assigned Name | From SNMP GET or from User entry |
| MRCONTACTCLOSRE_ABS NAME | System Generated - for example, a concatenation of the ENVMON absolute name and the number of theCONTACTCLOSURE monitor. The first monitor on the first ENVMON may be AI, the second may be A2. The first on the second ENVMON may be BI, the second may be B2 etc. All monitors have a unique absolute name that may be the system IP address appended with the absolute name | From SNMP GET |

TABLE 7-continued

CONTACTCLOSURE table

| FIELD NAME | Description | How Obtained |
|---|---|---|
| MRENVMONID | Primary key for the ENVMON associated with this monitor | Determined when added |
| MRSYSTEMID | Primary key for the ENVMON associated with this monitor | Determined when added |
| MRCONTACTCLOSURESTATUSID | Primary key for the ENVMON associated with this monitor | SNMP POLL |

A series of database tables may serve as STATUS LOOKUP tables. These tables allow the RPM application to easily determine the meaning of status returned for devices via SNMP polling. These tables use the status value returned as an index into a table, with the corresponding table record containing a text message, icon or other status indicator associated with the obtained status.

To facilitate SNMP processing, an OID LOOKUP TABLE may be created in the SQL SERVER database. This table may have, as one field, the label of the field in a table for which the value is retrieved via SNMP. A second field in the table entry may be the SNMP OID that is used to retrieve the value for the field corresponding to the label. For example, one entry in the MR_SNMP_OID_LOOKUP table may have a DATA LABEL field of MRSYSTEM AREA. That value is a label in the MRSYSTEM table that contains the area controlled by the system. The second field in the MR_SNMP_OID_LOOKUP table (the SNMP_OID field) may contain, for example, the value 0.1.3.6.1.4.1.1718.3.1.7, which would be the SNMP OID that is used to retrieve this value from the controller board firmware.

An outlet cluster is a group of outlets that can be assigned a name, which name can be used by an administrator to assign a user access to several outlets in one operation. This feature is implemented, in one embodiment, using three tables. The first table is the OUTLET CLUSTER table as shown in Table 8.

TABLE 8

OUTLET CLUSTER table

| FIELD NAME | Description | How Obtained |
|---|---|---|
| OUTLETCLUSERID | Primary Key | Generated when added |
| OUTLET_CLUSER NAME | User Assigned Name | From SNMP GET or from User entry |

The OUTLET CLUSTER table contains the name(s) of user-defined outlet clusters. Entries to this table are made when an administrator creates an outlet cluster.

The second table is the USER_OUTLETCLUSTER_ACCESS_LINK table as shown in Table 9. This table may be used to determine which users have access to which outlet clusters.

TABLE 9

USER_OUTLETCLUSTER ACCESS LINK table

| FIELD NAME | Description | How Obtained |
|---|---|---|
| USERID | Primary Key of an entry in the USERS table | Assigned when added |

TABLE 9-continued

USER_OUTLETCLUSTER ACCESS LINK table

| FIELD NAME | Description | How Obtained |
|---|---|---|
| OUTLETCLUSERID | Primary Key of an entry in the OUTLET CLUSTER table | Assigned when added |

The third table is the OUTCLUSTERS table, of which Table 10 is exemplary. This table may be used to determine which outlets are in which clusters.

TABLE 10

OUTLETCLUSTER table

| FIELD NAME | Description | How Obtained |
|---|---|---|
| OUTLETID | Primary Key of an entry in the OUTLET table | Assigned when added |
| OUTLETCLUSTER ID | Primary Key of an entry in the OUTLET CLUSTER table | Assigned when added |

TRENDING tables may be used to log historical SNMP polling data. In this manner, a user may monitor data trends, view or print reports, or take appropriate action based on a trend. A user may provide configuration information (in some cases via an initialization or .ini file) to specify how often SNMP polling should occur.

USERS tables may be used to specify what users have what authorizations to access data in other tables or change device parameters.

DISCOVERY tables may contain specific IP addresses, IP address ranges, or other information that enables an RPM application to discover systems, towers, infeeds, outlets or other devices.

GRAPHICAL DISPLAY tables may contain graphics or formatting information that are used to convey (e.g., display) any or all of the data contained in the tables to a user.

ALERT tables may contain information such as thresholds at which a user should be alerted that a parameter has changed. ALERT tables may also specify actions to be taken when an alert needs to be generated.

REPORT tables may contain formatting information for generating reports. The reports may be based on any or all of the parameters contained in other tables. Some or all of the reports may be configurable.

Additional tables that may be used include the following:

TABLE 11

Discovery_Results table

| FIELD NAME | Description | How Obtained |
| --- | --- | --- |
| RESULTID | An ID assigned by the system | System Identity Column |
| DISCID | Reference to an entry in the discovery work table | System assigned |
| IPTYPE | IP address type | From CDU Discovery process |
| IPADDR | IP address of the CDU | From CDU Discovery process |
| STATUS | Status of the discovery | From CDU Discovery process |
| DISCOVER_TIME | Time of discovery | From CDU Discovery process |
| TOWER_COUNT | Number of towers found on the CDU | From CDU |
| INFEED_COUNT | Number of Infeeds found on the CDU | From CDU |
| OUTLET_COUNT | Number of the total outlets found on the CDU | From CDU |
| ENVMON_COUNT | Number of the Environmental Monitors found on the CDU | From CDU |
| THP_COUNT | Number of the Temperature Humidity Sensors found on the CDU | From CDU |
| CC_COUNT | Number of contact closures found on the CDU | From CDU |

This table stores the information of the CDU as it was during the discovery time.

TABLE 12

Discovery_Work table

| FIELD NAME | Description | How Obtained |
| --- | --- | --- |
| DISCID | An ID assigned by the system | System Identity Column |
| INPROGRESS | Status of the progress of the discovery | System assigned |
| STARTTIME | Time the discovery started | System assigned |
| ENDTIME | Time the discovery ended | System assigned |
| IPSTART | First IP address to start discovering on | From Admin user on GUI |
| IPEND | Last IP address to end discovering on | From Admin user on GUI |
| IPTYPE | Type of IP address to use for discovery | From Admin user on GUI |
| COMM_PUBLIC | Public community string to use for discovery | From Admin user on GUI |
| COMM_PRIVATE | Private community string to use for discovery | From Admin user on GUI |
| FTP_USERNAME | FTP user name to use to download the config binary | From Admin user on GUI |
| FTP_PASSWORD | FTP password to use to download the config binary | From Admin user on GUI |

This table stores each user initiated discovery, time it started, time it ended and a status on its progress.

TABLE 13

DisplayMaps table

| FIELD NAME | Description | How Obtained |
|---|---|---|
| DISPLAYMAPID | An ID assigned by the system | System Identity Column |
| MAP_FILE_NAME | Name of the image file on disk | From Admin user on GUI |
| MAP_LEVEL | Not used | Not used |
| MAP_PARENT_DISPLAY MAPID | ID of the parent display map | From Admin user on GUI |
| MAP_NAME | Name of this map or location | From Admin user on GUI |
| MAP_IMAGE | Not used | Not used |
| XLOC1 | X position on parent map | From Admin user on GUI |
| YLOC1 | Y position on parent map | From Admin user on GUI |
| WIDTH | Image width in pixels | From Admin user on GUI |
| HEIGHT | Image height in pixels | From Admin user on GUI |

This table stores all the information of the enabled locations in the system.

TABLE 14

DisplayMaps_Unused table

| FIELD NAME | Description | How Obtained |
|---|---|---|
| DISPLAYMAPID | An ID assigned by the system | System Identity Column |
| MAP_FILE_NAME | Name of the image file on disk | From Admin user on GUI |
| MAP_LEVEL | Not used | Not used |
| MAP_PARENT_DISPLAYMAPID | ID of the parent display map | From Admin user on GUI |
| MAP_NAME | Name of this map or location | From Admin user on GUI |
| MAP_IMAGE | Not used | Not used |
| XLOC1 | X position on parent map | From Admin user on GUI |
| YLOC1 | Y position on parent map | From Admin user on GUI |
| WIDTH | Image width in pixels | From Admin user on GUI |
| HEIGHT | Image height in pixels | From Admin user on GUI |

This table stores all the information of the disabled locations in the system.

TABLE 15

Location_OutletCluster_Link table

| FIELD NAME | Description | How Obtained |
|---|---|---|
| DisplayMapID | Link to DisplayMaps table | From Admin user on GUI |
| OutletClusterID | Link to OutletCluster table | From Admin user on GUI |

Links all the locations to outletclusters for ease of filtering

TABLE 16

MREnvMon_Poll_Data table

| FIELD NAME | Description | How Obtained |
|---|---|---|
| ID | An ID assigned by the system | System Identity Column |
| Poll_DateTime | Last timestamp these values were valid | System assigned |
| MREnvMonID | Link to MREnvMon table | System assigned |
| MREnvMon_ADC_Count | ADC count on the CDU | From CDU |

Stores all of the polling data for Environmental Monitors

TABLE 17

MRInfeed_Poll_Data table

| FIELD NAME | Description | How Obtained |
|---|---|---|
| ID | An ID assigned by the system | System Identity Column |
| Poll_DateTime | Last timestamp these values were valid | System assigned |
| MRInfeedID | Link to MRInfeed table | System assigned |
| MRInfeed_Load_Value | Infeed Load on the CDU | From CDU |
| MRInfeed_Voltage | Infeed Voltage on the CDU | From CDU |
| MRInfeed_Power | Infeed Power on the CDU | From CDU |
| WattHours | Calculated Watts used for this particular data record | System Assigned |

Stores all the polling data for Infeeds.

TABLE 18

MROutlet_Poll_Data table

| FIELD NAME | Description | How Obtained |
|---|---|---|
| ID | An ID assigned by the system | System Identity Column |

TABLE 18-continued

MROutlet_Poll_Data table

| FIELD NAME | Description | How Obtained |
|---|---|---|
| Poll_DateTime | Last timestamp these values were valid | System assigned |
| MROutletID | Link to MROutlet table | System assigned |
| MROutlet_Load_Value | Outlet Load on the CDU | From CDU |
| WattHours | Calculated Watts used for thisparticular record | System Assigned |
| MROutlet_Power | Outlet Power on the CDU | From CDU |

Stores all the polling data for Outlets.

TABLE 19

MRSystem_Poll_Data table

| FIELD NAME | Description | How Obtained |
|---|---|---|
| ID | An ID assigned by the system | System Identity Column |
| Poll_DateTime | Last timestamp these values were valid | System assigned |
| MRSystemID | Link to MRSystem table | System assigned |
| MRSystem_Watts_Per_Unit_Area | Watts per unit area on the CDU | From CDU |
| MRSystem_Total_Power | Total power on the CDU | From CDU |

Stores all the polling data for the system table.

TABLE 20

MRTempHumid_Poll_Data table

| FIELD NAME | Description | How Obtained |
|---|---|---|
| ID | An ID assigned by the system | System Identity Column |
| Poll_DateTime | Last timestamp these values were valid | System assigned |
| MRTempHumidID | Link to MRTempHumid table | System assigned |
| MRTempHumid_Temp_Value | Temperature on the CDU | From CDU |
| MRTempHumid_Humid_Value | Humidity on the CDU | From CDU |

Stores all the polling data for the temperature humidity probes.

TABLE 21

MRTower_Poll_Data table

| FIELD NAME | Description | How Obtained |
|---|---|---|
| ID | An ID assigned by the system | System Identity Column |
| Poll_DateTime | Last timestamp these values were valid | System assigned |
| MRTowerID | Link to MRTower table | System assigned |
| MRTowerStatusID | Tower Status on the CDU | From CDU |

Stores all the polling data for the towers.

TABLE 22

Racks table

| FIELD NAME | Description | How Obtained |
|---|---|---|
| RackID | An ID assigned by the system | System Identity Column |
| RackName | Name of the Rack or Cabinet | From Admin user on GUI |
| Rack_Parent_DisplaymapID | Link to the DisplayMaps table | From Admin user on GUI |
| XLoc1 | X Position of cabinet on the parent map | From Admin user on GUI |
| YLoc1 | Y Position of cabinet on the parent map | From Admin user on GUI |
| Total_Sq_Ft | Total Square feet this cabinet represents | From Admin user on GUI |
| Slots | Number of slots or (Units) this cabinet has | From Admin user on GUI |

Stores all the information about the rack and where it is.

TABLE 23

Settings table

| FIELD NAME | Description | How Obtained |
|---|---|---|
| Setting | Name of setting | From Admin user on GUI |
| Value | Value of the setting | From Admin user on GUI |

Misc system settings stored here.

TABLE 24

SysChange table

| FIELD NAME | Description | How Obtained |
|---|---|---|
| Setting | Name of the setting | From Admin user on GUI, telnet or serial connections |
| Value | Value of the setting | From Admin user on GUI, telnet or serial connections |

Misc system settings used by all internal programs stored here.

TABLE 25

T_DisplayView table

| FIELD NAME | Description | How Obtained |
|---|---|---|
| ViewID | ID of a view representation | Configured during install or external setup process |
| Description | Name to be used for the GUI display for the view | Configured during install or external setup process |
| ToolTip | Extra information to be displayed on a tooltip | Configured during install or external setup process |
| Order | Order of display that can override normal sorting | Configured during install or external setup process |

List of system views that are supported by the main view screen.

TABLE 26

T_DisplayViewItems table

| FIELD NAME | Description | How Obtained |
|---|---|---|
| ViewItemID | ID of the View item | Configured during install or external setup process |
| ViewID | Link to the T_DisplayView table | Configured during install or external setup process |
| Description | Text to display on the legend | Configured during install or external setup process |
| Start | Start value of the item category | Configured during install or external setup process |
| End | End value of the item category | Configured during install or external setup process |
| Color | Color this item will be displayed as | Configured during install or external setup process |
| Order | Order of display that can override normal sorting | Configured during install or external setup process |

The categories each system view will use to determine that view's data measurement will belong to. Each category will indicate a color and text to be displayed to the user.

TABLE 27

T_EnvMonStatus table

| FIELD NAME | Description | How Obtained |
|---|---|---|
| EnvMonStatusID | ID from CDU MIB | CDU MIB |
| StatusText | Text of the status | CDU MIB |
| StatusLevel | Not used yet | Not used yet |

Environmental Monitor statuses.

TABLE 28

T_ManualAdd table

| FIELD NAME | Description | How Obtained |
|---|---|---|
| ManualAddID | An ID assigned by the system | System Identity Column |
| IPAddress | IP Address of the CDU | From Admin user on GUI |
| Comm_Public | Public community string of the CDU | From Admin user on GUI |
| Comm_Private | Private community string of the CDU | From Admin user on GUI |
| FTP_Username | FTP user name to use to get the config binary off the CDU | From Admin user on GUI |
| FTP_Password | FTP password to use to get the config binary off the CDU | From Admin user on GUI |

A temporary holding place for manually added devices. These entries will be repeatedly submitted to the discovery table until the device is successfully managed.

TABLE 29

T_TowerStatus table

| FIELD NAME | Description | How Obtained |
|---|---|---|
| TowerStatusID | ID from CDU MIB | CDU MIB |
| StatusText | Text of the status | CDU MIB |
| StatusLevel | Not used yet | Not used yet |

CDU Tower status table.

TABLE 30

User_Location_Access_Link table

| FIELD NAME | Description | How Obtained |
|---|---|---|
| UserID | A link to the Users table where UserGroupID := UserID | From Admin user on GUI |
| DisplayMapID | Link to the DisplayMaps table | From Admin user on GUI |

UserGroup Access restriction table.

TABLE 31

User_Outlet_Access_Link table

| FIELD NAME | Description | How Obtained |
|---|---|---|
| UserID | A link to the Users table where UserGroupID := UserID | From Admin user on GUI |
| OutletID | Link to the MROutlet table | From Admin user on GUI |

UserGroup Access restriction table

TABLE 32

User_OutletCluster_Access_Link table

| FIELD NAME | Description | How Obtained |
|---|---|---|
| UserID | A link to the Users table where UserGroupID := UserID | From Admin user on GUI |
| OutletClusterID | Link to the OutletCluster table | From Admin user on GUI |

UserGroup Access restriction table.

TABLE 33

User_Rack_Access_Link table

| FIELD NAME | Description | How Obtained |
|---|---|---|
| UserID | A link to the Users table where UserGroupID := UserID | From Admin user on GUI |
| RackID | Link to the Rack table | From Admin user on GUI |

UserGroup Access restriction table.

TABLE 34

User_System_Access_Link table

| FIELD NAME | Description | How Obtained |
|---|---|---|
| UserID | A link to the Users table where UserGroupID := UserID | From Admin user on GUI |
| SystemID | Link to the MRSystem table | From Admin user on GUI |

TABLE 35

Userlogins table

| FIELD NAME | Description | How Obtained |
|---|---|---|
| USERLOGINID | An ID assigned by the system | System Identity Column |
| USERNAME | The logon name | Created by the Admin User via the GUI |
| USERPASSWORD | The logon's encrypted password | Updated by the user via the GUI |
| USERGROUPID | A link to the Users table where UserGroupID := UserID | Created by the Admin User via the GUI |
| HOMEMAPID | A link to the DisplayMaps table | GUI via the User |

All user logons for the system with their preferred home map id and passwords encrypted.

TABLE 36

Users table

| FIELD NAME | Description | How Obtained |
|---|---|---|
| USERID | An ID given to the user group | Created by the system |
| USERNAME | Really a user group name | Created by the Admin User via the GUI |
| USERCAPABILITIESID | A field to hold any special capabilities of this user group like permission levels | Created by the Admin User via the GUI |
| HOMEMAPID | A link to the DisplayMaps table | GUI via the user |

This is the Usergroup table as of version 3.1 with all the user groups and the default home map id in it.

TABLE 37

ActionLog table

| FIELD NAME | Description | How Obtained |
|---|---|---|
| ALOGID | An ID given to the user group | Created by the system |
| USERNAME | Login name or system name that performed the logged action | System assigned |
| ACTION_TIME | Time of the logged action | System assigned |
| USER_IP | IP address of the user performing the action | System assigned |
| ACTION_TYPE | Type of action | System assigned |
| OBJECT_PK | ID of Object logged | System assigned |
| OBJECT_TYPE | Type of Object logged | System assigned |
| ACTION_MSG | Formatted message of the log | System assigned |

The system and user action logs are stored here.

TABLE 38

Keys table

| FIELD NAME | Description | How Obtained |
|---|---|---|
| KEY | User software activation key | Created by the Admin User via the GUI |
| APPLIED | Timestamp it was applied to the system | Created by the Admin User via the GUI |

A list of all submitted software keys in the system.

A list of views is provided in List 1.
R_CDUByLocation
R_EnvMons
R_Towers
V_AllDisplayMaps V_CDUEnvSensors
V_CDUManagedData
V_CDUOutlets
V_CDUOutletsWithSecurity
V_DisplayViewData
V_DisplayViewDataWithSecurity
V_EnvironmentalMonitors
V_EnvironmentalMonitorsWithSecurity
V_InfeedPowerByCDUDetailedPerDay
V_InfeedPowerByCDUDetailedPerMonth
V_InfeedPowerByCDUDetailedPerYear
V_InfeedPowerByCDUPerDau
V_InfeedPowerByCDUPerDay
V_InfeedPowerByCDUPerMonth
V_InfeedPowerByCDUPerYear
V_InfeedPowerByLocationPerDay
V_InfeedPowerByLocationPerMonth
V_InfeedPowerByLocationPerYear
V_InfeedPowerByRackPerDay
V_InfeedPowerByRackPerMonth
V_InfeedPowerByRackPerYear
V_InfeedPowerData
V_InfeedPowerDataByCDUPerMonth
V_Items
V_ItemsWithSecurity
V_OutletPowerByCDUDetailedPerDay
V_OutletPowerByCDUDetailedPerMonth
V_OutletPowerByCDUDetailedPerYear
V_OutletPowerByCDUPerDay
V_OutletPowerByCDUPerMonth
V_OutletPowerByCDUPerYear
V_OutletPowerByClusterDetailedPerDay
V_OutletPowerByClusterDetailedPerMonth
V_OutletPowerByClusterDetailedPerYear
V_OutletPowerByClusterPerDay
V_OutletPowerByClusterPerMonth
V_OutletPowerByClusterPerYear
V_OutletPowerByLocationPerDay
V_OutletPowerByLocationPerMonth
V_OutletPowerByLocationPerYear
V_OutletPowerByRackPerDay
V_OutletPowerByRackPerMonth
V_OutletPowerByRackPerYear
V_OutletPowerData
V_OutletPowerDataByClusterPerDay
V_OutletPowerDataByClusterPerMonth
V_OutletPowerDataByClusterPerYear
V_Outlets
V_Search
V_SearchCriteria
V_SymbolList
V_SystemEditSelect
V_SYSTEMSTATUS List 1

As described above, a graphical user interface may include one or more depictions of geographical locations to show the locations of various CDUs in a given power distribution system. The interface may further provide photographs of these various locations in whatever degree of detail may be desired by users of the power management system. Such photographs may depict one or more equipment racks including icons to indicate rack status. Both a geographic location and a depiction of a rack may be color-coded or may include a color-coded icon based on status.

Information from one or more tables, for example the SYSTEM, TOWER, INFEED and OUTLET tables, may be used to provide a listing of towers or other PDUs, infeeds and outlets associated with a selected rack. For each infeed and outlet, a status is provided. Load, voltage and power readings are provided for an infeed. Hyperlinks for turning each outlet ON or OFF, and for REBOOTing, are also provided. The tower, infeed and outlets may each be configured with a custom name as specified by a user.

A user may view a summary of statuses of various devices in a system. For example, an "alarms" listing may be generated from the tables to show which elements of the system are not in a normal status and to describe the nature of the abnormality. In similar fashion, a user may be provided with a listing of environmental conditions at various ones of the CDUs.

A user may also view a listing of clusters together with any desired information about each cluster. As with other listings, a cluster listing may give the user various command options such as "Turn On all outlets in the cluster", "Turn Off all outlets in the cluster", or "Reboot".

Information from the tables, for example the TREND table, may be used to illustrate trends between starting and ending dates and times of interest. The user may select the type of trend data to be viewed, such as temperature, humidity, infeed load, infeed voltage, infeed power, system watts per unit area of a location or a cabinet, or total system power usage.

The embodiments described above may be implemented using various software and hardware resources. Typically, however, a power manager such as the RPM 102 and database 112 will be implemented by means of computer-readable program code stored on computer-readable media. The computer-readable media may include, for example, any number or mixture of fixed or removable media (such as one or more fixed disks, random access memories (RAMs), read-only memories (ROMs), or compact discs), at either a single location or distributed over a network. The computer readable code will typically comprise software, but could also comprise firmware or a programmed circuit.

Those of skill will appreciate that the various illustrative logical blocks, modules, circuits, and algorithm steps described in connection with the embodiments disclosed herein may be implemented as electronic hardware, computer software, firmware, or combinations thereof. To clearly illustrate this interchangeability, various illustrative components, blocks, modules, circuits, and steps have been described above generally in terms of their functionality. Whether such functionality is implemented as hardware, software, and/or firmware depends upon the particular application and design constraints imposed on the overall system. Skilled artisans may implement the described functionality in varying ways for each particular application, but such implementation decisions should not be interpreted as causing a departure from the scope of the present invention.

For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. For a firmware and/or software implementation, the methodologies may be implemented with modules (e.g., procedures, functions, and so on) that perform the functions described herein.

Figure 18:
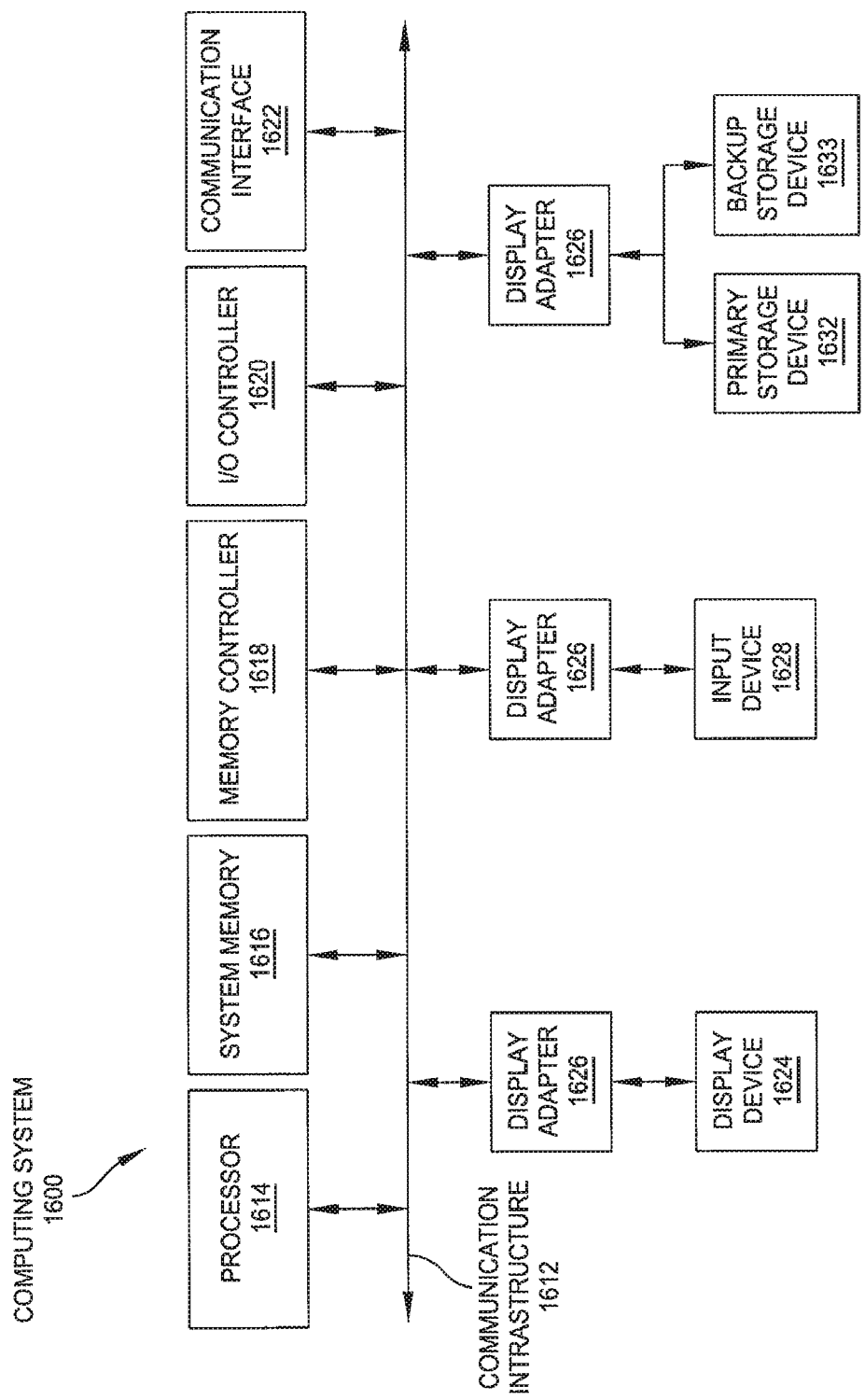
FIG. 18 is a block diagram of an exemplary computing system capable of implementing one or more of the embodiments described and/or illustrated herein.

FIG. 18 is a block diagram of an exemplary computing system 1610 capable of implementing one or more of the embodiments described and/or illustrated herein. Computing system 1610 broadly represents any single or multi-processor computing device or system capable of executing computer-readable instructions. Examples of computing system 1610 include, without limitation, workstations, laptops, client-side terminals, servers, distributed computing systems, handheld devices, or any other computing system or device. In its most basic configuration, computing system 1610 may comprise at least one processor 1614 and a system memory 1616.

Processor 1614 generally represents any type or form of processing unit capable of processing data or interpreting and executing instructions. In certain embodiments, processor 1614 may receive instructions from a software application or module. These instructions may cause processor 1614 to perform the functions of one or more of the exemplary embodiments described and/or illustrated herein. For example, processor 1614 may perform and/or be a means for performing, either alone or in combination with other elements, one or more of the identifying, transmitting, receiving, determining, selecting, and using steps described herein. Processor 1614 may also perform and/or be a means for performing any other steps, methods, or processes described and/or illustrated herein.

System memory 1616 generally represents any type or form of volatile or non-volatile storage device or medium capable of storing data and/or other computer-readable instructions. Examples of system memory 1616 include, without limitation, random access memory (RAM), read only memory (ROM), flash memory, or any other suitable memory device. Although not required, in certain embodiments computing system 1610 may comprise both a volatile memory unit (such as, for example, system memory 1616) and a non-volatile storage device (such as, for example, primary storage device 1632, as described in detail below).

In certain embodiments, exemplary computing system 1610 may also comprise one or more components or elements in addition to processor 1614 and system memory 1616. For example, computing system 1610 may comprise a memory controller 1618, an Input/Output (I/O) controller 1620, and a communication interface 1622, each of which may be interconnected via a communication infrastructure 1612. Communication infrastructure 1612 generally represents any type or form of infrastructure capable of facilitating communication between one or more components of a computing device. Examples of communication infrastructure 1612 include, without limitation, a communication bus (such as an ISA, PCI, PCIe, or similar bus) and a network.

Memory controller 1618 generally represents any type or form of device capable of handling memory or data or controlling communication between one or more components of computing system 1610. For example, in certain embodiments memory controller 1618 may control communication between processor 1614, system memory 1616, and I/O controller 1620 via communication infrastructure 1612. In certain embodiments, memory controller may perform and/or be a means for performing, either alone or in combination with other elements, one or more of the steps or features described and/or illustrated herein, such as identifying, transmitting, receiving, determining, selecting, and using.

I/O controller 1620 generally represents any type or form of module capable of coordinating and/or controlling the input and output functions of a computing device. For example, in certain embodiments I/O controller may control or facilitate transfer of data between one or more elements of computing system 1610, such as processor 1614, system memory 1616, communication interface 1622, display adapter 1626, input interface 1630, and storage interface 1634. I/O controller 1620 may be used, for example, to perform and/or be a means for performing, either alone or in combination with other elements, one or more of the identifying, transmitting, receiving, determining, selecting, and using steps described herein. I/O controller 1620 may also be used to perform and/or be a means for performing other steps and features set forth in the instant disclosure.

Communication interface 1622 broadly represents any type or form of communication device or adapter capable of facilitating communication between exemplary computing system 1610 and one or more additional devices. For example, in certain embodiments communication interface 1622 may facilitate communication between computing system 1610 and a private or public network comprising additional computing systems. Examples of communication interface 1622 include, without limitation, a wired network interface (such as a network interface card), a wireless network interface (such as a wireless network interface card), a modem, and any other suitable interface. In at least one embodiment, communication interface 1622 may provide a direct connection to a remote server via a direct link to a network, such as the Internet. Communication interface 1622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 1622 may also represent a host adapter configured to facilitate communication between computing system 1610 and one or more additional network or storage devices via an external bus or communications channel. Examples of host adapters include, without limitation, SCSI host adapters, USB host adapters, IEEE 1694 host adapters, SATA and eSATA host adapters, ATA and PATA host adapters, Fibre Channel interface adapters, Ethernet adapters, or the like. Communication interface 1622 may also allow computing system 1610 to engage in distributed or remote computing. For example, communication interface 1622 may receive instructions from a remote device or send instructions to a remote device for execution. In certain embodiments, communication interface 1622 may perform and/or be a means for performing, either alone or in combination with other elements, one or more of the identifying, transmitting, receiving, determining, selecting, and using steps disclosed herein. Communication interface 1622 may also be used to perform and/or be a means for performing other steps and features set forth in the instant disclosure.

Computing system 1610 may also comprise at least one display device 1624 coupled to communication infrastructure 1612 via a display adapter 1626. Display device 1624 generally represents any type or form of device capable of visually displaying information forwarded by display adapter 1626. Similarly, display adapter 1626 generally represents any type or form of device configured to forward graphics, text, and other data from communication infrastructure 1612 (or from a frame buffer, as known in the art) for display on display device 1624.

Exemplary computing system 1610 may also comprise at least one input device 1628 coupled to communication infrastructure 1612 via an input interface 1630. Input device 1628 generally represents any type or form of input device capable of providing input, either computer or human generated, to exemplary computing system 1610. Examples of input device 1628 include, without limitation, a keyboard, a pointing device, a speech recognition device, or any other input device. In at least one embodiment, input device 1628 may perform and/or be a means for performing, either alone or in combination with other elements, one or more of the identifying, transmitting, receiving, determining, selecting, and using steps disclosed herein. Input device 1628 may also be used to perform and/or be a means for performing other steps and features set forth in the instant disclosure.

Exemplary computing system 1610 may also comprise a primary storage device 1632 and a backup storage device 1633 coupled to communication infrastructure 1612 via a storage interface 1634. Storage devices 1632 and 1633 generally represent any type or form of storage device or medium capable of storing data and/or other computer-readable instructions. For example, storage devices 1632 and 1633 may be a magnetic disk drive (e.g., a so-called hard drive), a floppy disk drive, a magnetic tape drive, an optical disk drive, a flash drive, or the like. Storage interface 1634 generally represents any type or form of interface or device for transferring data between storage devices 1632 and 1633 and other components of computing system 1610.

In certain embodiments, storage devices 1632 and 1633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1632 and 1633 may also comprise other similar structures or devices for allowing computer software, data, or other computer-readable instructions to be loaded into computing system 1610. For example, storage devices 1632 and 1633 may be configured to read and write software, data, or other computer-readable information. Storage devices 1632 and 1633 may also be a part of computing system 1610 or may be a separate device accessed through other interface systems.

In certain embodiments, the exemplary file systems disclosed herein may be stored on primary storage device 1632, while the exemplary file-system backups disclosed herein may be stored on backup storage device 1633. Storage devices 1632 and 1633 may also be used, for example, to perform and/or be a means for performing, either alone or in combination with other elements, one or more of the identifying, transmitting, receiving, determining, selecting, and using steps disclosed herein. Storage devices 1632 and 1633 may also be used to perform and/or be a means for performing other steps and features set forth in the instant disclosure.

Many other devices or subsystems may be connected to computing system 1610. Conversely, all of the components and devices illustrated need not be present to practice the embodiments described and/or illustrated herein. The devices and subsystems referenced above may also be interconnected in different ways from that shown. Computing system 1610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 1610. All or a portion of the computer program stored on the computer-readable medium may then be stored in system memory 1616 and/or various portions of storage devices 1632 and 1633. When executed by processor 1614, a computer program loaded into computing system 1610 may cause processor 1614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 1610 may be configured as an application specific integrated circuit (ASIC) adapted to implement one or more of the exemplary embodiments disclosed herein.

Figure 19:
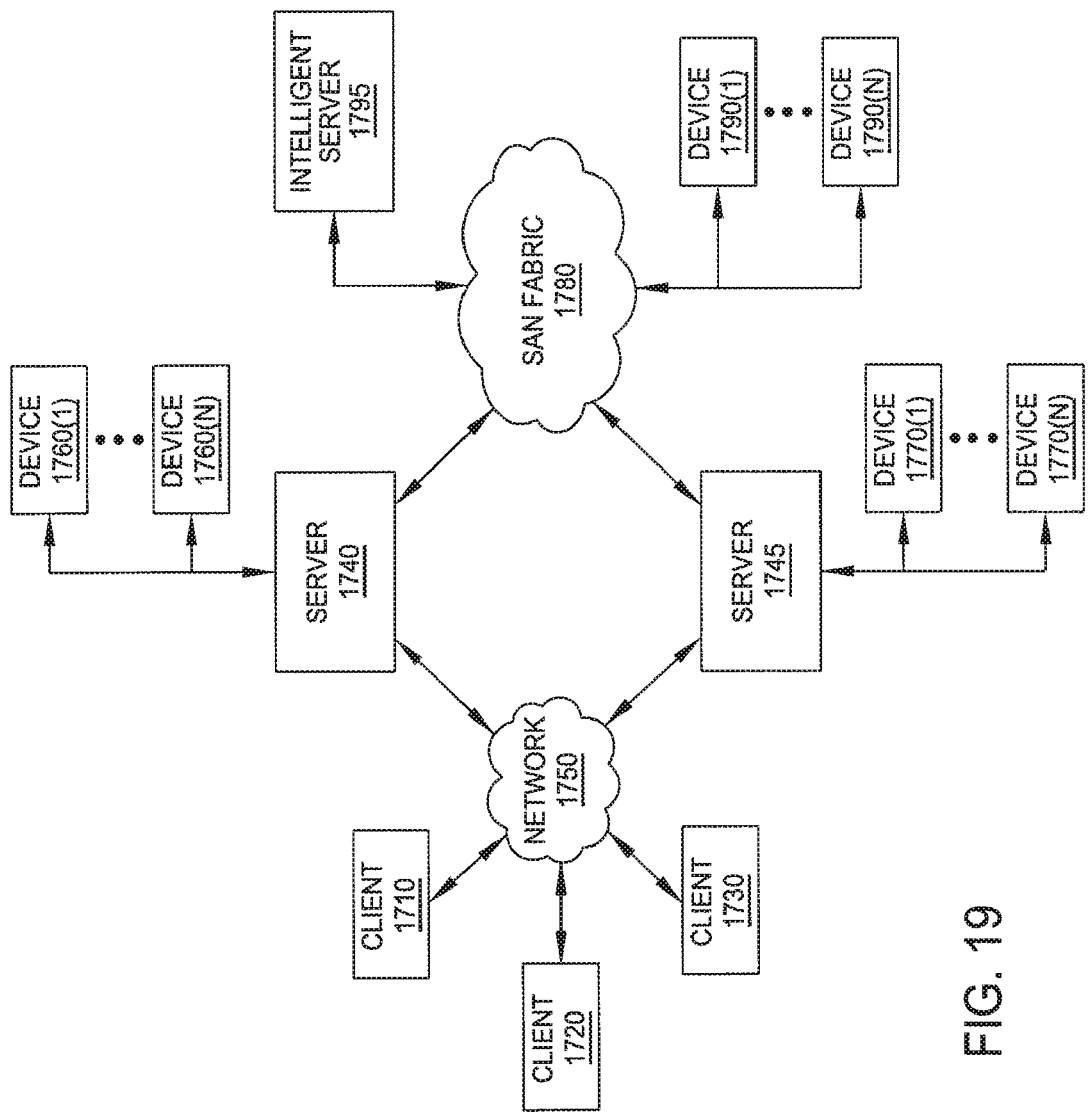
FIG. 19 is a block diagram of an exemplary computing network capable of implementing one or more of the embodiments described and/or illustrated herein.

FIG. 19 is a block diagram of an exemplary network architecture 1700 in which client systems 1710, 1720, and 1730 and servers 1740 and 1745 may be coupled to a network 1750. Client systems 1710, 1720, and 1730 generally represent any type or form of computing device or system, such as exemplary computing system 1610. Similarly, servers 1740 and 1745 generally represent computing devices or systems, such as application servers or database servers, configured to provide various database services and/or to run certain software applications. Network 1750 generally represents any telecommunication or computer network; including, for example, an intranet, a wide area network (WAN), a local area network (LAN), a personal area network (PAN), or the Internet.

As illustrated, one or more storage devices 1760(1)-(N) may be directly attached to server 1740. Similarly, one or more storage devices 1770(1)-(N) may be directly attached to server 1745. Storage devices 1760(1)-(N) and storage devices 1770(1)-(N) generally represent any type or form of storage device or medium capable of storing data and/or other computer-readable instructions. In certain embodiments, storage devices 1760(1)-(N) and storage devices 1770(1)-(N) may represent network-attached storage (NAS) devices configured to communicate with servers 1740 and 1745 using various protocols, such as NFS, SMB, or CIFS.

Servers 1740 and 1745 may also be connected to a storage area network (SAN) fabric 1780. SAN fabric 1780 generally represents any type or form of computer network or architecture capable of facilitating communication between a plurality of storage devices. SAN fabric 1780 may facilitate communication between servers 1740 and 1745 and a plurality of storage devices 1790(1)-(N) and/or an intelligent storage array 1795. SAN fabric 1780 may also facilitate, via network 1750 and servers 1740 and 1745, communication between client systems 1710, 1720, and 1730 and storage devices 1790(1)-(N) and/or intelligent storage array 1795 in such a manner that devices 1790(1)-(N) and array 1795 appear as locally attached devices to client systems 1710, 1720, and 1730. As with storage devices 1760(1)-(N) and storage devices 1770(1)-(N), storage devices 1790(1)-(N) and intelligent storage array 1795 generally represent any type or form of storage device or medium capable of storing data and/or other computer-readable instructions.

In certain embodiments, and with reference to exemplary computing system 1617, a communication interface, such as communication interface 1622, may be used to provide connectivity between each client system 1710, 1720, and 1730 and network 1750. Client systems 1710, 1720, and 1730 may be able to access information on server 1740 or 1745 using, for example, a web browser or other client software. Such software may allow client systems 1710, 1720, and 1730 to access data hosted by server 1740, server 1745, storage devices 1760(1)-(N), storage devices 1770(1)-(N), storage devices 1790(1)-(N), or intelligent storage array 1795. Although the figure depicts the use of a network (such as the Internet) for exchanging data, the embodiments described and illustrated herein are not limited to the Internet or any particular network-based environment.

In at least one embodiment, all or a portion of one or more of the exemplary embodiments disclosed herein may be encoded as a computer program and loaded onto and executed by server 1740, server 1745, storage devices 1760(1)-(N), storage devices 1770(1)-(N), storage devices 1790(1)-(N), intelligent storage array 1795, or any combination thereof. All or a portion of one or more of the exemplary embodiments disclosed herein may also be encoded as a computer program, stored in server 1740, run by server 1745, and distributed to client systems 1710, 1720, and 1730 over network 1750. Accordingly, network architecture 1700 may perform and/or be a means for performing, either alone or in combination with other elements, one or more of the identifying, transmitting, receiving, determining, selecting, and using steps disclosed herein. Network architecture 1700 may also be used to perform and/or be a means for performing other steps and features set forth in the instant disclosure.

As detailed above, computing system 1610 and/or one or more of the components of network architecture 1700 may perform and/or be a means for performing, either alone or in combination with other elements, one or more steps of the exemplary methods described and/or illustrated herein. For example, a computer-implemented method for determining a file set may comprise identifying a file set. The method may also comprise identifying a key file for the file set. A first computing system may comprise the file set. The method may further comprise transmitting a key-file identifier to a second computing system, the key-file identifier identifying the key file. The first computing system may receive the first and second file identifiers from the second computing system. The first file identifier may be associated with a first file-identifier set. The second file identifier may be associated with a second file-identifier set. The key-file identifier may be associated with both the first file-identifier set and the second file-identifier set. The method may comprise determining whether the file set comprises a file identified by the first file identifier, and whether the file set comprises a file identified by the second file identifier. The first computing system may transmit a result of the determination to the second computing system.

In certain embodiments, identifying a file set may comprise selecting a file directory, selecting a group of files within a directory, selecting files associated with a computer program, and selecting a plurality of files contained on a file storage device. In an additional embodiment, the key file may be a randomly selected file within the file set.

In at least one embodiment, determining a file set may further comprise identifying a set of key files from the file set. The first computing system may comprise the file set. Determining a file set may further comprise transmitting a set of key-file identifiers to the second computing system, wherein each key-file identifier in the set of key-file identifiers identifies a file in the set of key files. The method may also comprise receiving a plurality of file identifiers from the second computing system, wherein each file identifier in the plurality of file identifiers is associated with a different file-identifier set. The first computing system may determine which files identified by the plurality of file identifiers are contained within the file set.

In certain embodiments, the key-file identifier may comprise at least one of a file name of the key file, a version number of the key file, and a hash of the key file. The key-file identifier may also comprise a file size of the key file, a name of a directory where the key file is stored on the first computing system, and a system identifier for the first computing system.

In additional embodiments, wherein each of receiving the first and second file identifiers, determining whether the file set comprises the files identified by the first and second identifiers, and transmitting the result of the determination may be repeated. The aforementioned steps are repeated until the result provides the second computing system with enough information to identify the file set or the first computing system receives an unknown-file-set indication. In a further embodiment the result of the determination may comprise a system identifier for the first computing system, the key-file identifier, the first file identifier, and/or the second file identifier.

A computer implemented method for determining a file set may comprise receiving a key file identifier from a first computing system, the key file identifier identifying a key file associated with the file set. The second computing system may also identify first and second file-identifier sets associated with the key file. The method further comprises identifying a first file identifier in the first file-identifier set, and identifying a second file identifier in the second file-identifier set. The second computing system may transmit the first and second file identifiers to the first computing system. The method also comprises receiving a result from the first computing system, the result being based on a comparison of the first and second file identifiers with the file set. The second computing system may use the result to identify the file set.

In an additional embodiment, a computer implemented method for determining a file set may comprise a file-set database. The file-set database may comprise at least one of a table of file names, a table of file versions, a table of file hashes, a table of file directories, a table of file sets, a table of associations of files to file sets. In certain embodiments, identifying a first and second file identifier for the first and second file identifier set may comprise determining that the first file identifier is not in the second file-identifier set and determining that the second file identifier is not in the first file-identifier set.

In certain embodiments, a computer implemented method for determining a file set may further comprise receiving a set of key-file identifiers from the first computing system. The method may also comprise identifying a plurality of file-identifier sets associated with the set of key files, and identifying file identifiers associated with the plurality of file-sets. In a further embodiment, an identifier for the key file may comprise at least one of a file name of the key file, a version number of the key file, a hash of the key file, a file size of the key file, a name of a directory where the key file is stored on the first computing system. In an additional embodiment, the result may comprise a system identifier for the first computing system, the key-file identifier, the first file identifier, the second file identifier.

In certain embodiments, wherein identifying the first and second file identifiers for the first and second file set, transmitting the first and second file to the first computing system, and receiving a result is repeated. The aforementioned method is repeated until the result contains enough information to identify the file set or the result contains data that exceeds a file-set-identifier threshold. In a further embodiment the file-set-identifier threshold may comprise a ratio of the number of total file identifiers transmitted to the first computing system. The file-set-identifier threshold may also comprise the number of file sets associated with the key file and a number of transmissions between the first computing system and the second computing system, where the transmissions contain information to identify the file set. In an additional embodiment, an unknown-file-set indication is transmitted to the first computing system.

In an additional embodiment, the key-file identifier is transmitted to the first computing system. In a further embodiment, identifying the file set from the result may comprise identifying a file-identifier set containing the identifier for the key file and identifying a file-identifier set containing a file identifier transmitted in the result.

In certain embodiments, a computer-readable medium may comprise one or more computer executable instructions that, when executed by a computing system, cause the computing system to identify a file set; identify a key file for the file set, a first computing system comprising the file set; transmit a key-file identifier to a second computing system, the key-file identifier identifying the key file; receive first and second file identifiers from the second computing system, a first file identifier being associated with a first file-identifier set, a second file identifier being associated with a second file-identifier set, and the key-file identifier being associated with both the first file-identifier set and the second file-identifier set; determine at least one of whether the file set comprises a file identified by the first file identifier and whether the file set comprises a file identified by the second file identifier; transmit a result of the determination to the second computing system;

In an additional embodiment, one or more computer-executable instructions, when executed by the computing device, further cause the computing device to identify a set of key files from the file set, the first computing system comprising the file set, transmit a set of key-file identifiers to the second computing system, wherein each key-file identifier in the set of key-file identifiers identifies a file in the set of key files, receive a plurality of file identifiers from the second computing system, wherein each file identifier in the plurality of file identifiers is associated with a different file-identifier set, determine which files identified by the plurality of file identifiers are contained within the file set.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

A system architecture that embodies the principles of the invention makes possible the collection of power information at the individual outlet, CDU, group and cluster level and the placing of this information into a database.

Power (for example in kilowatts) and power consumption (for example in kilowatt-hours) can be provided in many different ways, including for example per cabinet, per row of cabinets, per multiple rows of cabinets, per data center or multiple data centers, per device or application, or even per outlet. This information is collected over a network and stored within a database, for example as described above. The collection period may be defined by a user. The information can made the subject of a trend analysis, a log, a report, a billing invoice, or the like. The information can be exported to a building management system (BMS) or any other system in a data center environment.

The information and control provided by embodiments of the invention can be used, for example, by a data center operator to associate and allocate or trend power data to individual users, departments or applications. Billing can be accomplished per data center, per server owner, per application or even according to the time of day. In an enterprise data center an individual department (for example, the accounting department) can be billed for the cost of their application running within their own datacenter. In a co-location facility, customers call be billed for the power usage of just their devices within a shared rack. An enterprise data center can schedule work according to the cost per kW depending on the time of day.

A business entity can measure energy efficiency to meet requirements that may be imposed by government agencies, for example as discussed in Appendices B through G.

Monitoring and logging outlet power data can identify abnormal power supply behavior, so the affected IT assets can be identified for preventive maintenance actions to reduce downtime. For example, a large spike in current draw could be used to inform a user that a power supply has failed or is about to fail.

It has been estimated that as many as 20% of all installed servers are under-utilized or not performing active work; embodiments of the invention enables a user to identify these IT assets and turn them off, improving data center utilization and reducing energy costs. Also, the ability to reclaim under-utilized assets has the potential to defer the requirement to construct new data center facilities, significantly reducing capital expenditures. Virtualization applications such as VM-Ware allow applications to be moved to under-utilized servers, allowing servers to be powered-off in off-peak hours.

Efficiency can also be improved by using power consumption data to operate each server at its optimal efficiency (this is sometimes called the "sweet spot"). Current drawn by a server can also indicate that a reboot is required.

IT asset information (power, environmental, etc.) can be exported to a building manager or building management system. In a typical data center there are two primary consumers of power: the infrastructure that provides cooling, generators, uninterruptible power, and the like; and the IT assets such as servers, routers, network storage, and the like. To achieve maximum efficiency power data are needed respecting both of these consumers. By collecting and logging all outlet power data and writing this information to the power manager database, this information can be exported to the building management system using BMS networks such as MODBUS, BACnet, or the like.

Figure 20:
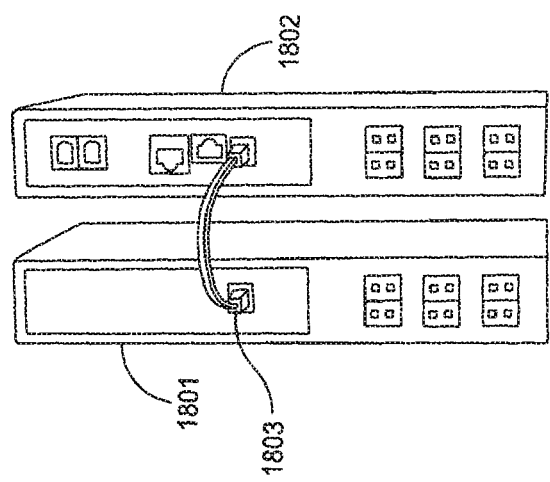
FIG. 20 shows an interconnection of two PDUs into a group.

As shown in FIG. 20, two Power Distribution Units (PDUs) 1801 and 1802 may be grouped under a single IP address. In the embodiment shown, this is accomplished by a cable 1803 between the two PDUs. In other embodiments, more than two PDUs may be grouped under a single IP address. One group can encompass, for example, a plurality of outlets serving one device, or one application (several devices), or a cabinet, particularly if only two PDUs are installed in the cabinet.

Figure 21:
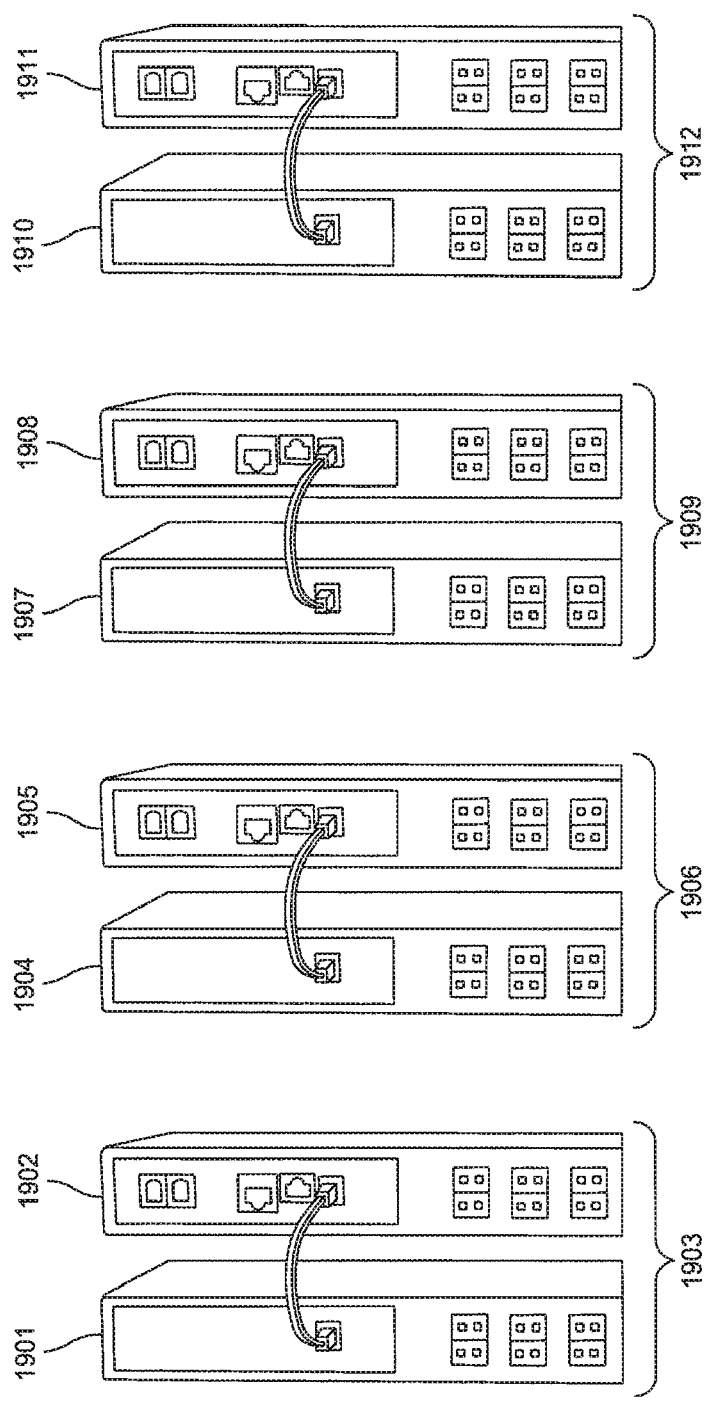
FIG. 21 shows interconnections of several PDUs into groups and clusters.

As shown in FIG. 21, a first plurality of PDUs 1901 and 1902 are grouped together to form a group 1903 under a single IP address. Similarly, a second plurality of PDUs 1904 and 1905 form a group 1906 under a single IP address, a third plurality 1907 and 1908 form a group 1909, and a fourth plurality 1910 and 1911 form a group 1912. Two or more of these groups 1903, 1906, 1909 and 1912 in turn can form a cluster. Outlets can be clustered in many ways, for example within a cabinet, across several cabinets or several rows of cabinets, in a single data center, across multiple data centers, for one device or application or a plurality of applications.

Figure 22:
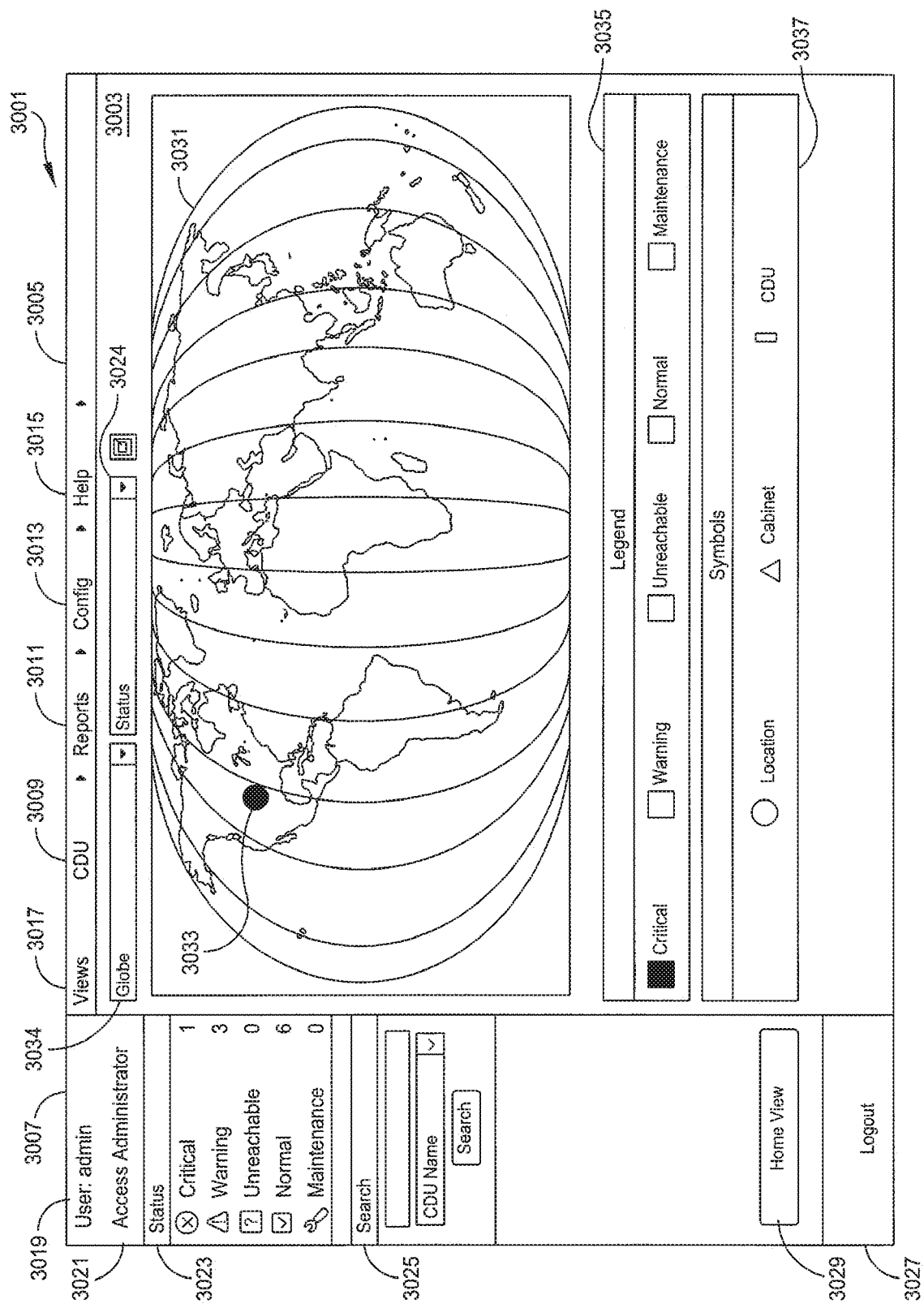
FIG. 22 is a screen shot of an opening screen in an embodiment of the invention.

A screen shot as shown in FIG. 22 illustrates an embodiment of the invention. A screen frame generally 3001 encloses a window area 3003 on the top and left sides. The frame 3001 includes a horizontal bar 3005 across the top of the screen and a vertical bar 3007 along the left side of the screen.

The horizontal bar 3003 includes a tab 3009 for selecting a Cabinet Distribution Unit ("CDU"), a tab 3011 for Reports, a tab 3013 for Configuration, a tab 3015 for Help and a tab 3017 for Views.

The vertical bar 3007 along the left side of the screen indicates the status 3019 and access level 3021 of a user, which are "admin" and "administrator" respectively in the depicted screen shot. Next is a status indicator window 3023 showing how many monitored locations are in each possible state, for example critical, warning, unreachable, normal, and maintenance. In the depicted screen shot, one location is in critical status, three are in warning status, none are unreachable, six are in normal status, and none are in maintenance.

A "select a view" control 3024 enables a user to bring up a view of desired data, for example power load in amps per outlet, location, CDU, cabinet, or the like; power load in watts; temperature or humidity, including current, highest or lowest readings; power capacity, indicating how much power is being used compared with how much is available and whether another server or other device can be powered in the same cabinet.

Below the status indicator window is a search window 3025 into which a user can enter a search criterion. At the bottom of the bar is a logout button 3027 and a "home view" button 3029 for displaying a previously-selected background image.

The window area 3003 depicts a world map generally 3031 with a location 3033 of a power distribution unit being monitored by a power management system embodying the principles of the invention. In the figure, the indicated location is in the United States, but it will be apparent that other locations could be depicted. A "location" control 3034 allows a choice of a map of the entire world, a region of the world, a country, a state or province, a locality, or the like as desired. The selected map will then display locations of any system PDUs within the region depicted by the map.

Below the world map is a color legend 3035 indicating which colors are associated with each state. For example one color could be used to depict critical status, another to depict warning status, and other colors for unreachable, normal, or maintenance status. A symbols legend 3037 includes a circle to indicate a location, a triangle to indicate a cabinet, and a rectangle to indicate a CDU. Thus, a triangle in red might indicate a cabinet in critical status whereas a rectangle in green might indicate a CDU in normal status.

The Views tab 3017 provides at-a-glance monitoring of data center locations, CDUs and cabinets using colored icons. The CDU tab 3009 allows editing of CDUs, outlets, environmental monitors and groups and clusters. The Reports tab 3011 allows generation of user-defined trend and log reports. The Configuration tab 3013, which may also be titled "setup and configuration", provides custom configuration of the overall power management system, including discovery of networked CDUs. The Help tab 3015 gives various kinds of information such as contact information, links to a vendor website, updates of software keys, etc.

The user can select various tables or other information for viewing in the window area. For example, in the screen shot shown in FIG. 23, a table 3039 is displayed in the window area 3003. The table 3039 depicts what could be either a group or a cluster named "Motors" and having an IP address 66.214.208.94. "Motors" has three outlets: Device_2, Device_3 and Device_4. For each outlet, the load, power, status, system name and system IP address are given. In this instance, all three outlets are "off" so they have N/A load and power. All three are identified with the same system name and IP address. At the lower left of the window is a user-operable control 3041 that enables the user to turn all the outlets on or off or to reboot. At the lower right of the window is a user-operable control 3043 to apply or cancel whatever changes have been made to the table 3039.

In a similar manner, other information can be displayed in the window area 3003, for example:

name, IP address, status, location (cabinet), and NIC serial number for each item having a status indication; a user can set or remove maintenance mode for any item;

environmental monitor readings from various sensors, for example temperature and humidity;

infeed names and outlet names for each enclosure;

status, load, power, voltage, control state, and the like for each CDU or enclosure, together with a control for a user to initiate action with respect to any or all outlets;

a list of CDU names with IP addresses, SNMP Get and Set (for example, "public" or "private"), cabinet names, locations, and similar information;

a list of outlets, CDUs, cabinets, clusters or locations with provision for a user to testreboot, testreg, or testview for any or all listed items;

for a selected outlet or outlets, the outlet name, identification, status, control state, capacity in amps, load in amps, voltage, active power in watts, apparent power in volt-amps, crest factor, and power factor. Each listing can have a "details" tab by which a user can request more details respecting a particular outlet;

power monitoring of input feeds, for example separately for each CDU or PDU, including status of the input feed, input load, input voltage, and input power being drawn. The input load and power may be cumulative, for example by phase or branch;

power monitoring of a facility by area, expressed as total power consumed for an area or as power consumer per unit of area (such as per square meter); and graphical displays of trends, such as a graph indicating any of temperature, humidity, other environmental indicators, power usage, and any other data being monitored by the power management system; such graphical displays may be used to correlate amongst the plotted quantities.

In the window area a user, for example an administrator, can be offered:

a "Configure LDAP Options" workspace with user inputs for LDAP, primary host, secondary host, port, whether to use TLS/SSL, bind type, search bind DN, search bind password, user search base DN, user search filter, group membership attribute, group membership value type, authentication order, and the like.

an "Add New Location" workspace with user inputs for name and filename, together with a list of location names and images, and a provision for enabling or deleting each entry;

an "Add New User or Change Password" workspace with user inputs for name and password and group identification of a new user and a list of user names together with their respective groups and a provision for deleting any;

a "Configure E-Mail Delivery of Selected SPM Logs" workspace with user inputs for SMTP Host Name or IP address, SMPT port, e-mail From address, primary and secondary e-mail To addresses, and selections of log categories to send via e-mail such as discovery status, user logons, user actions, and alarm status;

a "Setup a Discovery" workspace with user inputs for discovery starting and ending IP addresses, SNMP Get and Set community strings, FTP user name and password, and Initiate and Cancel CDU Discovery control buttons;

a first "Add New Cabinet" workspace with user inputs for name, area, and location, provision for a list of cabinets and an option to delete any of them, and a second "Add New Cabinet" workspace with user inputs for IP address, SNMP Get and Set community strings, FTP user name and password, and an Add CDU control button;

an "Add New Group or Change Type" workspace with user inputs for name and type, such as regular user, admin user, view-only user, and reboot-only user, and a list of existing groups with provisions for changing type or deleting any of them;

a "Enter Report Parameters" workspace with user inputs for report type, billing level, location being reported on (any or all), start and end dates, and format, and a "generate report" control;

a "View Trends" workspace with user inputs for start and end dates and trend type, and a "view trends" control button;

a workspace that includes a system host name entry; for each of a plurality of network ports, an IP address, a subnet mask, a gateway and a selection of obtaining an IP address automatically or by manual entry or disabling the port adapter; and a web port entry; and a workspace that enables a user to set load thresholds per outlet, per PDU, per CDU, etc., and to request an automatic alert by SNMP trap or e-mail if a threshold is exceeded.

In the window area, a user can display a report. The user can select a date or a range of dates. The report can display a list of user names and for each an IP address, an event time giving date, hour, minute and second, and a description of what happened. Some examples of event descriptions include:

user logged out;
user successfully logged in;
user login failed: invalid credentials;
IP address X is unreachable;
IP address X is removed from warning/critical state;
IP address X entered warning/critical state;
system contains 1 tower, 1 infeed, 8 outlets, 2 environmental sensors and zero outlet groups; and
discovery process completed for IP addresses X through Y: systems discovered and successfully added: 2 systems discovered but already in the system, zero systems discovered but not added successfully.

Under the "reports" tab 3017, a user can select, for example, "billing", "reports", "trends" or "logs". Logs in turn could be, for example, "discovery", "user login", "user actions", and "alarm status".

A power management system embodying principles of the invention includes one or more Cabinet Distribution Units (CDUs) each having a plurality of outlets having monitoring circuitry and facilities as described above. Thus, one or more Power Distribution Units (PDUs) located in one equipment rack are together considered as a CDU. This configuration enables rack level power management, input and outlet power monitoring, grouping of outlets, environmental monitoring, and generation of alarms. The CDUs communicate via the Internet with a power management appliance, for example a computer server with a database. The server may in turn communicate with a Building Management System (BMS). Through an Internet-based interface, the power management system provides enterprise cabinet power management, reports and trends, device monitoring, grouping and clustering of outlets, alarms, kilowatt readings for billing, and auto-discovery of CDUs.

There may be one or many equipment racks in a given physical location. Typically, the PDUs in each rack might be assigned to one CDU, although a CDU might also include PDUs in more than one rack, or more than one CDU might be associated with a single rack. The CDUs in one physical location might be given one or several IP addresses.

A server in a rack might be designed to draw power from two different power supplies. Two PDUs might be used and the server might connect to one or more outlets in each PDU for its power. Each PDU might contain temperature and humidity sensors, an IP connection and a serial connection either of which might be used for outlet control, and a link port.

IP access can be accomplished by web interface, SSL, SSH, Telnet, SNMP & RS-232 access, 10/100 Base T-Ethernet, SSLv3/TLSv1, SNMPv2, TACACS+, LDAP, LDAPS, RADIUS, DHCP, SMTP/Email, Syslog, and the like.

Figure 24:
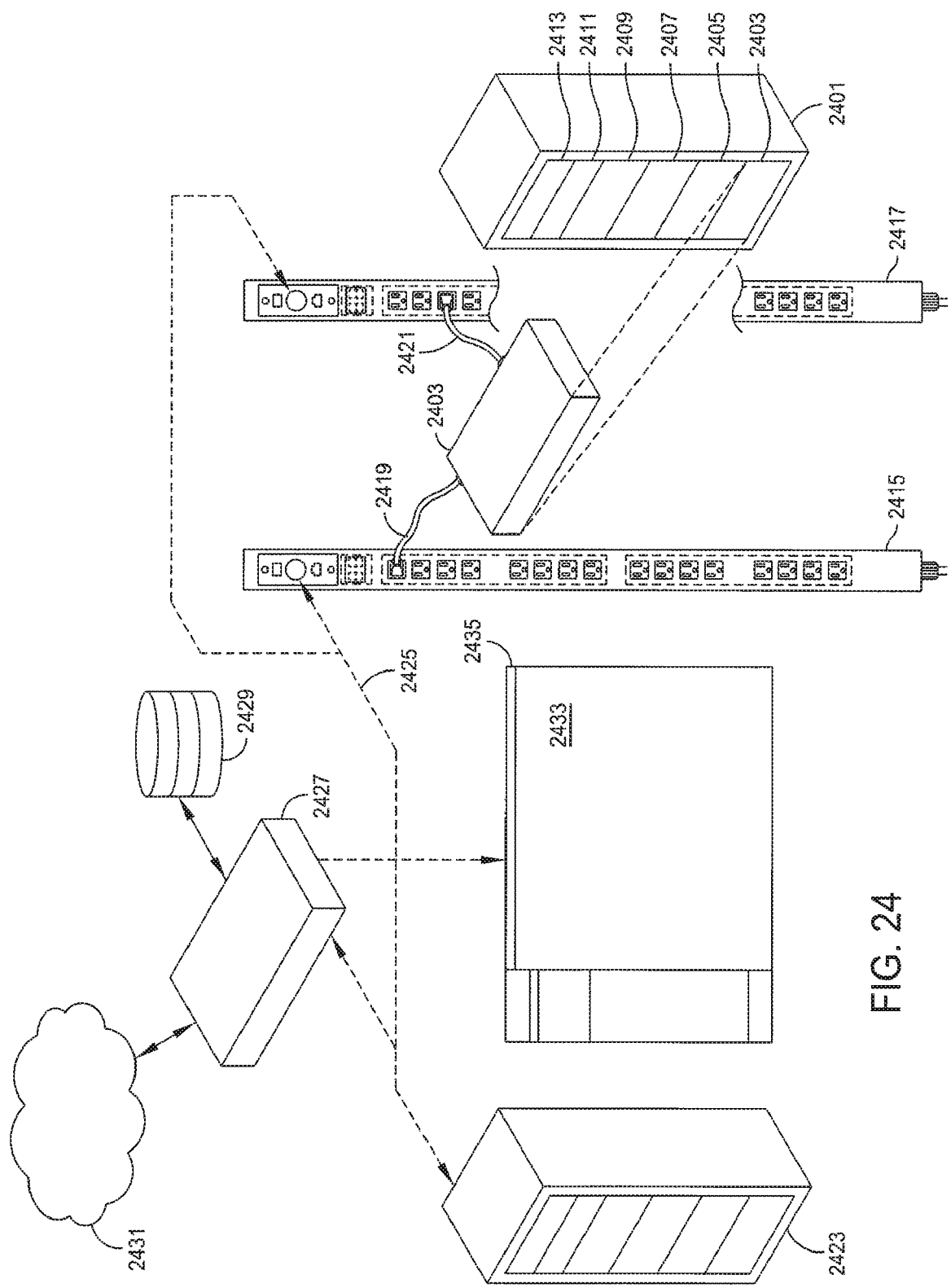
FIG. 24 is a block diagram of a power management system embodying aspects of the invention.

A power management system embodying aspects of the invention is illustrated in FIG. 24. A first equipment cabinet 2401 houses components 2403, 2405, 2407, 2409, 2411 and 2413. Also in the cabinet are a first CDU 2415 and a second CDU 2417. The CDUs are shown outside of, and larger than, the cabinet for convenience. Each CDU is similar to the CDU depicted in FIG. 3. The component 2403 is shown both installed within, and outside of, the cabinet. The component 2403 draws power from both CDUs as indicated by a cord 2419 connecting the component 2403 to an outlet in the first CDU 2415 and a cord 2421 connecting the component 2403 to an outlet in the second CDU 2417. Others of the components may be connected to one or both of the CDUs as desired.

Similarly, a second equipment cabinet 2423 houses various components and one or more CDUs that provide power to these components. The system may include other equipment cabinets having more or fewer components or CDUs than depicted in the drawing.

The CDUs in the various cabinets communicate, for example through an Ethernet pipeline 2425 or through the Internet or some other suitable medium, with a server 2427. The server 2427 includes a database 2429 which may be stored in a memory, or on a magnetic disk or other medium. The database 2429 may be located in one place or distributed as desired. In some embodiments the server 2429 communicates with another system such as a Building Management System 2431.

Various views of the system and various reports from individual outlet level to overall system level as described above may be generated and displayed, for example in a window area 2433 enclosed by a frame 2435 similar to those described above and illustrated in FIGS. 22 and 23.

As discussed previously, various electrical parameters respecting one or more of the outlets may be measured and used in managing power throughout the system. Current flow through each outlet, voltage present at the outlets, power factor, phase, power line frequency, and the like may all be measured and the measurements communicated to the server for presentation to a user or for preparing reports, generating messages, providing trends, and the like.

Attached hereto as Appendices B through G are reports illustrating application for which embodiments of the invention can be adapted (there is no Appendix A). Appendix B is a report by the Environmental Protection Agency titled "EPA Report on Server and Data Center Energy Efficiency". Appendix C is a "Report to Congress on Server and Data Center Energy Efficiency" by the Environmental Protection Agency. Appendix D is a report titled "Four Metrics Define Data Center Greenness". Appendix E is a report titled "Existing Metrics, Guidelines and Programs Affecting Data Center and IT Energy Efficiency". Appendix F is a report titled "The Green Grid Metrics: Data Center Infrastructure Efficiency (DCIE) Detailed Analysis". Appendix G is a report titled "Qualitative Analysis of Power Distribution Configurations for Data Centers".

The foregoing subject matter, including the content of some of the appendices, address the concept of Power Usage measurements for a data center as a whole. There may be granularity divided between 'cooling' and 'power load'. However, these broad metrics do not allow the data center operator to dig below the surface.

The data center operator requires an ability to collect power data (Power Usage measurement) in a very granular manner. For example: by equipment cabinet, by application, by user department, by business unit, and so on. Once this data is available in a granular form, the data center operator can provide reports that may change behavior within department, within business units, etc.

Power Usage measurements have been provided by equipment cabinet. Grouping of this data written to the SPM Database as set forth above allows Power Usage report to be generated by groups of servers within a cabinet. Clustering allows this Power Usage data to consolidated by groups of servers across multiple cabinets. And it allows Power Usage to be measured by groups of servers installed in multiple data centers. For example an email service of a large enterprise may embody multiple servers, installed in multiple data centers across the United States or even across the world.

The ability to group or cluster Power Usage measurements in the SPM data base provides the data center operator a new level of granularity to measure the Department that owns the email service and to point out through trending and logging how Power Usage can be reduced.

PIPS, POPs and SPM are the instrumentation, monitoring tools and recording tools that will permit a data center operator to improve effectiveness at the cabinet level, at the dedicated client server level, at the organization level and at the business unit level.

The phrase "Per Outlet Power Sensing" ("POPS") refers to the concept of monitoring power consumption at each outlet as discussed above. With an Internet interface, monitoring power consumption at each outlet provides detailed power information and allows grouping of outlets to determine kilowatt consumption per device, group of devices, CDU, or cabinet. Power consumption can also be determined per rack, rows of racks, an entire data center, or the like by clustering outlet information across multiple IP addresses and CDUs, as discussed above. This can provide consolidated CDU information within a data center or across multiple locations, a centralized location to view power and environmental status, capacity planning, reports and trends, multiple views, auto discovery of all CDU devices, alarm details, an ability to manage CDUs, global or individual outlet control, and logging.

Partial List of Points of Novelty

The invention includes many unique aspects and points of novelty, as disclosed in the foregoing specification and drawings. A partial list of these points of novelty includes the following. However, this list is not all-inclusive. Other points of novelty also exist. This list is not intended to limit the scope of the invention in any way. The invention is limited only by the claims. This list does not qualify or limit the claims in any way.

1) A CDU with power sensing circuitry including current transformer toroids that sense the AC current flowing through a conductor to each outlet, of the CDU, a voltage sense circuit that senses line voltage, and a processor that receives signals from the toroids and voltage sense circuit to compute apparent power, RMS power, power factor, and/or other power related information.

2) A CDU comprising two or more printed circuit boards with aligned contacts that each provide separate functionality, the CDU assembled with PCBs selected based on the desired functionality. The PCBs are assembled such that the appropriate contacts are lined up to provide a the desired functionality when fewer than all of the PCBs are required for a particular CDU functionality.

3) A CDU having an intelligent power module with a microprocessor and a circuit that senses line frequency of the power input. Clock drift in the microprocessor clock due to temperature fluctuations is corrected using the input power frequency sense.

4) A CDU having functional circuitry associated with each of a plurality of outputs, the functional circuitry included on a printed circuit board that is oriented at about 90 degrees relative to the plane of the exterior side of the plurality of outputs.

5) A system comprising a power manager, and a cabinet distribution unit (CDU), the CDU comprising (a) a plurality of outputs each comprising a current sense circuit, (b) a voltage sense circuit, and (c) a power reporting circuit that provides power related information for each output of the PDU to the power manager, the power manager receiving the power related information and adjusting the power consumption of one or more components that receive power from the PDU.

6) A system comprising a power manager and a CDU, the CDU comprising (a) a plurality of outputs and (b) a power reporting circuit that provides power related information for each output of the CDU to the power manager, the power manager receiving power related information from at least two outputs at two different CDUs related to one component that receives power from the at least two outputs and compiling the power related information to determine power related information for the component.

7) A system comprising a power manager and a CDU, the CDU comprising (a) a plurality of outputs, and (b) a power reporting circuit that provides power related information for each output of the CDU to the power manager, the power manager receiving power related information from at least two outputs at two different CDUs related to one component that receives power from the at least two outputs and compiling the power related information to determine power related information for the component.

8) A system comprising a power manager and a CDU, the CDU comprising (a) a plurality of outputs, and (b) a power reporting circuit that provides power related information for each output of the CDU to the power manager, the power manager receiving power related information from at least two outputs from two or more CDUs related to an application that is running on two or more components that receive power from the at least two outputs and compiling the power related information to determine power related information for the application.

9) A power management system that provides assigning each outlet in any one location to a cabinet distribution unit in that location. At least one unique IP address may be associated with each location having one or more CDUs. If there are several CDUs at a given location, each may get a separate IP address or a single IP address may be used for some or all of the CDUs at that location. Collecting power usage data respecting an outlet may be accomplished by communicating via the Internet with the IP address associated with the CDU containing that outlet.

10) A power management system with the ability to collect and provide trends related to components that receive power from one or more outputs, trends including power, temperature, humidity, and the ability to set triggers if limit thresholds are exceeded.

11) System that provides billing for power consumption for one or more discreet power consuming components within a data center.

12) Power management system that identifies low utilization or non-utilized servers and initiates the shut-down of these servers.

13) Power management system that identifies an optimal operating condition for a discrete component, such as a server, that receives power from a CDU, and identifies one or more components that are less than optimal.

14) A method of managing electrical power including collecting power usage data indicative of electrical current flow through each of a plurality of electrical outlets, displaying the power usage data to a user, receiving a user-initiated command to control current flow through any outlet selected by the user, and controlling current flow through the selected outlet responsive to the command. Controlling current flow through an outlet may mean turning the outlet on or off. The user may initiate a command to reboot control circuitry associated with one or more of the outlets. Data indicative of environmental conditions, such as temperature and humidity, of the electrical outlets may be collected and displayed. A log of events and a report descriptive of a power usage trend may be generated. Outlets may be assigned to CDUs and an IP address may be associated with one or more CDUs. A CDU status, for example critical, changed, normal, no data, maintenance, or snooze may be displayed, as may a graphical depiction of locations of CDUs. Available infeed power may be displayed. A message may be sent automatically if a defined event, for example a temperature or humidity level is reached, a set amount of electrical power is used at a location or by one or more CDUs or even a single outlet.

15) Outlets in different CDUs having different IP addresses may be clustered, thereby allowing a user to view the status of, and to control, all outlets in the cluster.

16) A power management database structure having one or more of the tables listed above.

17) Power and power consumption data can be provided per cabinet, per row of cabinets, per multiple rows of cabinets, per data center or multiple data centers, per device or application, per outlet or in any other desired manner. This information can be used for trend analyses, logs, reports, billing invoices, or the like. The information can be exported to a building management system (BMS) or any other system in a data center environment.

18) A data center operator can associate and allocate or trend power data to individual users, departments or applications. Billing can be accomplished per data center, per server owner, per application or time of day. An individual department can be billed for the cost of their application. Customers can be billed for the power usage of just their devices within a shared rack. Work can be scheduled according to the cost per kW depending on the time of day.

19) A business entity can measure energy efficiency to meet requirements that may be imposed by government agencies.

20) Abnormal power supply behavior can be identified. This facilitates preventive maintenance.

21) Applications can be moved to under-utilized servers. Virtualization applications such as VM-Ware allow servers to be powered-off in off-peak hours. IT assets not being used can be identified and turned off. The ability to reclaim under-utilized assets can avoid or defer construction of new data center facilities.

22) Power consumption data can also be used to help operate each server at its optimal efficiency and reboot if needed.

23) IT asset information (power, environmental, etc.) can be exported to a building manager or building management system, enabling assets to be managed more efficiently by collecting and logging all outlet power data and writing this information to the power manager database. Power management information can be exported to the building management system using BMS networks such as MODBUS, BACnet, or the like, The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

From the foregoing, it will be appreciated that specific embodiments of the invention have been described herein for purposes of illustration, but that various modifications may be made without deviating from the scope of the invention. Accordingly, the invention is not limited except as by the appended claims.

We claim:

1. A power distribution unit comprising:
   a power distribution unit housing disposable in an electrical equipment rack of the type in which a plurality of electrical components are removably mountable;
   at least one power input penetrating the housing;
   a plurality of power outputs disposed in the housing, each in electrical communication with said at least one power input, and each connectable to an electrical load;
   a sensor system, comprising:
      at least one voltage sensor disposed in said housing; and
      a plurality of current sensors disposed in said housing, each in electrical communication with an associated one of said plurality of power outputs to sense current therethrough;
   a power monitoring section in electrical communication with said sensor system and responsive to signals provided by said sensor system to calculate an amount of energy consumed by each connected load; and
   at least one intelligent power module (IPM) comprising an associated sub-plurality of said plurality of outputs, said at least one voltage sensor including a voltage sensor associated with said IPM for sensing a line voltage that is supplied to the sub-plurality of outputs on said IPM.

2. A power distribution unit as in claim 1 wherein said power monitoring section is responsive to calculate, for each connected load, energy consumed over an interval longer than one alternating current (AC) cycle of input power.

3. A power distribution unit as in claim 1 wherein said power monitoring section is responsive to calculate energy consumed for all loads connected to said plurality of power outputs.

4. A power distribution unit as in claim 3 wherein said power monitoring section is responsive to calculate, for all loads connected to said plurality of power outputs, energy consumed over an interval longer than one alternating current (AC) cycle of input power.

5. A power distribution unit as in claim 1 wherein said power monitoring section calculates, for each connected load, at least one of active power, apparent power, power factor, and input current crest factor.

6. A power distribution unit as in claim 1 wherein said power monitoring section comprises at least one analog-to-digital converter (ADC) in electrical communication with the at least one voltage sensor and the plurality of current sensors.

7. A power distribution unit as in claim 1 wherein said at least one voltage sensor comprises one input voltage sensor associated with an input to said power distribution unit, and wherein said sensor system further comprises at least one input current sensor associated with said input.

8. A power distribution unit as in claim 1 further comprising a network interface card (NIC) having application firmware and hardware to interface said power distribution unit to a remote network, and wherein at least a portion of said power monitoring section is associated with said IPM and comprises an energy measurement chip and a microcontroller in communication with said energy measurement chip.

9. A power distribution unit as in claim 8 wherein said energy measurement chip is optically isolated from said microcontroller.

10. A power distribution unit as in claim 8 wherein said energy measurement chip uses current information related to each respective output of said sub-plurality of outputs, along with input voltage supplied to said IPM, to calculate power consumed through said sub-plurality of outputs.

11. A power distribution unit as in claim 1 wherein the voltage sensor associated with said IPM includes a voltage dropping resistor network and an opto-isolated amplifier and provides an indication of instantaneous line voltage for an input power source to said IPM.

12. A power distribution unit as in claim 1 further comprising an energy-related information reporting system associated with said power distribution unit housing and being (i) in energy-related information-determining communication with at least one of said plurality of power outputs, and (ii) connectable in energy-related information transfer communication with a separate communications network distal from the power distribution housing.

13. A power distribution unit as in claim 1 wherein the at least one voltage sensor outputs a voltage level of the at least one power input or at least one of the plurality of power outputs.

14. A power distribution unit as in claim 1 wherein the line voltage corresponds to an instantaneous voltage for a single phase AC or a polyphase AC power source used as an input power source to said IPM.

15. A power distribution unit comprising:
    a power distribution unit housing disposable in an electrical equipment rack of the type in which a plurality of electrical components are removably mountable;
    at least one power input penetrating the housing;
    a plurality of power outputs disposed in the housing, each in electrical communication with said at least one power input, and each connectable to an electrical load;
    a sensor system, comprising:
       at least one voltage sensor disposed in said housing; and a plurality of current sensors disposed in said housing, each in electrical communication with an associated one of said plurality of power outputs to sense current therethrough;

a power monitoring section in electrical communication with said sensor system and responsive to signals provided by said sensor system to calculate an amount of energy consumed by each connected load, wherein said power monitoring section calculates the amount of energy consumed by each connected load by multiplying an instantaneous line voltage for an input power source to said power distribution unit with an instantaneous current for each power output and integrating this product over time; and at least one intelligent power module (IPM) comprising an associated sub-plurality of said plurality of outputs, said at least one voltage sensor including a voltage sensor associated with said IPM for sensing a line voltage that is supplied to the sub-plurality of outputs on said IPM.

* * * * *